US011212761B2

(12) United States Patent
Zhang et al.

(10) Patent No.: US 11,212,761 B2
(45) Date of Patent: Dec. 28, 2021

(54) METHOD AND APPARATUS FOR COMMUNICATION BASED ON FRAME STRUCTURE

(71) Applicant: Samsung Electronics Co., Ltd., Suwon-si (KR)

(72) Inventors: Yingjie Zhang, Beijing (CN); Bin Yu, Beijing (CN); Chen Qian, Beijing (CN); Qi Xiong, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 87 days.

(21) Appl. No.: 16/628,613

(22) PCT Filed: Jul. 4, 2018

(86) PCT No.: PCT/KR2018/007582
§ 371 (c)(1),
(2) Date: Jan. 3, 2020

(87) PCT Pub. No.: WO2019/009619
PCT Pub. Date: Jan. 10, 2019

(65) Prior Publication Data
US 2020/0221402 A1 Jul. 9, 2020

(30) Foreign Application Priority Data

Jul. 4, 2017 (CN) .......................... 201710539017.8
Jan. 11, 2018 (CN) .......................... 201810029413.0
Feb. 1, 2018 (CN) .......................... 201810105219.6

(51) Int. Cl.
H04W 56/00 (2009.01)
H04W 72/04 (2009.01)
(Continued)

(52) U.S. Cl.
CPC ....... *H04W 56/001* (2013.01); *H04W 72/042* (2013.01); *H04W 72/0446* (2013.01);
(Continued)

(58) Field of Classification Search
None
See application file for complete search history.

(56) References Cited

U.S. PATENT DOCUMENTS 7,336,638 B2   2/2008  Cheng et al.
8,194,575 B2   6/2012  Baldemair et al.
(Continued)

FOREIGN PATENT DOCUMENTS

CN   101406098 A    4/2009
CN   106162656 A   11/2016
(Continued)

OTHER PUBLICATIONS

Supplementary Partial European Search Report dated May 25, 2020 in connection with European Patent Application No. 18 82 8884, 17 pages.
(Continued)

*Primary Examiner* — Ayanah S George

(57) ABSTRACT

The present disclosure relates to a pre-5th-Generation (5G) or 5G communication system to be provided for supporting higher data rates beyond 4th-Generation (4G) communication system such as long term evolution (LTE). The method for operating a user equipment (UE) in a wireless communication system is provided. The method includes detecting a synchronization signal block, performing downlink synchronization process according to the detected synchronization signal block, and determining time-frequency resources of an anchor subband; acquiring random access configuration information according to the time-frequency resources of the anchor subband, performing a random access process
(Continued)

according to the random access configuration information, and completing uplink synchronization; and acquiring control information in a control channel band, and performing data communication with a base station in the data transmission band according to the control information.

20 Claims, 14 Drawing Sheets

(51) Int. Cl.
  *H04W 72/12* (2009.01)
  *H04W 74/08* (2009.01)
(52) U.S. Cl.
  CPC ... *H04W 72/0453* (2013.01); *H04W 72/1268* (2013.01); *H04W 74/0833* (2013.01)

(56) References Cited

U.S. PATENT DOCUMENTS

| | | | |
|---|---|---|---|
| 9,603,166 | B2 | 3/2017 | Kim et al. |
| 2011/0255407 | A1* | 10/2011 | Ishii ................ H04W 28/02 370/235 |
| 2013/0028219 | A1* | 1/2013 | Lee ................ H04L 5/0094 370/329 |
| 2015/0382334 | A1 | 12/2015 | El Ayach et al. |
| 2016/0249386 | A1 | 8/2016 | Lyu et al. |
| 2017/0055298 | A1* | 2/2017 | Pawar ................ H04W 56/004 |
| 2019/0159261 | A1* | 5/2019 | Jung ................ H04W 48/08 |
| 2019/0350009 | A1* | 11/2019 | Yan ................ H04W 74/0866 |

FOREIGN PATENT DOCUMENTS

| | | |
|---|---|---|
| CN | 106712914 A | 5/2017 |
| EP | 1909410 A1 | 4/2008 |
| EP | 2047703 A2 | 4/2009 |
| EP | 2685778 A1 | 1/2014 |
| EP | 2793526 A1 | 10/2014 |
| EP | 2876955 A1 | 5/2015 |
| EP | 3091787 A1 | 11/2016 |
| EP | 3091811 A1 | 11/2016 |
| EP | 3099132 A1 | 11/2016 |
| WO | 2007/109669 A2 | 9/2007 |
| WO | 2009088338 A1 | 7/2009 |
| WO | 2015/192299 A1 | 12/2015 |
| WO | 2016025899 A1 | 2/2016 |
| WO | 2017030485 A1 | 2/2017 |

OTHER PUBLICATIONS

ISA/KR, International Search Report and Written Opinion of the International Search Authority for International Application No. PCT/KR2018/007582, dated Oct. 16, 2018, 16 pages.

International Telecommunication Union, ITU Document 5D/TEMP/466-E, "SWG Traffic, IMT Traffic estimates beyond year 2020," Radiocommunication Study Groups, Oct. 21, 2014, 35 pages.

International Telecommunication Union, Recommendation ITU-R M.2083-0 (Sep. 2015), "IMT Vision—Framework and overall objectives of the future development of IMT for 2020 and beyond," Sep. 2015, 21 pages.

International Telecommunication Union, Report ITU-R M.2320-0 (Nov. 2014), "Future technology trends of terrestrial IMT systems," Nov. 2014, 32 pages.

Supplementary European Search Report in connection with European Application No. 18828884.9 dated Aug. 24, 2020, 20 pages.

Office Action dated Sep. 1, 2021, in connection with Chinese Application No. 201710539017.8, 14 pages.

* cited by examiner

[Fig. 1]
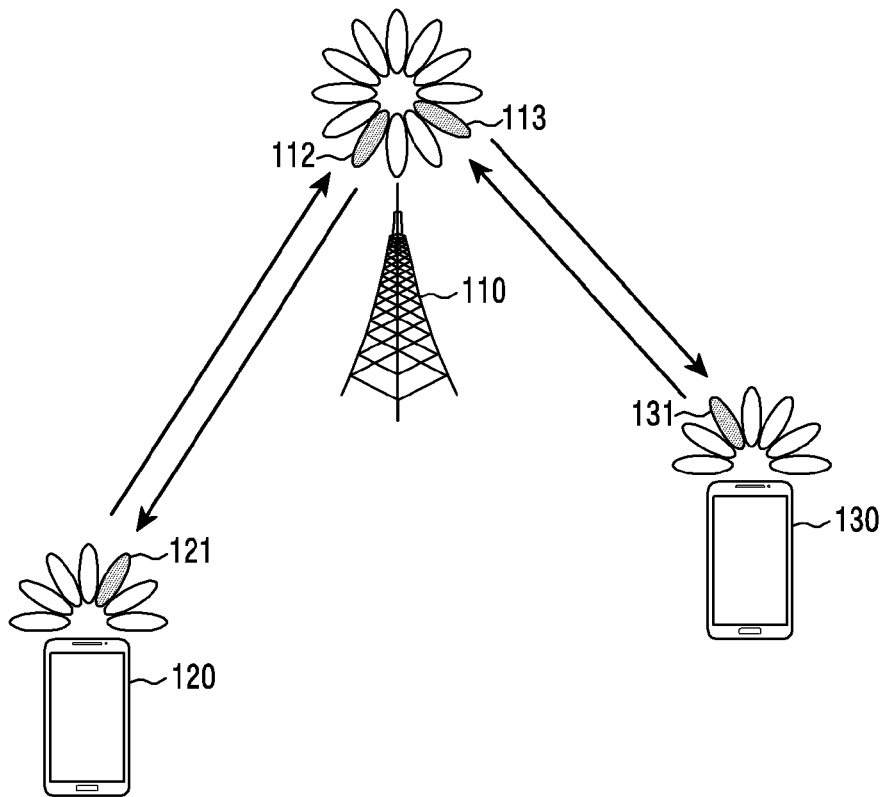
[Fig. 2]
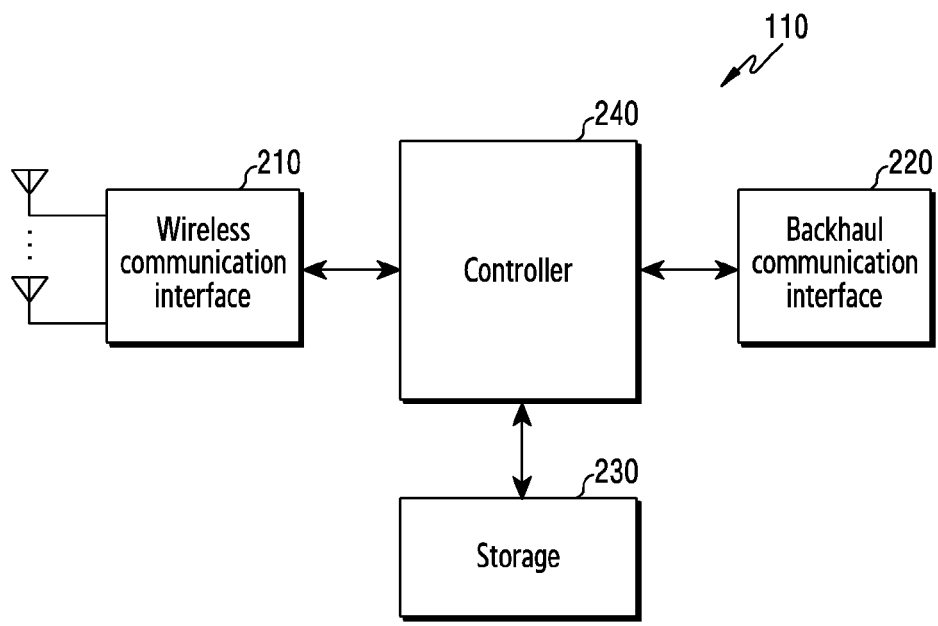

[Fig. 3]
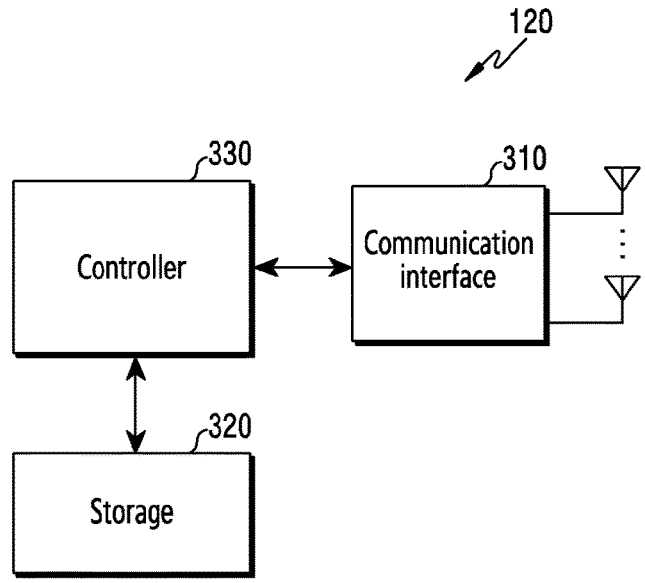
[Fig. 4]
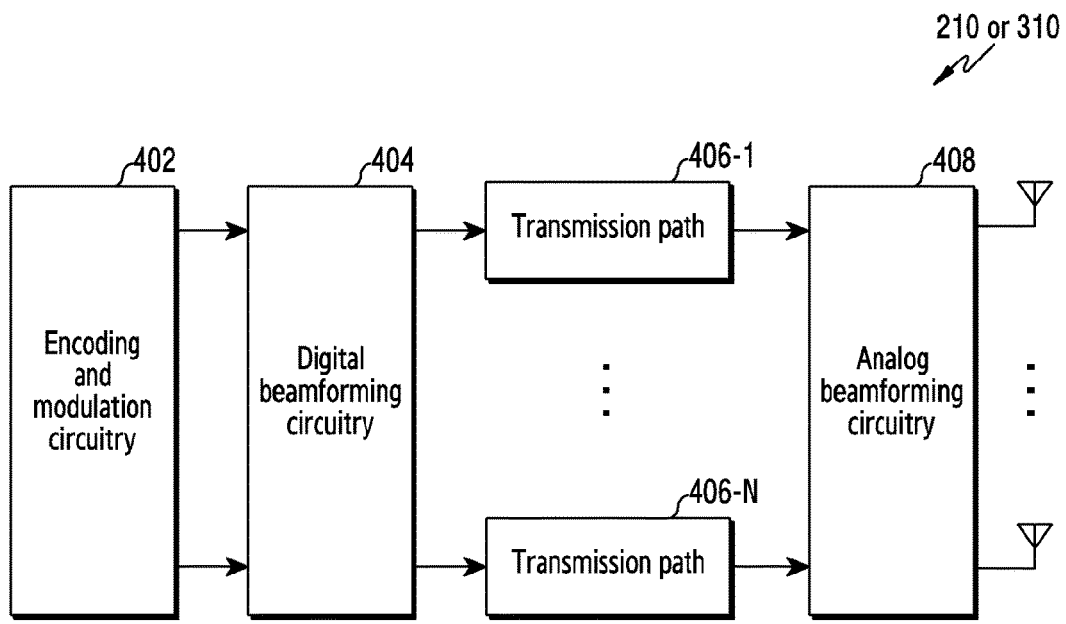
[Fig. 5]
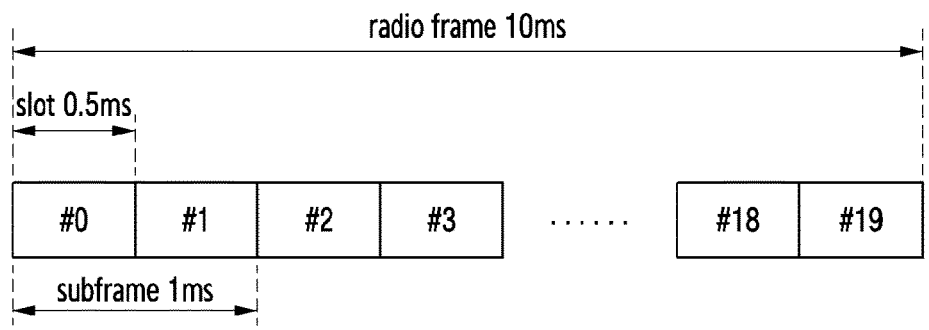

[Fig. 6]
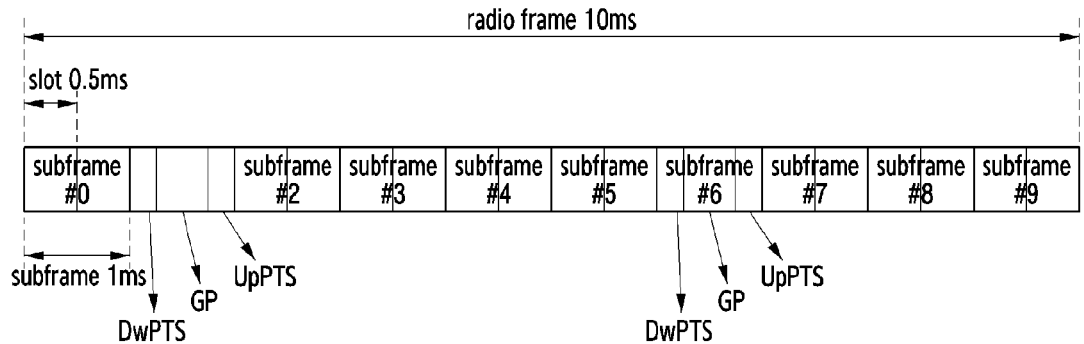
[Fig. 7]
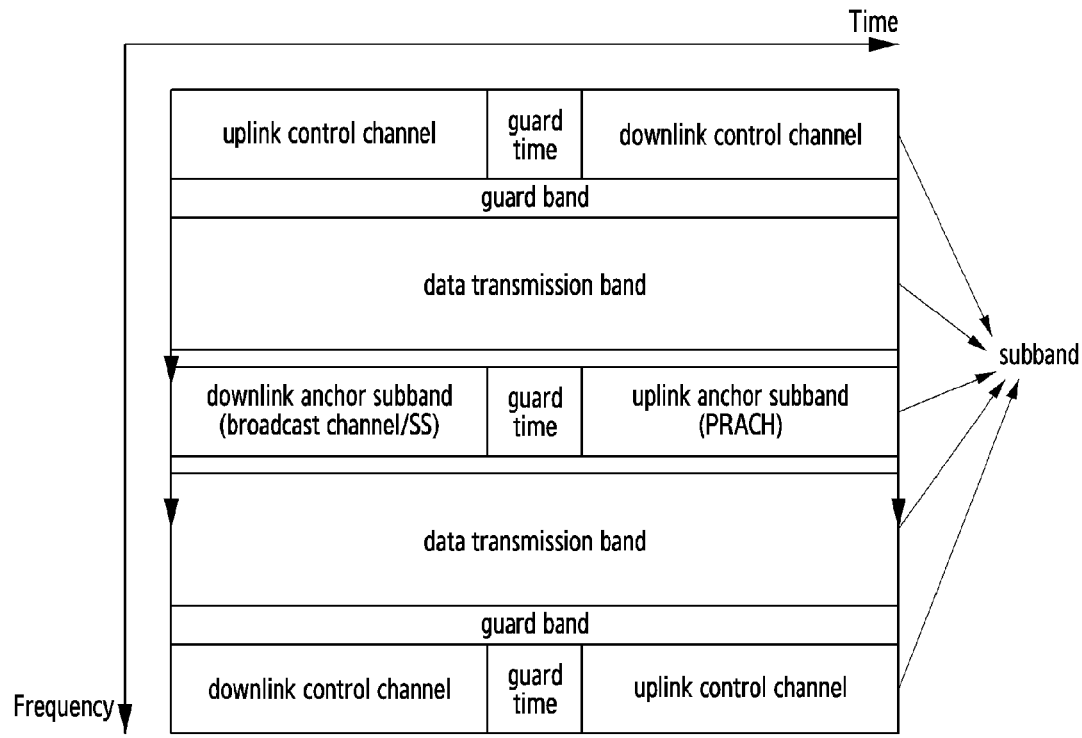

[Fig. 8]
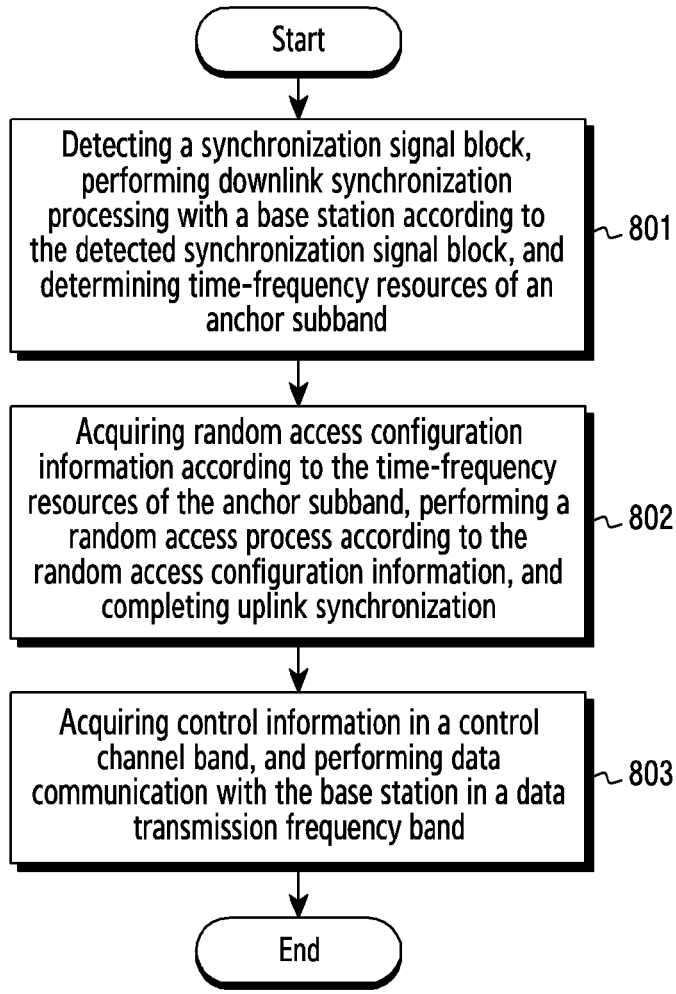
[Fig. 9]
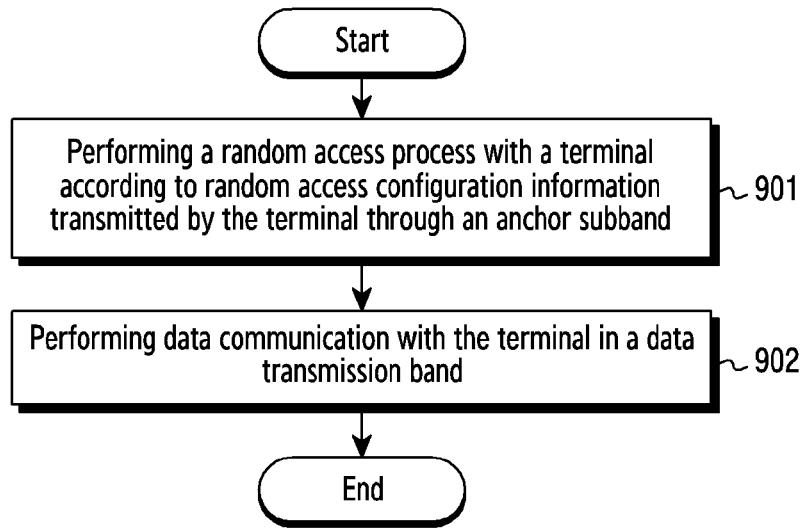

[Fig. 10]
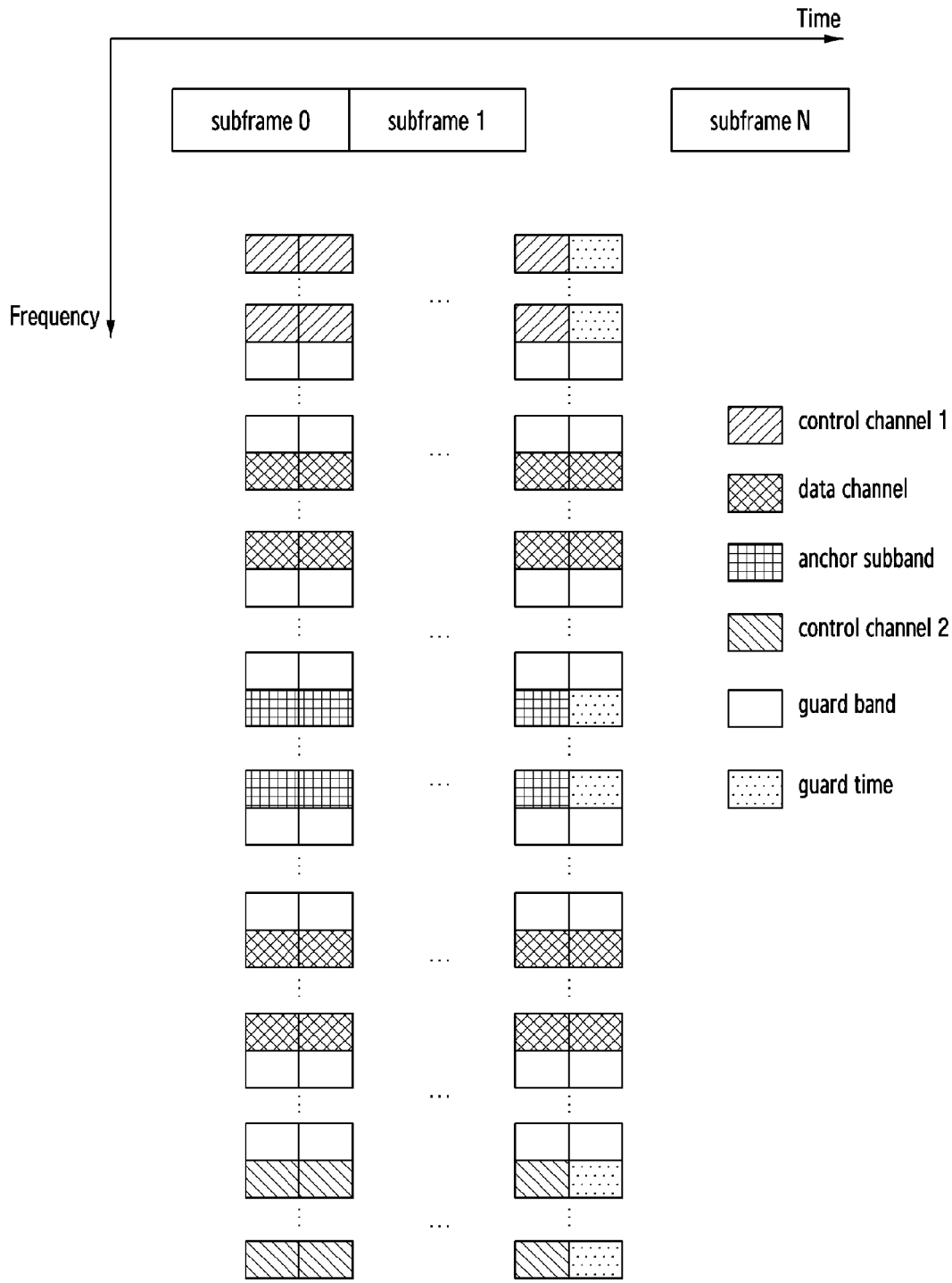
[Fig. 11A]
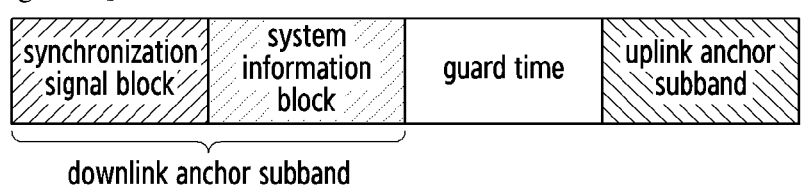

[Fig. 11B]
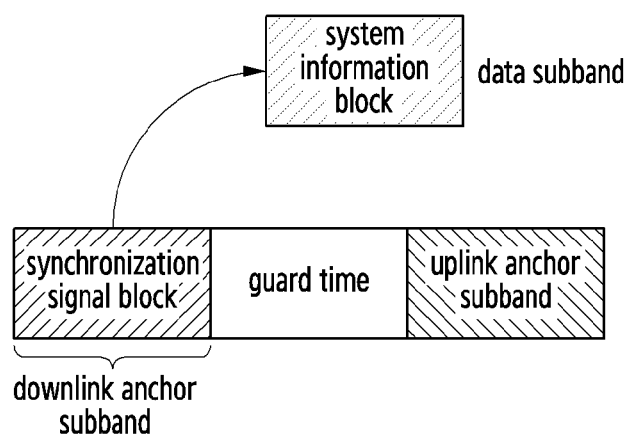

[Fig. 12]
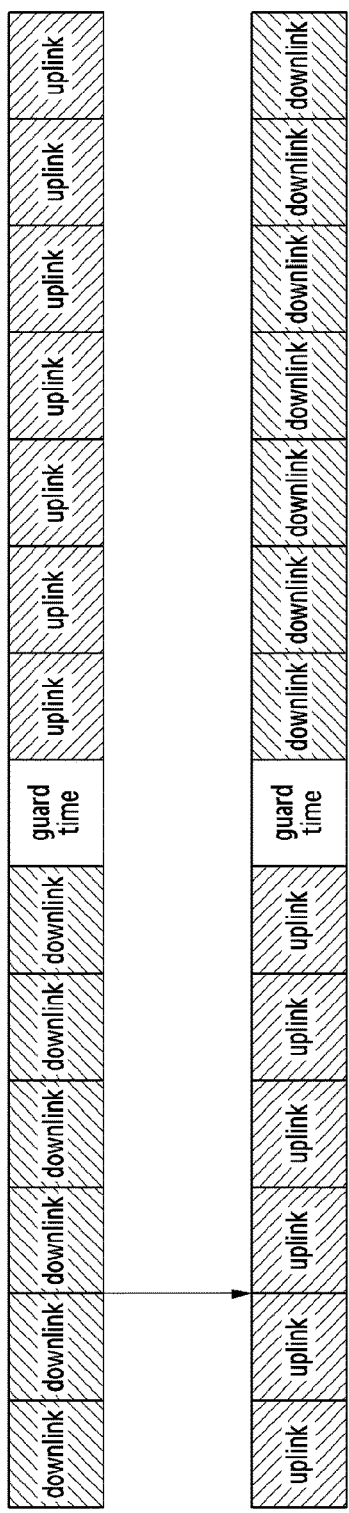
[Fig. 13]
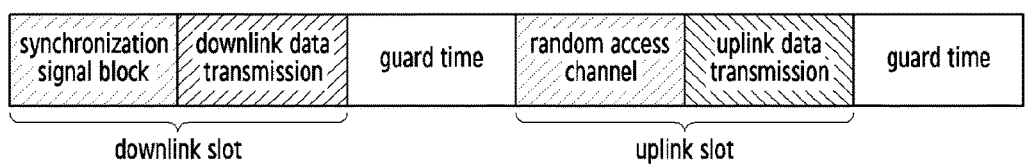

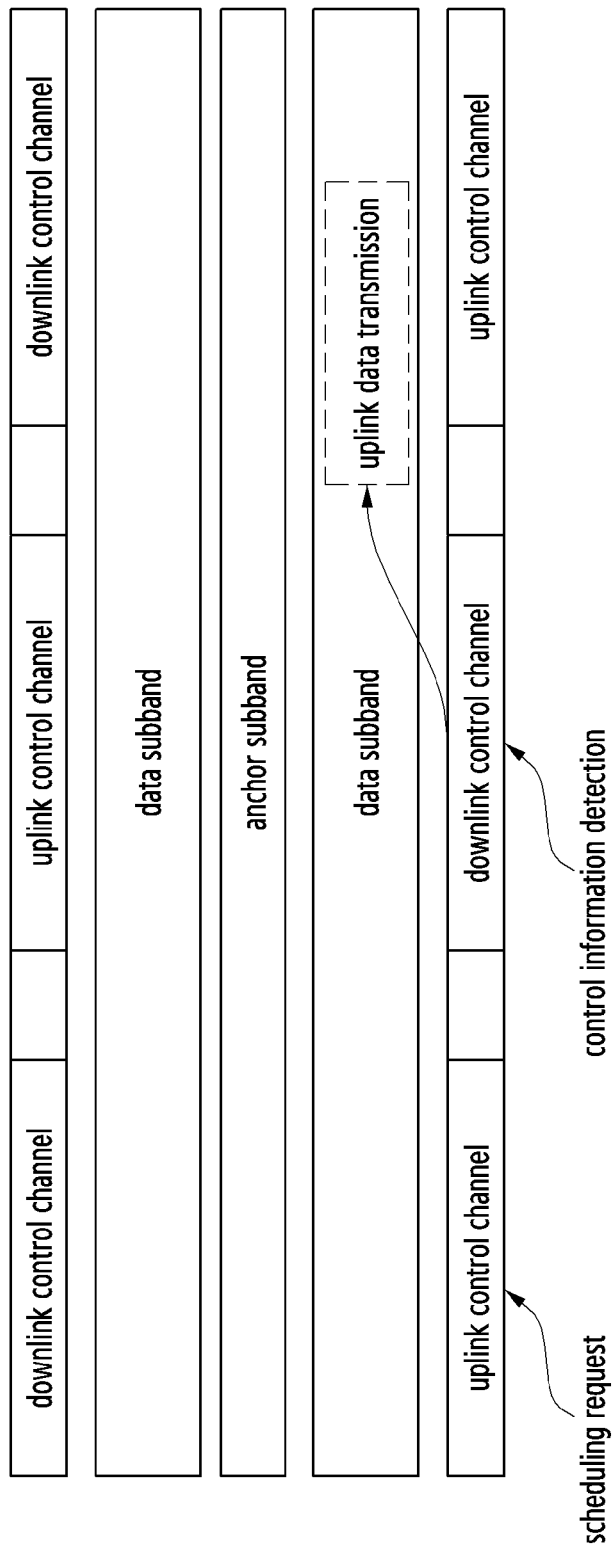
[Fig. 14]

[Fig. 15]
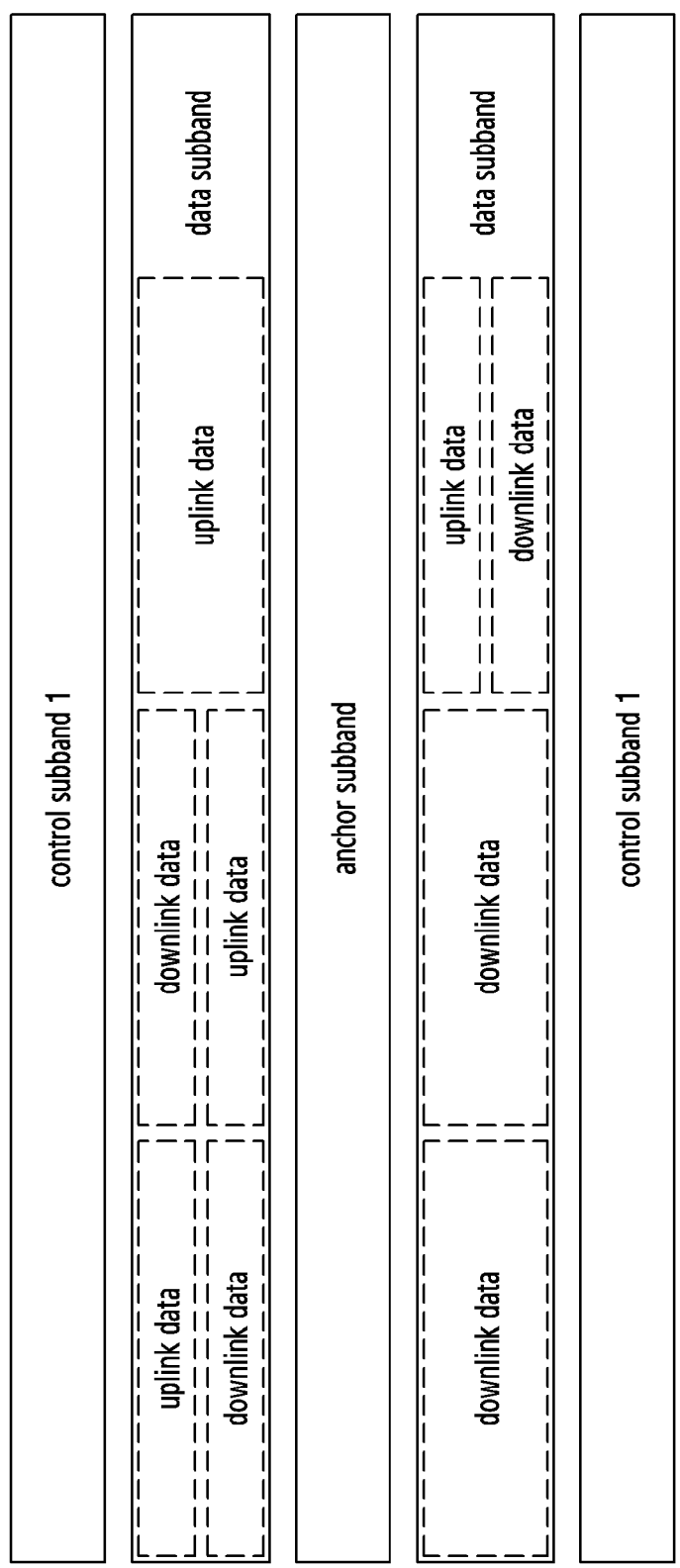

[Fig. 16]
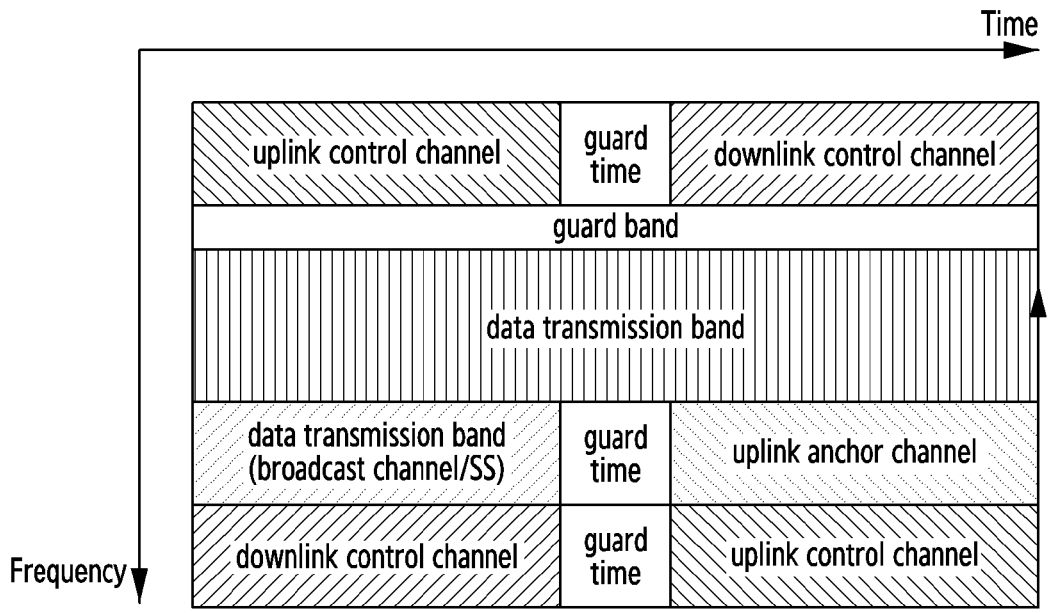
[Fig. 17]
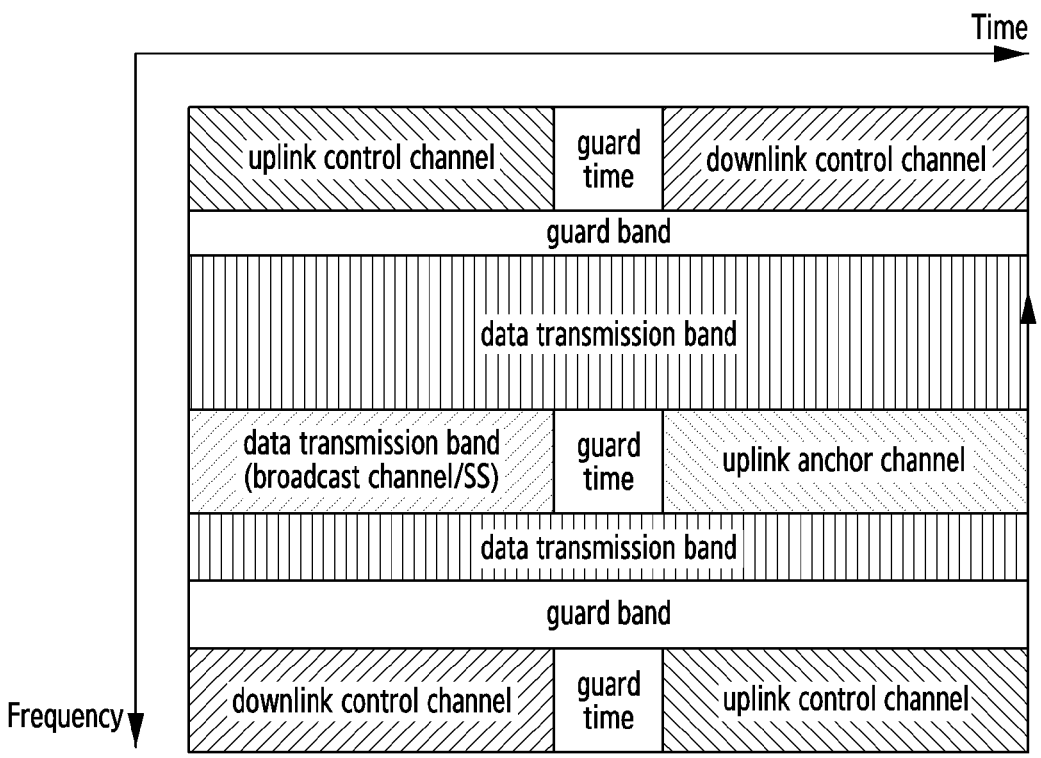

[Fig. 18]
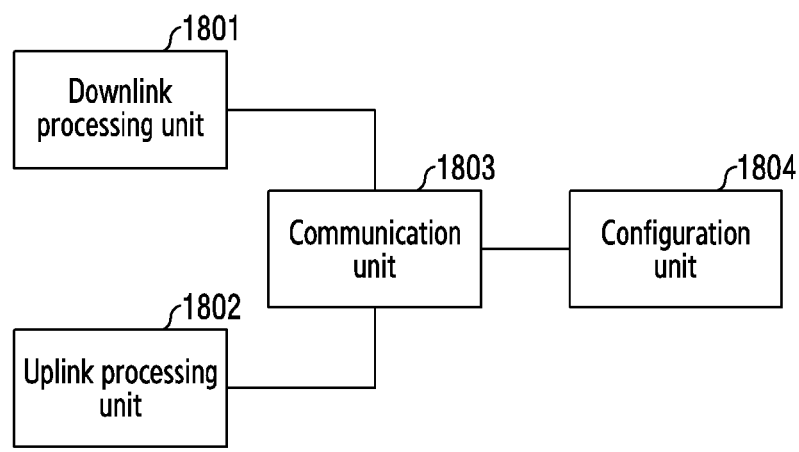
[Fig. 19]
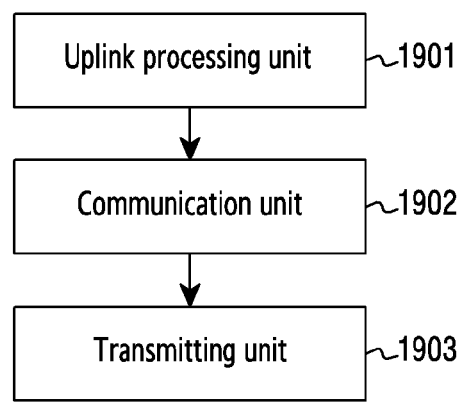

[Fig. 20]
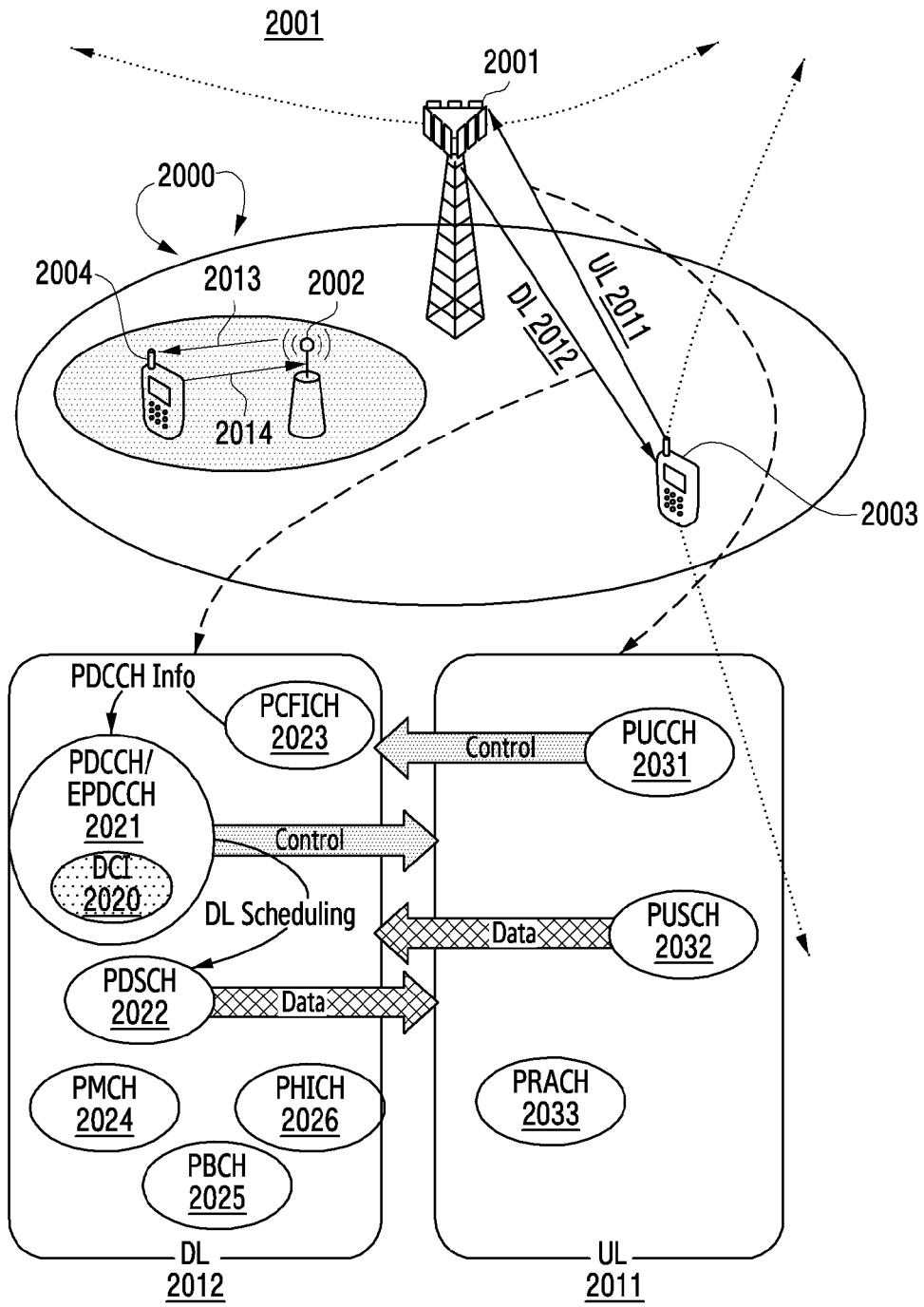

[Fig. 21]
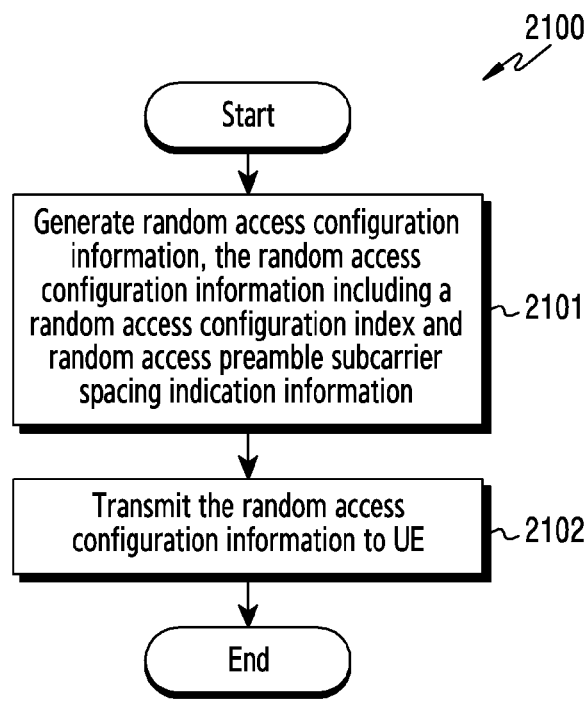
[Fig. 22]
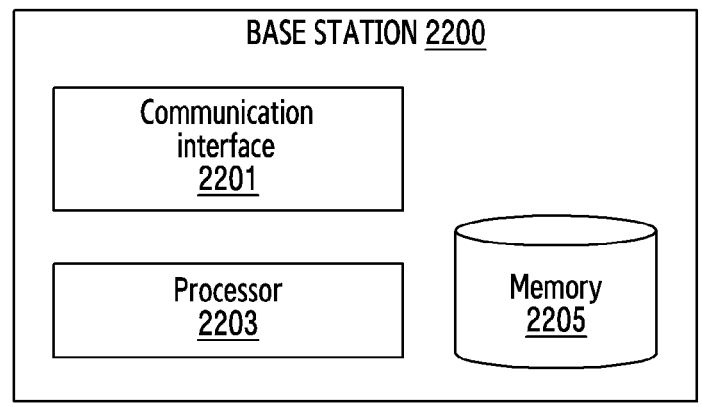

[Fig. 23]
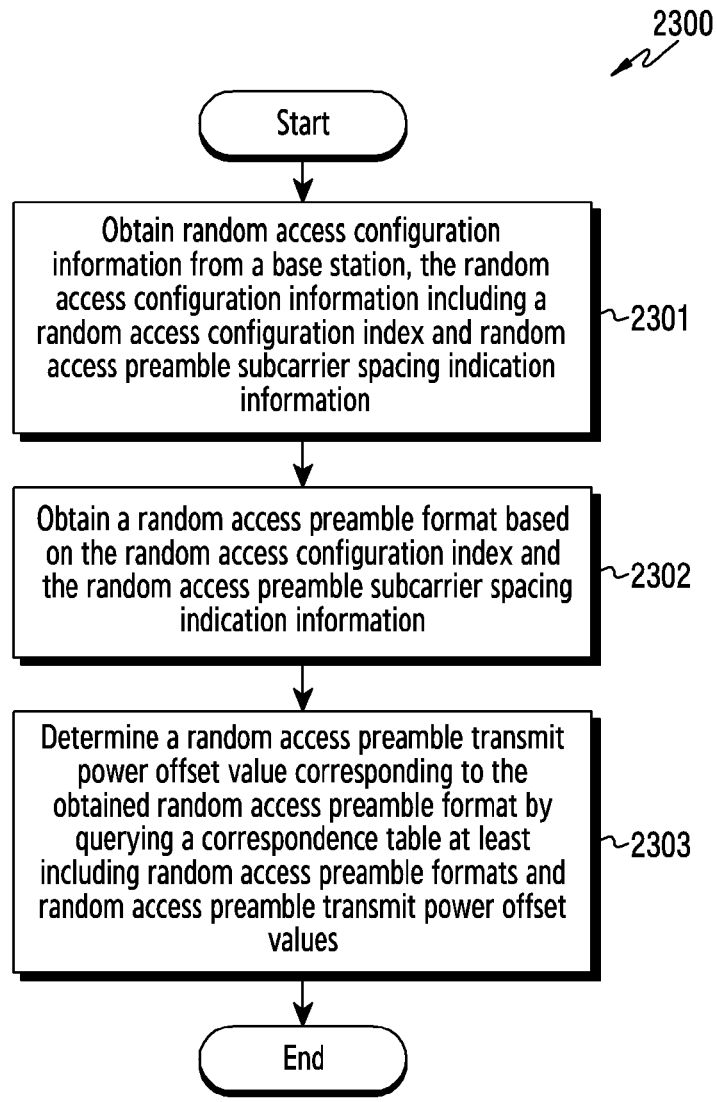
[Fig. 24]
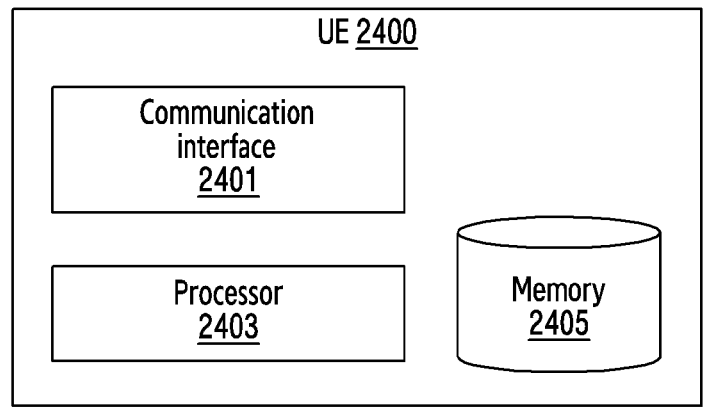

METHOD AND APPARATUS FOR COMMUNICATION BASED ON FRAME STRUCTURE

CROSS-REFERENCE TO RELATED APPLICATIONS

This application is a 371 National Stage of International Application No. PCT/KR2018/007582, filed Jul. 4, 2018, which claims priority to Chinese Patent Application No. 201710539017.8, filed Jul. 4, 2017, Chinese Patent Application No. 201810029413.0, filed Jan. 11, 2018, and Chinese Patent Application No. 201810105219.6, filed Feb. 1, 2018, the disclosures of which are herein incorporated by reference in their entirety.

BACKGROUND

1. Field

This disclosure generally relates to wireless communication systems. More specifically, this disclosure relates to a method and apparatus for communication based on a frame structure, a method and apparatus for determining random access preamble transmit power, a user equipment (UE), a base station and a computer readable medium related thereto.

2. Description of Related Art

To meet the demand for wireless data traffic having increased since deployment of $4^{th}$ generation (4G) communication systems, efforts have been made to develop an improved $5^{th}$ generation (5G) or pre-5G communication system. Therefore, the 5G or pre-5G communication system is also called a 'Beyond 4G Network' or a 'Post Long Term Evolution (LTE) System'.

The 5G communication system is considered to be implemented in higher frequency (mmWave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

With a rapid development of information industry, particularly the increasing demand from the mobile Internet and the Internet of Things (IoT), the future mobile communication technology is challenged unprecedentedly. For example, according to the report ITU-R M. issued by the International Telecommunication Union (ITU), it can be expected that, by 2020, mobile service traffic will grow nearly 1,000 times more than that in 4G era, and the number of user equipment connections will also exceed 17 billion, and with a vast number of IoT devices gradually expanding into the mobile communication network, the number of connected equipments will be even more astonishing. In order to cope with this unprecedented challenge, the communication industry and academia have conducted extensive study on the fifth generation (5G) of mobile communications technology. Currently, in the report ITU-R M. from ITU, the framework and overall objectives of the future 5G have been discussed, where the demands outlook, application scenarios and various important performance indexes of 5G have been described in detail. In terms of new demands in 5G, the report ITU-R M. from ITU provides information related to 5G technology trends, which is intended to address prominent issues such as significant improvement in system throughput, consistency of the user experience, scalability to support IoT, delay, energy efficiency, cost, network flexibility, support for new services and flexible spectrum utilization, etc.

Duplex mode in radio communication, which is importance foundation for designing an air interface in radio communication, refers to processing mode of bidirectional data communication for uplink and downlink, and is no exception in the development of 5G. Currently, Frequency Division Duplex (FDD) and Time Division Duplex (TDD) are two primary duplex modes and widely applied to the field of audio broadcasting, video broadcasting and civil communication system, such as Long Term Evolution (LTE) system corresponding to Evolved Universal Terrestrial Radio Access (E-UTRA) protocol established by 3rd Generation Partnership Project (3GPP) and IEEE802.11A/g Wireless Local Area Net (WLAN).

In FDD mode, uplink and downlink perform communication by using paired frequency resource satisfying a certain duplex spacing; while in TDD mode, uplink and downlink share a same frequency resource, and uplink communication and downlink communication are divided by different time resource. Different duplex modes will result in different designs in physical layer of air interface such as frame structure. Taking LTE as an example, two frame structures applicable to FDD mode and TDD mode are specified in LTE.

In the FDD-mode frame structure as shown in FIG. 5, one radio frame of 10-ms is composed of 10 subframes of 1-ms each of which is composed of 2 time slots of 0.5-ms. Uplink communication and downlink communication are performed on different frequency resources.

In the TDD-mode frame structure as shown in FIG. 6, similar to the FDD-mode frame structure, one radio frame of 10-ms is composed of 10 subframes of 1-ms; unlike the FDD-mode frame structure, the uplink communication and downlink communication in the TDD mode share same frequency resources, which are distinguished by time resources. For example, in the configuration of FIG. 6, subframes 0 and 5 are used for downlink communication, and subframes 2, 3, 4, 7, 8 and 9 are used for uplink communication. In order to ensure that the downlink communication does not affect the uplink communication, a specific subframe is introduced in the TDD-mode frame structure, namely subframes 1 and 6 in FIG. 6. The specific subframe is composed of 3 domains of Downlink Pilot Time Slot (DwPTS), Guard Period (GP) and Uplink Pilot Time Slot (UpPTS). In the TDD-mode frame structure, subframes 1 and 5, and DwPTS are always used for downlink transmission, while UpPTS and the subframes following the UpPTS are always used for uplink transmission. GP is a guard spacing between downlink communication and uplink communication, to ensure that uplink data communication is not affected by downlink communication. TDD mode in LTE can be configured flexibly, to support unsymmetrical service between uplink and downlink data communication. Table 1 shows various TDD-mode configurations in a LTE, wherein the D represents that a subframe is used for downlink communication, the U represents that the subframe is used for uplink communication, and S represents a specific subframe.

TABLE 1 uplink-downlink configuration in TDD-mode in a LTE.

| Uplink-downlink configuration | Downlink-uplink switch periodicity | Subframe index |
| --- | --- | --- |
| 0 | 5 ms | |
| 1 | 5 ms | |
| 2 | 5 ms | |
| 3 | 10 ms | |
| 4 | 10 ms | |
| 5 | 10 ms | |
| 6 | 5 ms | |

Wherein, the above two duplex modes each has its own merits. Specifically, as for FDD mode, uplink and downlink data communication are required to be performed on paired frequency bands, and pairing of uplink and downlink frequency should be satisfied with a certain duplex spacing, which will easily result in spectrum fragments in terms of spectrum division when 5G is developing toward high frequency and large bandwidth; while as for TDD mode, uplink and downlink data communication are performed by using a same frequency band, thus the TDD mode is advantageous in flexibility of frequency resources utilization, can provide more support to asymmetrical service, and has a higher spectrum efficiency. As for FDD, since it is a paired spectrum, there are always resources available in uplink and downlink resources, thus scheduling and terminal feedback of uplink control signaling can be more timely, for example, Acknowledge/Non-Acknowledge (ACK/NACK) information of Hybrid Automatic Retransmission Request (HARQ) and Channel state information (CSI), so as to reduce feedback delay of air interface and improve scheduling efficiency; while as for TDD, different uplink and downlink slot configurations will result in more complicated related design, in addition, since the TDD mode is advantageous in channel reciprocity of uplink and downlink, acquisition of CSI can be greatly simplified.

Large-scale MIMO technology may be adopted in 5G to further improve spectrum efficiency, a great deal of antennas are provided at a base station side, a great deal of resources are required for downlink physical channel training and feedback of channel state information under FDD mode, while overhead of training and feedback can be decreased by using channel reciprocity under TDD mode, thus TDD mode is more attractive for a large-scale MIMO technology. However, there is also requirement of low delay, thus it is required to further shorten Transmission Time Interval (TTI) of air interface and has more timely control signaling, which will result in more complicated design of TDD mode.

As can be seen from the above analysis, each of FDD mode and TDD mode has its own merits, as facing diverse application scenes and usage of a new frequency band in 5G, it is necessary to design a new duplex mode, which incorporates merits of FDD mode and TDD mode both, in order to guarantee spectrum utilization of 5G and performance of network.

Since the duplex mode in LTE is inflexible, a paired spectrum is required for FDD mode, and both the scheduling process and the HARQ process of TDD mode are quite complicated, if the current duplex mode is still used, spectrum efficiency and performance of a system cannot be improved further.

A random access process is an important step in a wireless communication system, and is used for establishing uplink synchronization between a terminal and a base station, and for a base station to allocate an ID for identifying a terminal, etc. The performance of the random access directly affects experience at the terminal. For a traditional wireless communication systems, such as Long Term Evolution (LTE) and Long Term Evolution-Advanced (LTE-A), the random access process is applied to multiple scenarios, such as establishing an initial link, cell handover, re-establishing an uplink, Radio Resource Control (RRC) connection re-establishment, etc., and is classified into Contention-based Random Access and Contention-free Random Access, based on whether or not the terminal occupies preamble resources exclusively. Since in the Contention-based Random Access, terminals select respective preambles from the same preamble resources in a process of trying to establish uplink links, several terminals may select the same preamble to be transmitted to the base station. Such a conflict may lead to a preamble transmission failure. How to design a random access preamble retransmission method to improve a success probability of the random access preamble retransmission is a key factor that affects the random access performance.

The Contention-based Random Access process in LTE-A includes four steps. Before the random access process starts, the base station transmits configuration information of the random access process to the terminal, and the terminal performs the random access process according to the received configuration information.

In Step 1, the terminal randomly selects a preamble from a preamble resource pool and transmits it to the base station; the base station performs correlation detection on the received signal so as to identify the preamble transmitted by the terminal.

In Step 2, the base station transmits a Random Access Response (RAR) to the terminal, the RAR including a random access preamble identifier, a timing advance instruction determined based on delay estimation between the terminal and the base station, a Temporary Cell-Radio Network Temporary Identifier (TC-RNTI), and time-frequency resources allocated for the next uplink transmission of the terminal.

In Step 3, the terminal transmits a Message 3 (MSg3 for short) to the base station according to the information in the RAR. The MSg3 includes information, such as a terminal identifier for identifying a terminal and a RRC link request, etc. The terminal identifier is an identifier unique to the terminal for resolving conflicts.

In Step 4, the base station transmits a conflict resolution identifier to the terminal, including the terminal identifier of the terminal that survives the conflict resolution. After detecting its own identifier, the terminal upgrades a Temporary Cell-Radio Network Temporary Identifier to a Cell-Radio Network Temporary Identifier (C-RNTI for short), and transmits an Acknowledgement (ACK for short) signal to the base station to complete the random access process, and then waits for scheduling by the base station; otherwise, the terminal will start a new random access process after a delay.

For the Contention-free Random Access process, since the base station knows the terminal identifier, it may allocate a preamble for the terminal. Therefore, when the terminal intends to transmit a preamble, it does not need to randomly select a preamble, but may use the allocated preamble. After detecting the allocated preamble, the base station may transmit a corresponding RAR, including information such as timing advance and uplink resource allocation etc. After receiving the RAR, the terminal considers that uplink synchronization has been completed and waits for further scheduling by the base station. Therefore, the process of initial access and the Contention-free Random Access only includes two steps: First Step of transmitting a preamble; and Second Step of transmitting an RAR.

In the above First Step, the base station transmits a preamble, and its transmit power determination process includes steps as follows:

1. Setting a random process preamble power PREAMBLE_RECEIVED_TARGET_POWER expected to be received by the base station to be preambleInitialReceivedTargetPower DELTA_PREAMBLE+(PREAMBLE_TRANSMISSION_COUNTER−1)*powerRampingStep, where preambleInitialReceivedTargetPower is an initial power configured by a high layer, DELTA_PREAMBLE is a preamble transmit power offset, PREAMBLE_TRANSMISSION_COUNTER is the number of random process attempts (including an initial attempt and subsequent re-attempts), and powerRampingStep is a power ramping step configured by the high layer.

2. Determining that a final random access preamble is min{$P_{CMAXc}(i)$, PREAMBLE_RECEIVED_TARGET_POWER+$PL_c$}, where $P_{CMAXc}(i)$ is a maximum transmit power of the terminal (23 dBm in LTE/LTE-A), and $PL_c$ is a path loss value.

Specifically, a correspondence between the transmit power offset PREAMBLE_RECEIVED_TARGET_POWER and a random access preamble format is shown in Table 2:

TABLE 2

Correspondence Table of Preamble Format and DELTA_PREAMBLE

| Preamble Format | DELTA_PREAMBLE Value |
| --- | --- |
| 0 | 0 dB |
| 1 | 0 dB |
| 2 | −3 dB |
| 3 | −3 dB |
| 4 | 8 dB |

The terminal obtains the DELTA_PREAMBLE value based on the preamble format indicated by prach-ConfigIndex in the random access configuration and the correspondence in Table 2, and determines a final transmit power value based on this.

The future wireless communication systems may be roughly classified into two categories, Below 6 GHz and Above 6 GHz, according to their carrier ranges. In addition, subcarrier spacings of random process channels in the future wireless communication systems may be 1.25 kHz, 5 kHz, 15 kHz, 30 kHz, 60 kHz, or 120 kHz; and a length of the preamble in the random access process may be L=839 or L=139. In this case, the number of the preamble formats in the random access process of the future wireless communication systems may be greater than 40. Requirements of the random access process in the future wireless communication networks cannot be satisfied, if the transmit power offsets with only three different values as shown in the above Table 2 are still be used. Therefore, it is required to design new transmit power offsets for new random access preamble formats designed based on new carrier ranges and subcarrier spacing sizes in the future wireless communication systems, and determine the random access preamble transmit power.

SUMMARY

Embodiments of the present disclosure provide a method and an apparatus for communication based on a frame structure.

Embodiments of the present disclosure provide a communication method and an apparatus based on a frame structure, and the frame structure to greatly increase scheduling flexibility and improve spectrum utilization while obtaining the advantages of the traditional time division duplex and frequency division duplex.

Embodiments of the present disclosure provide a method of determining a random access preamble transmit power.

In one embodiment, a communication method based on a frame structure is provided, wherein the frame structure comprises a control channel band, an anchor subband and a data transmission band, the communication method comprises the steps of:

detecting a synchronization signal block, performing downlink synchronization process according to the detected synchronization signal block, and determining time-frequency resources of the anchor subband;

acquiring random access configuration information according to the time-frequency resources of the anchor subband, performing random access process according to the random access configuration information, and completing uplink synchronization; and acquiring control information in the control channel band, and performing data communication with the base station in a data transmission band according to the control information.

Preferably, the step of acquiring the random access configuration information according to the time-frequency resources of the anchor subband comprises:

detecting a system information block on the anchor subband after detecting the first preset time interval of the synchronization signal block; and acquiring the random access configuration information carried in the detected system information block.

Preferably, the step of acquiring the random access configuration information according to the time-frequency resources of the anchor subband comprises:

determining the location of the anchor subband according to the result of the downlink synchronization process and acquiring a master information block carried by a broadcast channel in the synchronization signal block; and acquiring the random access configuration information carried in the master information block; or, determining a system information block according to the master information block, and acquiring the random access configuration information carried in the system information block.

Preferably, the step of determining the system information block according to the master information block may comprise:

detecting the system information block on the anchor subband after a first preset time interval.

Preferably, the step of determining the system information block according to the master information block may comprise:

acquiring the delay or time-domain index of the system information block indicated in the master information block;

determining the location of the time-frequency resource of the system information block according to the delay or the time-domain index; and determining the system information block in the anchor subband according to the location of the time-frequency resource.

Preferably, the system information block is transmitted in the anchor subband or the data transmission band.

Preferably, the step of performing a random access process according to the random access configuration information comprises:

transmitting a random access preamble sequence to a base station through an uplink anchor subband, according to the random access configuration information;

detecting a random access response on a downlink anchor subband;

transmitting message 3 on the uplink anchor subband if the random access response is detected; and detecting a contention resolution on a downlink anchor subband.

Preferably, the step of performing a random access process according to the random access configuration information comprises:

transmitting a random access preamble sequence to a base station through an uplink anchor subband, according to the random access configuration information;

detecting the control information of the uplink anchor subband used for transmitting the random access preamble sequence in a downlink control channel, and detecting and decoding random access response in a downlink data transmission band indicated by the control information;

transmitting message 3 in an uplink data transmission band if a random access response containing a preamble sequence identifier matching with the transmitted random access preamble sequence is detected; and detecting a contention resolution on the downlink data transmission band.

Preferably, the step of acquiring control information in a control channel band, and performing data communication with the base station in a data transmission band according to the control information comprises:

performing detection in a downlink control channel, and receiving downlink data in the corresponding downlink data transmission band according to the resource allocation indication carried in the downlink control information when detecting the downlink control information transmitted to itself; and transmitting a scheduling request in an uplink control channel, performing detection in the downlink control channel after a second preset time interval, and allocating uplink data in the corresponding uplink data transmission band according to the up resource allocation indication carried in the downlink control information when detecting the downlink control information transmitted to itself.

Preferably, the frame structure further comprises a guard band and/or guard time, and the method further comprises:

acquiring a configuration index of a guard band and/or guard time transmitted by the base station, and setting according to the configuration index to provide protection when performing data communication with the base station.

In another embodiment, a communication method based on the frame structure is provided. Wherein the frame structure comprises an anchor subband and a data transmission band, and the method comprises:

performing a random access process with a terminal according to random access configuration information transmitted by the terminal through an anchor subband; and performing data communication with the terminal in a data transmission band.

Preferably, the step of performing a random access process with a terminal according to random access configuration information transmitted by the terminal through an anchor subband comprises:

receiving random access configuration information, carrying a random access preamble sequence, transmitted by the terminal through an uplink anchor subband;

performing random access according to the random access preamble sequence, and transmitting a random access response;

detecting message 3 on the uplink anchor subband; and transmitting a contention resolution on a downlink anchor subband.

Preferably, the step of performing a random access process with a terminal according to random access configuration information transmitted by the terminal through an anchor subband comprises:

receiving random access configuration information, carrying a random access preamble sequence, transmitted by the terminal through an uplink anchor subband;

performing random access according to the random access preamble sequence, transmitting the control information of the uplink anchor subband used by the random access preamble sequence in a downlink control channel, and transmitting a random access response in a downlink data transmission band;

detecting message 3 in an uplink data transmission band; and transmitting a contention resolution on the downlink data transmission band.

Preferably, the step of performing data communication with the terminal in a data transmission band comprises:

transmitting downlink control information in a downlink control channel, so that the terminal detects the downlink control information in the downlink control channel; and receiving a scheduling request in an uplink control channel, and transmitting the downlink control information in the downlink control channel, so that the terminal detects the downlink control information in the downlink control channel.

Preferably, the frame structure further comprises a guard band and/or guard time, and the method further comprises:

transmitting a configuration index of a guard band and guard time, so that the terminal provides protection according to the configuration index when performing data communication.

In yet another embodiment, a communication apparatus based on the frame structure is provided, the present disclosure comprises a frame structure comprising a control channel band, an anchor subband and a data transmission band, and the apparatus comprises:

a downlink processing unit configured to detect a synchronization signal block, perform downlink synchronization process with a base station according to the detected synchronization signal block, and determine time-frequency resources of an anchor subband;

an uplink processing unit configured to acquire random access configuration information according to the time-frequency resources of the anchor subband, perform a random access process according to the random access configuration information, and complete uplink synchronization; and a communication unit configured to acquire control information in a control channel band, and perform data communication with the base station in a data transmission band.

In yet another embodiment, a communication apparatus based on the frame structure is provided, the present disclosure comprises a frame structure comprising an anchor subband and a data transmission band, and the apparatus comprises:

an uplink processing unit configured to perform a random access process with a terminal according to random access configuration information transmitted by the terminal through an anchor subband; and a communication unit configured to perform data communication with the terminal in a data transmission band.

In yet another embodiment, a frame structure applied to the above communication method based on frame structure is provided, wherein the frame structure comprises three bands, that is, a control channel band, an anchor subband and a data transmission band;

Wherein, downlink transmission contents carrying synchronization information blocks and/or uplink transmission contents carrying random access configuration information are comprised in the anchor subband;

the control channel band is used for transmitting an uplink control channel and/or a downlink control channel; and the data transmission band is used for transmitting uplink data and/or downlink data.

Preferably, the frame structure further comprises a guard band and/or guard time provided between bands to separate adjacent bands so as to provide protection during data communication.

For the future wireless communication systems, the present disclosure proposes a new method of determining a random access preamble transmit power. For each of new random access preamble formats determined based on new carrier ranges and subcarrier spacing sizes, new transmit power offsets are designed respectively. Based on this, corresponding signaling is designed according to indications of different carrier ranges and subcarrier spacing sizes to indicate the preamble transmit power offsets. Finally, the UE determines a final random access preamble transmit power based on the transmit power offset and other related parameters.

In one embodiment, a method of determining a random access preamble transmit power is provided. The method includes: obtaining random access configuration information from a base station, the random access configuration information including a random access configuration index and random access preamble subcarrier spacing indication information; obtaining a random access preamble format based on the random access configuration index and the random access preamble subcarrier spacing indication information; and determining a random access preamble transmit power offset corresponding to the obtained random access preamble format.

In another embodiment, the operation of determining the random access preamble transmit power offset corresponding to the obtained random access preamble format includes: determining the random access preamble transmit power offset corresponding to the obtained random access preamble format by querying a correspondence table including at least random access preamble formats and random access preamble transmit power offsets.

In yet another embodiment, the correspondence table further includes at least one of: random access preamble subcarrier spacing indication information, and a carrier range. The operation of determining the random access preamble transmit power offset corresponding to the obtained random access preamble format includes: determining the random access preamble transmit power offset corresponding to the obtained random access preamble format and at least one of the random access preamble subcarrier spacing indication information and the carrier range by querying the correspondence table.

In yet another embodiment, the correspondence table is predefined, and is stored locally at a UE.

In yet another embodiment, the correspondence table includes one of correspondence tables as follows:

| Random Access Preamble Format | DELTA_PREAMBLE |
|---|---|
| 0 | 0 dB |
| 1 | −3 dB |
| 2 | −6 dB |
| 3 | 0 dB |
| A1 (15 kHz) | 8 dB |
| A2 (15 kHz) | 5 dB |
| A3 (15 kHz) | 3 dB |
| B1 (15 kHz) | 8 dB |
| B4 (15 kHz) | 0 dB |
| A1/B1 (15 kHz) | 8 dB |
| A2/B2 (15 kHz) | 5 dB |
| A3/B3 (15 kHz) | 3 dB |
| C0 (15 kHz) | 11 dB |
| C2 (15 kHz) | 5 dB |
| A1 (30 kHz) | 11 dB |
| A2 (30 kHz) | 8 dB |
| A3 (30 kHz) | 6 dB |
| B1 (30 kHz) | 11 dB |
| B4 (30 kHz) | 3 dB |
| A1/B1 (30 kHz) | 11 dB |
| A2/B2 (30 kHz) | 8 dB |
| A3/B3 (30 kHz) | 6 dB |
| C0 (30 kHz) | 14 dB |
| C2 (30 kHz) | 8 dB |
| A1 (60 kHz) | 14 dB |
| A2 (60 kHz) | 11 dB |
| A3 (60 kHz) | 9 dB |
| B1 (60 kHz) | 14 dB |
| B4 (60 kHz) | 6 dB |
| A1/B1 (60 kHz) | 14 dB |
| A2/B2 (60 kHz) | 11 dB |
| A3/B3 (60 kHz) | 9 dB |
| C0 (60 kHz) | 17 dB |
| C2 (60 kHz) | 11 dB |
| A1 (120 kHz) | 17 dB |
| A2 (120 kHz) | 14 dB |
| A3 (120 kHz) | 12 dB |
| B1 (120 kHz) | 17 dB |
| B4 (120 kHz) | 9 dB |
| A1/B1 (120 kHz) | 17 dB |
| A2/B2 (120 kHz) | 14 dB |
| A3/B3 (120 kHz) | 12 dB |
| C0 (120 kHz) | 20 dB |
| C2 (120 kHz) | 14 dB; |

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |

-continued

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| A1 | 8 dB | 11 dB | 14 dB | 17 dB |
| A2 | 5 dB | 8 dB | 11 dB | 14 dB |
| A3 | 3 dB | 6 dB | 9 dB | 12 dB |
| B1 | 8 dB | 11 dB | 14 dB | 17 dB |
| B4 | 0 dB | 3 dB | 6 dB | 9 dB |
| A1/B1 | 8 dB | 11 dB | 14 dB | 17 dB |
| A2/B2 | 5 dB | 8 dB | 11 dB | 14 dB |
| A3/B3 | 3 dB | 6 dB | 9 dB | 12 dB |
| C0 | 11 dB | 14 dB | 17 dB | 20 dB |
| C2 | 5 dB | 8 dB | 11 dB | 14 dB; |

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 11 dB | 8 dB | 17 dB | 14 dB |
| A2 | 8 dB | 5 dB | 14 dB | 11 dB |
| A3 | 6 dB | 3 dB | 12 dB | 9 dB |
| B1 | 11 dB | 8 dB | 17 dB | 14 dB |
| B4 | 3 dB | 0 dB | 9 dB | 6 dB |
| A1/B1 | 11 dB | 8 dB | 17 dB | 14 dB |
| A2/B2 | 8 dB | 5 dB | 14 dB | 11 dB |
| A3/B3 | 6 dB | 3 dB | 12 dB | 9 dB |
| C0 | 14 dB | 11 dB | 20 dB | 17 dB |
| C2 | 8 dB | 5 dB | 14 dB | 11 dB; |

| Random Access Preamble Format | Msg1SCS = 0 | Msg1SCS = 1 |
|---|---|---|
| DELTA_PREAMBLE (Carrier Range <6 GHz) | | |
| 0 | 0 dB | |
| 1 | −3 dB | |
| 2 | −6 dB | |
| 3 | 0 dB | |
| A1 | 8 dB | 11 dB |
| A2 | 5 dB | 8 dB |
| A3 | 3 dB | 6 dB |
| B1 | 8 dB | 11 dB |
| B4 | 0 dB | 3 dB |
| A1/B1 | 8 dB | 11 dB |
| A2/B2 | 5 dB | 8 dB |
| A3/B3 | 3 dB | 6 dB |
| C0 | 11 dB | 14 dB |
| C2 | 5 dB | 8 dB |
| and | | |
| DELTA_PREAMBLE (Carrier Range >6 GHz) | | |
| A1 | 14 dB | 17 dB |
| A2 | 11 dB | 14 dB |
| A3 | 9 dB | 12 dB |
| B1 | 14 dB | 17 dB |
| B4 | 6 dB | 9 dB |
| A1/B1 | 14 dB | 17 dB |
| A2/B2 | 11 dB | 14 dB |
| A3/B3 | 9 dB | 12 dB |
| C0 | 17 dB | 20 dB |
| C2 | 11 dB | 14 dB; |

| Random Access Preamble Format | Msg1SCS = 0 | Msg1SCS = 1 |
|---|---|---|
| DELTA_PREAMBLE (Carrier Range <6 GHz) | | |
| 0 | 0 dB | |
| 1 | −3 dB | |
| 2 | −6 dB | |
| 3 | 0 dB | |
| A1 | 11 dB | 8 dB |
| A2 | 8 dB | 5 dB |
| A3 | 6 dB | 3 dB |
| B1 | 11 dB | 8 dB |
| B4 | 3 dB | 0 dB |
| A1/B1 | 11 dB | 8 dB |
| A2/B2 | 8 dB | 5 dB |
| A3/B3 | 6 dB | 3 dB |
| C0 | 14 dB | 11 dB |
| C2 | 8 dB | 5 dB |
| and | | |
| DELTA_PREAMBLE (Carrier Range >6 GHz) | | |
| A1 | 17 dB | 14 dB |
| A2 | 14 dB | 11 dB |
| A3 | 12 dB | 9 dB |
| B1 | 17 dB | 14 dB |
| B4 | 9 dB | 6 dB |
| A1/B1 | 17 dB | 14 dB |
| A2/B2 | 14 dB | 11 dB |
| A3/B3 | 12 dB | 9 dB |
| C0 | 20 dB | 17 dB |
| C2 | 14 dB | 11 dB; |

| Random Access Preamble Format | DELTA_PREAMBLE |
|---|---|
| 0 | 0 dB |
| 1 | −3 dB |
| 2 | −6 dB |
| 3 | 0 dB |
| A1 | $8 + 3 \cdot \mu$ dB |
| A2 | $5 + 3 \cdot \mu$ dB |
| A3 | $3 + 3 \cdot \mu$ dB |
| B1 | $8 + 3 \cdot \mu$ dB |
| B4 | $3 \cdot \mu$ dB |
| A1/B1 | $8 + 3 \cdot \mu$ dB |
| A2/B2 | $5 + 3 \cdot \mu$ dB |
| A3/B3 | $3 + 3 \cdot \mu$ dB |
| C0 | $11 + 3 \cdot \mu$ dB |
| C2 | $5 + 3 \cdot \mu$ dB; |

| Random Access Preamble Format | DELTA_PREAMBLE |
|---|---|
| 0 | 0 dB |
| 1 | −3 dB |
| 2 | −6 dB |
| 3 | 0 dB |
| and | |
| A1 | $8 + 3 \cdot \mu$ dB |
| A2 | $5 + 3 \cdot \mu$ dB |
| A3 | $3 + 3 \cdot \mu$ dB |
| B1 | $8 + 3 \cdot \mu$ dB |
| B4 | $3 \cdot \mu$ dB |
| A1/B1 | $8 + 3 \cdot \mu$ dB |
| A2/B2 | $5 + 3 \cdot \mu$ dB |
| A3/B3 | $3 + 3 \cdot \mu$ dB |
| C0 | $11 + 3 \cdot \mu$ dB; |
| C2 | $5 + 3 \cdot \mu$ dB |

| Random Access Preamble Format | DELTA_PREAMBLE |
|---|---|
| 0 | 0 dB |
| 1 | −3 dB |
| 2 | −6 dB |
| 3 | 0 dB |
| A1, B1, A1/B1 | 8 + 3 · μdB |
| A2, A2/B2 | 5 + 3 · μdB |
| A3, A3/B3 | 3 + 3 · μdB |
| B4 | 3 · μdB |
| C0 | 11 + 3 · μdB |
| C2 | 5 + 3 · μdB; |

| Random Access Preamble Format | DELTA_PREAMBLE |
|---|---|
| 0 | 0 dB |
| 1 | −3 dB |
| 2 | −6 dB |
| 3 and | 0 dB |
| A1, B1, A1/B1 | 8 + 3 · μdB |
| A2, A2/B2 | 5 + 3 · μdB |
| A3, A3/B3 | 3 + 3 · μdB |
| B4 | 3 · μdB |
| C0 | 11 + 3 · μdB |
| C2 | 5 + 3 · μdB | wherein DELTA_PREAMBLE refers to a random access preamble transmit power offset, Msg1SCS refers to random access preamble subcarrier spacing indication information, 0, 1, 2, 3, A1, A2, A3, B1, B4, A1/B1, A2/B2, A3/B3, C0, C2 refer to defined random access preamble formats, 15 kHz, 30 kHz, 60 kHz, 120 kHz are random access preamble subcarrier spacing, μ is a parameter indicating a random access preamble subcarrier spacing, wherein the random access preamble subcarrier spacing is 15 kHz when μ=0; the random access preamble subcarrier spacing is 30 kHz when μ=1; the random access preamble subcarrier spacing is 60 kHz when μ=2; and the random access preamble subcarrier spacing is 120 kHz when μ=3.

In yet another embodiment, a method of determining a random access preamble transmit power is provided. The method includes: generating random access configuration information, the random access configuration information including a random access configuration index and random access preamble subcarrier spacing indication information; and transmitting the random access configuration information to a UE.

In yet another embodiment, the random access configuration index and the random access preamble subcarrier spacing indication information are used by the UE to obtain a random access preamble format, and to determine a random access preamble transmit power offset corresponding to the obtained random access preamble format.

In yet another embodiment, a UE is provided. The UE includes: a communication interface, configured for communication; a processor; and a memory storing computer-executable instructions which, when executed by the processor, cause the processor to: obtain random access configuration information from a base station, the random access configuration information including a random access configuration index and random access preamble subcarrier spacing indication information; obtain a random access preamble format based on the random access configuration index and the random access preamble subcarrier spacing indication information; and determine a random access preamble transmit power offset corresponding to the obtained random access preamble format.

In yet another embodiment, the operation of determining the random access preamble transmit power offset corresponding to the obtained random access preamble format includes: determining a random access preamble transmit power offset corresponding to the obtained random access preamble format by querying a correspondence table including at least random access preamble formats and random access preamble transmit power offsets.

In yet another embodiment, the correspondence table further includes at least one of: random access preamble subcarrier spacing indication information, and a carrier range. The operation of determining the random access preamble transmit power offset corresponding to the obtained random access preamble format includes: determining the random access preamble transmit power offset corresponding to the obtained random access preamble format and at least one of the random access preamble subcarrier spacing indication information and the carrier range by querying the correspondence table.

In yet another embodiment, the correspondence table is predefined, and is stored locally at the UE.

In yet another embodiment, a base station is provided. The base station includes: a communication interface, configured for communication; a processor; and a memory storing computer-executable instructions which, when executed by the processor, cause the processor to: generate random access configuration information, the random access configuration information including a random access configuration index and random access preamble subcarrier spacing indication information; and transmit the random access configuration information to a UE.

In yet another embodiment, the random access configuration index and the random access preamble subcarrier spacing indication information are used by the UE to obtain a random access preamble format, and to determine a random access preamble transmit power offset corresponding to the obtained random access preamble format.

In yet another embodiment, a computer-readable medium is provided. The computer-readable medium has stored thereon instructions which, when executed by a processor, cause the processor to perform the method as described above.

Advantageous Effects of Invention

A method and an apparatus according to various embodiments of the present disclosure describe that greatly increasing scheduling flexibility and improving spectrum utilization are achieved meanwhile the advantages of the traditional time division duplex and frequency division duplex are obtained.

A method and an apparatus according to various embodiments of the present disclosures describe that determining a random access preamble transmit power proposed in the present disclosure is applicable to all of preamble formats in the future wireless communication systems, and may efficiently adjust the preamble transmit power in the random access process, and improve the success probability of the UE's random access in a case of controlling interference, significantly improve the performance of the future wireless communication systems, and provide the UE with a lower access delay and a better access experience.

BRIEF DESCRIPTION OF THE DRAWINGS

For a more complete understanding of this disclosure and its advantages, reference is now made to the following description, taken in conjunction with the accompanying drawings, in which:

FIG. 1 illustrates a wireless communication system according to various embodiments of the present disclosure;

FIG. 2 illustrates the BS in the wireless communication system according to various embodiments of the present disclosure;

FIG. 3 illustrates the terminal in the wireless communication system according to various embodiments of the present disclosure;

FIG. 4 illustrates the communication interface in the wireless communication system according to various embodiments of the present disclosure;

FIG. 5 illustrates a schematic diagram of an FDD frame structure in the prior art;

FIG. 6 illustrates a schematic diagram of an TDD frame structure in the prior art;

FIG. 7 illustrates a frame structure according to various embodiments of the present disclosure;

FIG. 8 illustrates a flowchart of a communication method based on a frame structure at a terminal side according to various embodiments of the present disclosure;

FIG. 9 illustrates a flowchart of a communication method based on a frame structure at a base station side according to various embodiments of the present disclosure;

FIG. 10 illustrates a schematic diagram of a channel structure adopted in the first embodiment of the present disclosure;

FIG. 11A illustrates a schematic diagram of a transmission mode of a system information block according to various embodiments of the present disclosure;

FIG. 11B illustrates a schematic diagram of another transmission mode of a system information block according to various embodiments of the present disclosure;

FIG. 12 illustrates a schematic diagram of a control channel according to various embodiments of the present disclosure;

FIG. 13 illustrates a schematic diagram of an anchor subband structure according to various embodiments of the present disclosure;

FIG. 14 illustrates a schematic flowchart of uplink data communication according to various embodiments of the present disclosure;

FIG. 15 illustrates a schematic diagram of timing division in uplink and downlink data transmission according to various embodiments of the present disclosure;

FIG. 16 illustrates a schematic diagram of a channel structure according to Embodiment 3 of the present disclosure;

FIG. 17 illustrates a schematic diagram of another channel structure according to Embodiment 3 of the present disclosure;

FIG. 18 illustrates a schematic diagram of a structure of a communication apparatus based on frame structure at a terminal side according to various embodiments of the present disclosure;

FIG. 19 illustrates a schematic diagram of a structure of a communication apparatus based on frame structure at a base station side according to various embodiments of the present disclosure.

FIG. 20 schematically illustrates an exemplary wireless communication system according to various embodiments of the present disclosure;

FIG. 21 schematically illustrates a flowchart of a method of determining a random access preamble transmit power performed at a base station according to various embodiments of the present disclosure;

FIG. 22 schematically illustrates a structural schematic diagram of a base station according to various embodiments of the present disclosure;

FIG. 23 schematically illustrates a flowchart of a method of determining a random access preamble transmit power performed at a UE according to various embodiments of the present disclosure; and FIG. 24 schematically illustrates a structural schematic diagram of a UE according to various embodiments of the present disclosure.

DETAILED DESCRIPTION

The present disclosure provides a communication method and a communication apparatus based on a frame structure, and the frame structure. The specific embodiments of the present disclosure will be described in detail below with reference to the accompanying drawings.

Embodiments of the present disclosure will be described in detail hereinafter. The examples of these embodiments have been illustrated in the accompanying drawings throughout which same or similar reference numerals refer to same or similar elements or elements having same or similar functions. The embodiments described with reference to the accompanying drawings are illustrative, merely used for explaining the present disclosure and should not be regarded as any limitations thereto.

It can be understood by those skilled in the art, the singular forms "a", "an", "said" and "the" are intended to comprise the plural forms as well, unless expressly stated otherwise. It will be further understood that the term "comprising" when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may comprise wirelessly connected or coupled. As used herein, the term "and/or" comprises any and all combinations of one or more of the associated listed items.

It should be understood by one person of ordinary skill in the art that, unless otherwise defined, all terms (including technical and scientific terms) used herein have the same meaning as commonly understood by one person of ordinary skill in the art to which the present disclosure belongs. It should be further understood that terms, such as those defined in commonly used dictionaries, should be interpreted as having a meaning that is consistent with their meanings in the context of the prior art and will not be interpreted in an idealized or overly formal sense unless expressly so defined herein.

The skilled in the art may understand that the "terminal" and "terminal device" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices. In addition, "terminal" and "terminal device" may also be replaced with "user" and "UE".

Hereinafter, in various embodiments of the present disclosure, hardware approaches will be described as an example. However, various embodiments of the present disclosure include a technology that uses both hardware and software and thus, the various embodiments of the present disclosure may not exclude the perspective of software.

Hereinafter, the present disclosure describes technology for communication based on a frame structure in a wireless communication system, and determining random access preamble transmit power, a user equipment (UE), a base station and a computer readable medium related thereto.

The terms referring to synchronization signal block, the terms referring to random access configuration information, the terms referring to random access process, the terms referring to control information, the terms referring to a signal, the terms referring to a channel, the terms referring to control information, the terms referring to a network entity, and the terms referring to elements of a device used in the following description are used only for convenience of the description. Accordingly, the present disclosure is not limited to the following terms, and other terms having the same technical meaning may be used.

Further, although the present disclosure describes various embodiments based on the terms used in some communication standards (for example, 3rd Generation Partnership Project (3GPP)), they are only examples for the description. Various embodiments of the present disclosure may be easily modified and applied to other communication systems.

FIG. 1 illustrates a wireless communication system according to various embodiments of the present disclosure. In FIG. 1, a base station (BS) 110, a terminal 120, and a terminal 130 are illustrated as the part of nodes using a wireless channel in a wireless communication system. FIG. 1 illustrates only one BS, but another BS, which is the same as or similar to the BS 110, may be further included.

The BS 110 is network infrastructure that provides wireless access to the terminals 120 and 130. The BS 110 has coverage defined as a predetermined geographical region based on the distance at which a signal can be transmitted. The BS 110 may be referred to as "access point (AP)," "eNodeB (eNB)," "5th generation (5G) node," "wireless point," "transmission/reception Point (TRP)" as well as "base station."

Each of the terminals 120 and 130 is a device used by a user, and performs communication with the BS 110 through a wireless channel. Depending on the case, at least one of the terminals 120 and 130 may operate without user involvement. That is, at least one of the terminals 120 and 130 is a device that performs machine-type communication (MTC) and may not be carried by the user. Each of the terminals 120 and 130 may be referred to as "user equipment (UE)," "mobile station," "subscriber station," "remote terminal," "wireless terminal," or "user device" as well as "terminal."

The BS 110, the terminal 120, and the terminal 130 may transmit and receive wireless signals in millimeter wave (mmWave) bands (for example, 28 GHz, 30 GHz, 38 GHz, and 60 GHz). At this time, in order to improve a channel gain, the BS 110, the terminal 120, and the terminal 130 may perform beamforming. The beamforming may include transmission beamforming and reception beamforming. That is, the BS 110, the terminal 120, and the terminal 130 may assign directivity to a transmission signal and a reception signal. To this end, the BS 110 and the terminals 120 and 130 may select serving beams 112, 113, 121, and 131 through a beam search procedure or a beam management procedure. After that, communications may be performed using resources having a quasi co-located relationship with resources carrying the serving beams 112, 113, 121, and 131.

A first antenna port and a second antenna ports are considered to be quasi co-located if the large-scale properties of the channel over which a symbol on the first antenna port is conveyed can be inferred from the channel over which a symbol on the second antenna port is conveyed. The large-scale properties may include one or more of delay spread, doppler spread, doppler shift, average gain, average delay, and spatial Rx parameters.

FIG. 2 illustrates the BS in the wireless communication system according to various embodiments of the present disclosure. A structure exemplified at FIG. 2 may be understood as a structure of the BS 110. The term "-module", "-unit" or "-er" used hereinafter may refer to the unit for processing at least one function or operation and may be implemented in hardware, software, or a combination of hardware and software.

Referring to FIG. 2, the BS may include a wireless communication interface 210, a backhaul communication interface 220, a storage unit 230, and a controller 240.

The wireless communication interface 210 performs functions for transmitting and receiving signals through a wireless channel. For example, the wireless communication interface 210 may perform a function of conversion between a baseband signal and bitstreams according to a physical layer standard of the system. For example, in data transmission, the wireless communication interface 210 generates complex symbols by encoding and modulating transmission bitstreams. Further, in data reception, the wireless communication interface 210 reconstructs reception bitstreams by demodulating and decoding the baseband signal.

In addition, the wireless communication interface 210 up-converts the baseband signal into an Radio Frequency (RF) band signal, transmits the converted signal through an antenna, and then down-converts the RF band signal received through the antenna into the baseband signal. To this end, the wireless communication interface 210 may include a transmission filter, a reception filter, an amplifier, a mixer, an oscillator, a digital-to-analog convertor (DAC), an analog-to-digital convertor (ADC), and the like. Further, the wireless communication interface 210 may include a plurality of transmission/reception paths. In addition, the wireless communication interface 210 may include at least one antenna array consisting of a plurality of antenna elements.

On the hardware side, the wireless communication interface 210 may include a digital unit and an analog unit, and the analog unit may include a plurality of sub-units according to operation power, operation frequency, and the like. The digital unit may be implemented as at least one processor (e.g., a digital signal processor (DSP)).

The wireless communication interface 210 transmits and receives the signal as described above. Accordingly, the wireless communication interface 210 may be referred to as a "transmitter" a "receiver," or a "transceiver." Further, in the following description, transmission and reception performed through the wireless channel may be used to have a meaning including the processing performed by the wireless communication interface 210 as described above.

The backhaul communication interface 220 provides an interface for performing communication with other nodes within the network. That is, the backhaul communication interface 220 converts bitstreams transmitted to another node, for example, another access node, another BS, a higher node, or a core network, from the BS into a physical signal and converts the physical signal received from the other node into the bitstreams.

The storage unit 230 stores a basic program, an application, and data such as setting information for the operation of the BS 110. The storage unit 230 may include a volatile memory, a non-volatile memory, or a combination of volatile memory and non-volatile memory. Further, the storage unit 230 provides stored data in response to a request from the controller 240.

The controller 240 controls the general operation of the BS. For example, the controller 240 transmits and receives a signal through the wireless communication interface 210 or the backhaul communication interface 220. Further, the controller 240 records data in the storage unit 230 and reads the recorded data. The controller 240 may performs functions of a protocol stack that is required from a communication standard. According to another implementation, the protocol stack may be included in the wireless communication interface 210. To this end, the controller 240 may include at least one processor. According to various embodiments, the controller 240 may include a command/code temporarily resided in the controller 240, a storage space that stores the command/code, or a part of circuitry of the controller 240.

According to exemplary embodiments of the present disclosure, the controller 240 may detect a synchronization signal block, perform downlink synchronization process according to the detected synchronization signal block, and determine time-frequency resources of an anchor subband, acquire random access configuration information according to the time-frequency resources of the anchor subband, perform a random access process according to the random access configuration information, and complete uplink synchronization, and acquire control information in a control channel band, and performing data communication with a base station in the data transmission band according to the control information. For example, the controller 240 may control the base station to perform operations according to the exemplary embodiments of the present disclosure.

FIG. 3 illustrates the terminal in the wireless communication system according to various embodiments of the present disclosure. A structure exemplified at FIG. 3 may be understood as a structure of the terminal 120 or the terminal 130. The term "-module", "-unit" or "-er" used hereinafter may refer to the unit for processing at least one function or operation, and may be implemented in hardware, software, or a combination of hardware and software.

Referring to FIG. 3, the terminal 120 includes a communication interface 310, a storage unit 320, and a controller 330.

The communication interface 310 performs functions for transmitting/receiving a signal through a wireless channel. For example, the communication interface 310 performs a function of conversion between a baseband signal and bitstreams according to the physical layer standard of the system. For example, in data transmission, the communication interface 310 generates complex symbols by encoding and modulating transmission bitstreams. Also, in data reception, the communication interface 310 reconstructs reception bitstreams by demodulating and decoding the baseband signal. In addition, the communication interface 310 up-converts the baseband signal into an RF band signal, transmits the converted signal through an antenna, and then down-converts the RF band signal received through the antenna into the baseband signal. For example, the communication interface 310 may include a transmission filter, a reception filter, an amplifier, a mixer, an oscillator, a DAC, and an ADC.

Further, the communication interface 310 may include a plurality of transmission/reception paths. In addition, the communication interface 310 may include at least one antenna array consisting of a plurality of antenna elements. In the hardware side, the wireless communication interface 210 may include a digital circuit and an analog circuit (for example, a radio frequency integrated circuit (RFIC)). The digital circuit and the analog circuit may be implemented as one package. The digital circuit may be implemented as at least one processor (e.g., a DSP). The communication interface 310 may include a plurality of RF chains. The communication interface 310 may perform beamforming.

The communication interface 310 transmits and receives the signal as described above. Accordingly, the communication interface 310 may be referred to as a "transmitter," a "receiver," or a "transceiver." Further, in the following description, transmission and reception performed through the wireless channel is used to have a meaning including the processing performed by the communication interface 310 as described above.

The storage unit 320 stores a basic program, an application, and data such as setting information for the operation of the terminal 120. The storage unit 320 may include a volatile memory, a non-volatile memory, or a combination of volatile memory and non-volatile memory. Further, the storage unit 320 provides stored data in response to a request from the controller 330.

The controller 330 controls the general operation of the terminal 120. For example, the controller 330 transmits and receives a signal through the communication interface 310. Further, the controller 330 records data in the storage unit 320 and reads the recorded data. The controller 330 may performs functions of a protocol stack that is required from a communication standard. According to another implementation, the protocol stack may be included in the communication interface 310. To this end, the controller 330 may include at least one processor or microprocessor, or may play the part of the processor. Further, the part of the communication interface 310 or the controller 330 may be referred to as a communication processor (CP). According to various embodiments, the controller 330 may include a command/code temporarily resided in the controller 330, a storage space that stores the command/code, or a part of circuitry of the controller 330.

According to exemplary embodiments of the present disclosure, the controller 330 may detect a synchronization signal block, perform downlink synchronization process according to the detected synchronization signal block, and determine time-frequency resources of an anchor subband, acquire random access configuration information according to the time-frequency resources of the anchor subband, perform a random access process according to the random access configuration information, and complete uplink synchronization, and acquire control information in a control channel band, and performing data communication with a base station in the data transmission band according to the control information. For example, the controller 330 may control the terminal to perform operations according to the exemplary embodiments of the present disclosure.

FIG. 4 illustrates the communication interface in the wireless communication system according to various embodiments of the present disclosure. FIG. 4 shows an example for the detailed configuration of the communication interface 210 of FIG. 2 or the communication interface 310 of FIG. 3. More specifically, FIG. 4 shows elements for performing beamforming as part of the communication interface 210 of FIG. 2 or the communication interface 310 of FIG. 3.

Referring to FIG. 4, the communication interface 210 or 310 includes an encoding and circuitry 402, a digital circuitry 404, a plurality of transmission paths 406-1 to 406-N, and an analog circuitry 408.

The encoding and circuitry 402 performs channel encoding. For the channel encoding, at least one of a low-density parity check (LDPC) code, a convolution code, and a polar code may be used. The encoding and circuitry 402 generates modulation symbols by performing constellation mapping.

The digital circuitry 404 performs beamforming for a digital signal (for example, modulation symbols). To this end, the digital circuitry 404 multiples the modulation symbols by beamforming weighted values. The beamforming weighted values may be used for changing the size and phrase of the signal, and may be referred to as a "precoding matrix" or a "precoder." The digital circuitry 404 outputs the digitally beamformed modulation symbols to the plurality of transmission paths 406-1 to 406-N. At this time, according to a multiple input multiple output (MIMO) transmission scheme, the modulation symbols may be multiplexed, or the same modulation symbols may be provided to the plurality of transmission paths 406-1 to 406-N.

The plurality of transmission paths 406-1 to 406-N convert the digitally beamformed digital signals into analog signals. To this end, each of the plurality of transmission paths 406-1 to 406-N may include an inverse fast Fourier transform (IFFT) calculation unit, a cyclic prefix (CP) insertion unit, a DAC, and an up-conversion unit. The CP insertion unit is for an orthogonal frequency division multiplexing (OFDM) scheme, and may be omitted when another physical layer scheme (for example, a filter bank multi-carrier: FBMC) is applied. That is, the plurality of transmission paths 406-1 to 406-N provide independent signal processing processes for a plurality of streams generated through the digital beamforming. However, depending on the implementation, some of the elements of the plurality of transmission paths 406-1 to 406-N may be used in common.

The analog circuitry 408 performs beamforming for analog signals. To this end, the digital circuitry 404 multiples the analog signals by beamforming weighted values. The beamformed weighted values are used for changing the size and phrase of the signal. More specifically, according to a connection structure between the plurality of transmission paths 406-1 to 406-N and antennas, the analog circuitry 408 may be configured in various ways. For example, each of the plurality of transmission paths 406-1 to 406-N may be connected to one antenna array. In another example, the plurality of transmission paths 406-1 to 406-N may be connected to one antenna array. In still another example, the plurality of transmission paths 406-1 to 406-N may be adaptively connected to one antenna array, or may be connected to two or more antenna arrays.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

In the present disclosure, a communication method based on a frame structure is provided, which comprises the following steps:

Step 1: downlink synchronization: a terminal completes downlink synchronization through a downlink synchronization process, and reads a downlink transmission part of an anchor subband to obtain a system bandwidth and a bandwidth structure, so as to determine information such as the location and time structure of the anchor subband, the location of an uplink control channel and a downlink control channel, and bandwidth of a guard band.

Step 2: uplink random access: the terminal transmits a preamble sequence through the uplink transmission part in the anchor subband to complete the random access process.

Step 3: after completing the access process, the terminal communicates with the base station in a corresponding band.

In the above communication method, the frame structure as shown in FIG. 7 is adopted, which consists of four parts of frequency bands: a control channel band close to the band edge, an anchor subband at the center of the band, a data transmission band and a guard band.

Wherein, the transmission content in the anchor subband at the center of the band is fixed. The transmission content comprises downlink transmission content necessary for an access system such as a downlink synchronization signal, downlink broadcast channel, and uplink transmission content necessary for a access system such as a random access channel.

The control channel band transmits the uplink control channel and the downlink control channel in a frequency-division mode or a time-division mode.

The data transmission band transmits uplink/downlink data in a frequency-division mode, a time-division mode or a Multi-carrier Division Duplexing (MDD) mode.

At the same time, a guard band and/or guard time are inserted between adjacent bands to ensure low interference between adjacent bands and to ensure the reliability of data transmission on the control channel and the anchor subband.

Based on the foregoing communication method and the frame structure in FIG. 7, the communication method based on frame structure provided in the present disclosure is mainly described based on the terminal side and the base station side, respectively.

As shown in FIG. 8, a communication method based on frame structure provided by the present disclosure comprises the following steps:

Step 801: detecting a synchronization signal block, performing downlink synchronization processing with a base station according to the detected synchronization signal block, and determining time-frequency resources of an anchor subband.

Step 802: acquiring random access configuration information according to the time-frequency resources of the anchor subband, performing a random access process according to the random access configuration information, and completing uplink synchronization.

In this step, the step of acquiring random access configuration information according to the time-frequency resources of the anchor subband comprises:

detecting a system information block on the anchor subband after detecting the first preset time interval of the synchronization signal block; and acquiring the random access configuration information carried in the detected system information block.

Or, the step of acquiring random access configuration information according to the time-frequency resources of the anchor subband may further comprises:

determining the location of the anchor subband according to the result of the downlink synchronous processing, and acquiring a master information block carried by a broadcast channel in the synchronization signal block; and acquiring the random access configuration information carried in the master information block.

Or, the step of acquiring random access configuration information according to the time-frequency resources of the anchor subband may further comprises:

determining the location of the anchor subband according to the result of the downlink synchronous processing, and acquiring a master information block carried by a broadcast channel in the synchronization signal block; and determining a system information block according to the master information block, and acquiring random access configuration information carried in the system information block.

In the above step, the step of determining a system information block according to the master information block may comprise:

acquiring the time-domain index of the system information block indicated in the master information block;

determining the location of the time-frequency resource of the system information block according to the time-domain index; and determining the system information block in the anchor subband according to the location of the time-frequency resource.

Wherein, the system information block is transmitted in the anchor subband or data transmission band. In this step, the step of performing a random access process according to the random access configuration information comprises:

transmitting a random access preamble sequence to a base station through an uplink anchor subband, according to the random access configuration information;

transmitting message 3 on the uplink anchor subband if detecting the random access response; and detecting a contention resolution on a downlink anchor subband.

Or, the step of performing a random access process according to the random access configuration information comprises:

transmitting a random access preamble sequence to a base station through an uplink anchor subband, according to the random access configuration information;

detecting the control information of the uplink anchor subband used for transmitting the random access preamble sequence in a downlink control channel, and detecting and decoding random access response in a downlink data transmission band indicated by the control information;

transmitting message 3 in an uplink data transmission band if a random access response containing a preamble sequence identifier matching with the transmitted random access preamble sequence is detected; and detecting a contention resolution on the downlink data transmission band.

Step 803: acquiring control information in a control channel band, and performing data communication with the base station in a data transmission frequency band.

In this step, the step of acquiring control information in a control channel band, and performing data communication with the base station in a data transmission frequency band according to the control information comprises two parts, i.e., uplink data communication and downlink data communication;

wherein, detecting in a downlink control channel, and receiving downlink data in the corresponding downlink data transmission band according to the resource allocation indication carried in the downlink control information when detecting the downlink control information transmitted to itself; and transmitting a scheduling request in an uplink control channel, detecting in the downlink control channel after a second preset time interval, and allocating uplink data in the corresponding uplink data transmission band according to the uplink resource allocation indication carried in the downlink control information when detecting the downlink control information transmitted to itself.

Wherein, the method further comprises:

acquiring a configuration index of a guard band and/or guard time transmitted by the base station, and setting according to the configuration index to provide protection when performing data communication with the base station.

The present disclosure further provides a communication method based on the frame structure. As shown in FIG. 9, the method comprises:

Step 901: performing a random access process with a terminal according to random access configuration information transmitted by the terminal through an anchor subband.

Wherein, the step of performing a random access process with a terminal according to random access configuration information transmitted by the terminal through an anchor subband comprises:

receiving random access configuration information, carrying a random access preamble sequence, transmitted by the terminal through an uplink anchor subband;

performing random access process according to the random access preamble sequence, and transmitting a random access response;

detecting message 3 on the uplink anchor subband; and transmitting a contention resolution on a downlink anchor subband.

Or, the step of performing a random access process with a terminal according to random access configuration information transmitted by the terminal through an anchor subband comprises:

receiving random access configuration information, carrying a random access preamble sequence, transmitted by the terminal through an uplink anchor subband;

performing random access process according to the random access preamble sequence, transmitting the control information of the uplink anchor subband used by the random access preamble sequence in a downlink control channel, and transmitting a random access response in a downlink data transmission band;

detecting message 3 in an uplink data transmission band; and transmitting a contention resolution on the downlink data transmission band.

Step 902: performing data communication with the terminal in a data transmission band.

In this step, the step of performing data communication with the terminal in a data transmission band comprises two parts, i.e., uplink data communication and downlink data communication; wherein, transmitting downlink control information in a downlink control channel, so that the terminal detects the downlink control information in the downlink control channel;

receiving a scheduling request in an uplink control channel, and transmitting the downlink control information in the downlink control channel, so that the terminal detects the downlink control information in the downlink control channel.

Wherein, the method further comprises:

transmitting a configuration index of a guard band and/or guard time, so that the terminal provides protection according to the configuration index when performing data communication.

The present disclosure further provides a frame structure applied in the above-mentioned communication method based on the frame structure, where the frame structure comprises three bands, i.e., a control channel band, an anchor subband and a data transmission band;

Wherein, downlink transmission contents carrying synchronization information blocks and/or uplink transmission contents carrying random access configuration information are comprised in the anchor subband;

the control channel band is used for transmitting an uplink control channel and/or a downlink control channel; and the data transmission band is used for transmitting uplink data and/or downlink data.

Preferably, the frame structure further comprises a guard band and/or guard time provided between bands to separate adjacent bands so as to provide protection during data communication.

With respect to the communication method based on the frame structure provided by the present disclosure, the communication method is specifically described in the following three specific embodiments.

Embodiment 1

In this embodiment, a communication method based on the frame structure is introduced in combination with a specific system. The channel frame structure adopted in this embodiment is as shown in FIG. 10, which is a composition of one radio frame. In this embodiment, one radio frame consists of a plurality of subframes, each subframe consists of a plurality of symbols, one symbol comprises a plurality of subcarriers, and the subcarriers are divided into different subbands according to functions. In FIG. 10, these subbands are divided according to functions into: control channel 1 and control channel 2 located at a band edge, which respectively represents an uplink control channel and a downlink control channel, or a downlink control channel and an uplink control channel; an anchor subband located at the center of the band, which is used for transmitting uplink and downlink data necessary for accessing the system; a data channel located between a control channel and the anchor subband, which is used for transmitting uplink data and downlink data; and a guard band located between the subbands.

Wherein, the anchor subband performs switch between a downlink channel and an uplink channel in unit of a subframe or a subframe group composed of a plurality of subframes. The downlink channel in the anchor subband is used for transmitting a broadcast channel, a synchronization signal and so on, for example, which comprises a Primary Synchronization Signal (PSS), a secondary synchronization signal (SSS), and a synchronization signal block composed of broadcast channels. The uplink channel in the anchor subband is used for transmitting a random access channel and the like. One possible way is that the anchor subbands of some fixed subframes are dedicated for transmitting a downlink synchronization signal block. Taking a radio frame containing 7 subframes (each subframe is named as subframe 0 to subframe 6 respectively) as an example, subframe 0 is fixed for transmitting a downlink anchor subband, or subframes 0 and 4 are fixed for transmitting a downlink anchor subband, and anchor subbands of the other subframes are determined according to configuration. A simple example is that the transmission directions of the other subframes are informed in a broadcast channel.

The control channel is located at the band edge, one side is the downlink control channel, and the other side is the uplink control channel. Using frequency hopping, the downlink/uplink control channel alternately appears at the band edge. For example, the downlink control channel of the even index of subframes is at the upper edge of the band and the uplink control channel is at the lower edge of the band; while the downlink control channel of the odd index of the subframes is at the lower edge of the band and the uplink control channel is at the upper edge of the band. The frequency hopping mode, that is, the location where the uplink/downlink control channel is located is configured by higher layer signaling or is notified by the downlink control channel.

The data channel is located between the anchor subband and the control channel, and uplink data transmission and downlink data transmission are distinguished by adopting time-division or subband frequency-division for dividing uplink and downlink, or adopting division of a subcarrier level.

A guard band is added between different channels to prevent inter-band interference or uplink-downlink crosstalk. During switch between uplink and downlink in the same subband, guard time is added for protecting the switch between uplink and downlink.

Processes of terminal for accessing network and data communication are:

1. The terminal performs downlink synchronization. That is, the terminal detects the synchronization signal block by blind detection. After detecting the synchronization signal block, the terminal can complete the time and frequency domain synchronization to determine the location of the anchor subband. The terminal reads the master information block from the broadcast channel. The information read from the master information block should comprise the system bandwidth and the location of the time-frequency resources of the system information block. The terminal reads other information necessary for access from the system information block indicated by the master information block, including the transmission time location of the uplink part on the anchor subband, the random access channel configuration information, the configuration information of the random access preamble resource pool, and bandwidth of each subband, i.e., time-frequency resource location.

It should be noted that the foregoing system information block indicated by the master information block may be located on the downlink anchor subband, for example, time delayed by a fixed time sequence than the synchronization signal block. In this case, the master information block does not need to indicate the time-frequency location of the system information block, and after detecting the synchronization signal block, the terminal detects the system information block on the downlink anchor subband after a fixed or preset time; Or, the master information block only informs the delay of the system information block with respect to the synchronization signal block or time-domain index, and the terminal determines the location of the system information block according to the delay or time domain index.

In another way, the system information block indicated by the master information block is located on the data channel, and the master information block needs to indicate the time-frequency resource location of the system information block. After reading the master information block, the terminal reads the time-frequency resource location of the system information block and reads the system information block at the time-frequency resource location. The above two ways are shown in FIG. 11A and FIG. 11B.

The terminal determines a location of each sub-band, a bandwidth and a bandwidth of a guard band through the content of the system information block. One possible way is to notify the control channel bandwidth at the edge of the band and the switch point of the downlink/uplink control channel in the radio frame/subframe, in the system information block. For example, the terminal is aware of the number of physical resource blocks in the system through the system bandwidth in the master information block. Then, the terminal is aware of the number of physical resource blocks required for the downlink/uplink control channel according to the bandwidth of the downlink control channel/uplink control channel, and obtains a time-frequency structure of a control subband located at the band edge through the switch point information.

A simple example is as follows: assuming that a downlink control channel is transmitted in a control subband, of a first subframe of a radio frame located at the upper edge of a band; while an uplink control channel is transmitted in a control subband, of a first subframe of a radio frame located at the lower edge of a band; and one radio frame consists of 7 subframes, each consisting of 14 symbols. And it is assumed that switch time of one symbol is required during the switch between downlink and uplink. Through the information in the system information block, it can be learned that the number of physical resource blocks occupied by the control subband is 3, and the number of the switch points of the downlink/uplink control channel in the radio frame is 1. The control channel of the band edge is as shown in FIG. 12. Another possible way is to pre-configure several possible uplink and downlink configurations of the control channel in a form of an index table, and the corresponding uplink and downlink configurations of the control channel are informed in the system information block.

Similarly, the terminal determines the distribution of uplink and downlink subband on the anchor subband through the contents of the system information block. For example, it is configured by notifying a radio frame or a switch point in a sub-frame, or configured by pre-fixing uplink and downlink to notify an index. Another possible way is that the uplink and downlink configurations in the anchor subband are the same as those in the control subbands of the upper edge of the band or in the control subbands of the lower edge of the band. In this case, only the uplink and downlink configurations of the control subband need to be notified.

2. The terminal performs a random access process. After determining a frame structure and reading random access channel configuration information and preamble sequence resource pool information, the terminal performs a random access process.

There are two ways to perform the random access process:

a. the random access process is only performed on the anchor subband.

Specifically, the terminal transmits a preamble sequence on a random access channel located on an uplink anchor subband. After that, detection of random access response is performed at the designated location on a downlink anchor subband. If the random access response is detected successfully, message 3 is transmitted at the designated location on the uplink anchor subband, and finally detection of contention resolution message is performed at the designated location of the downlink anchor subband.

Specifically, the anchor subband structure is as shown in FIG. 13, which is composed of two parts, that is, an uplink slot and a downlink slot. Wherein, the downlink slot comprises a synchronization signal block and a downlink data transmission part; while the uplink slot comprises a random access channel and an uplink data transmission part. Each downlink slot may consist of a plurality of synchronization signal blocks and a plurality of downlink data transmission parts for transmitting a random access response and contention resolution message. Each uplink slot may comprise a plurality of random access channels and a plurality of uplink data transmission parts for transmitting the message 3.

To facilitate detection of the random access response, a common downlink control channel is added in the downlink data transmission part to indicate whether there is a corresponding random access response in the subsequent downlink data transmission part. One possible way is that the common downlink control channel is transmitted in a fixed position (for example, the first 1 to 3 symbols) by each subframe in the downlink data transmission part.

b. the random access process can be performed on the subbands other than the anchor subbands. In this configuration, the random access preamble is still transmitted on the uplink anchor subband, but the other steps can be performed on other subbands than the anchor subband.

Specifically, after completing the transmission of the preamble sequence, the terminal detects a random access response on a fixed or pre-determined/configured slot. If control information scrambled by a Routing Area-Radio Network Temporary Identity (RA-RNTI) of a random access channel used for transmitting a preamble sequence is detected in a downlink control channel, the random access response is detected and decoded in the downlink data transmission band indicated by the control information. If a random access response containing a preamble sequence identifier matching with the transmitted preamble sequence is detected, the message 3 is transmitted in the corresponding uplink data transmission band according to the uplink resource allocation information indicated in the random access response. Finally, transmission of contention resolution message is detected on the downlink data channel.

In this way, during completing the random access process, both of the control subband and the data transmission band will be used. In consideration of the random access response, both message 3 and contention resolution information are transmitted based on scheduled data, thus spectrum utilization efficiency of this way is somewhat higher from the perspective of an initial access.

Downlink data communication process is as follows:

The terminal performs blind detection in a downlink control channel, and when detecting the downlink control information transmitted to the terminal, receives downlink data in the corresponding downlink data transmission band according to a resource allocation indication comprised in the downlink control information.

Uplink data communication process is as follows:

The terminal transmits scheduling request information on an uplink control channel. After transmitting the scheduling request, the terminal detects whether there is downlink control information transmitted to the terminal in a downlink control channel after a fixed time or a predetermined time. If corresponding downlink control information is detected, then uplink data is allocated in the corresponding uplink data transmission band according to the uplink resource allocation information contained therein, and the schematic flowchart of the above uplink data communication process is as shown in FIG. 14.

It should be noted that subframes are used as time units in this embodiment. However, in the actual system, the subframes in the foregoing description may be replaced by slots, mini-slots, or symbols as the time unit of the frame structure and the data communication flow in the embodiment.

In addition, it should be noted that, in a data transmission band, a control subband, and the part for transmitting uplink data and downlink data in an anchor subband, a reference signal is required to be inserted to estimate the effective channel.

Embodiment 2

In this embodiment, a communication method based on a frame structure is introduced in combination with a specific system. The channel frame structure adopted in this embodiment is as shown in FIG. 10.

In this embodiment, when subband-level frequency division multiplexing is combined with time division multiplexing, a data subband is divided into a plurality of transmission occasions for transmission of downlink and uplink data.

A simple example is as shown in FIG. 15, where time unit groups consisting of a plurality of subframes/slots/mini-slots/symbols in a time domain and different transmission occasions consisting of a plurality of physical resource blocks in a frequency domain are used for transmitting uplink or downlink data. On the frequency domain, a guard interval needs to be reserved between different transmission directions; while on the time domain, guard time needs to be reserved between different transmission directions, so as to ensure that on the frequency domain and time frequency, residual interference between adjacent bands and inter-symbol interference are smaller.

When resource scheduling is performed, resource allocation is performed in the following ways: the resource allocation on the frequency domain is completed by notifying the index of the physical resource block on the frequency domain. For example, one possible way is to allocate frequency-domain resources by using a bitmap. The allocation of resources in the time domain is completed by notifying the assigned time unit index. For example, allocation of time-domain resources is completed by notifying the subframe index.

With the solution provided by this embodiment, there is a switch in the uplink and downlink transmission directions in both the time domain and the frequency domain. In order to avoid inter-link interference, a guard band needs to be inserted when the transmission direction of the uplink data and the downlink data in the frequency domain is switched, and guard time needs to be inserted when the transmission direction of the uplink data and the downlink data in the time domain is switched. For the frame structure provided in this embodiment, the insertion of the guard band and the guard time may be completed by ways of scheduling. With physical resource block as its basic unit, the guard band, namely, is one or a plurality of physical resource blocks, the base station may make the unscheduled physical resource blocks to be a guard band by not scheduling certain physical resource blocks. Similarly, for time-domain resources, these unscheduled time units can also be made to be guard time by not scheduling certain subframes/slots/mini-slots/symbols.

Another way to insert the guard band and guard time is to insert the guard band and guard time by ways of configuration. For example, for the guard band, the number of the subcarriers used for the guard band at the band edge location of the allocated time-frequency resources is defined in a predetermined manner. Or, the pre-configuration of a plurality of types of edge physical resource blocks is required to reserve the number of the subcarriers used as the guard band, and the terminal is notified in form of index through the downlink control channel or higher layer signaling configuration. A simple example is to configure the number of guard band subcarriers through the configuration table shown in Table 3.

TABLE 3 configuration of the number of subcarriers reserved in guard band

| Index | Number of reserved subcarriers |
|---|---|
| 0 | 1 |
| 1 | 2 |
| 2 | 3 |
| ... | ... |

According to the configuration table shown in Table 3 above, the base station simultaneously notifies the index corresponding to the number of subcarriers for the guard band at the edge of the band while allocating resources. The terminal performs rate adaptation according to the number of the reserved subcarriers and performs data transmission.

For the guard time, a predetermined number of symbols/slots/mini-slots reserved at the cutoff of the allocated time resources can also be fixed as guard time in a preset way. Another possible way is to notify the guard time in form of index through a pre-configured index table comprising several types of reserved time units. A possible way is as shown in Table 4.

TABLE 4 number configuration of time units reserved in guard time

| Index | Number of reserved time units |
|---|---|
| 0 | 1 |
| 1 | 2 |
| 2 | 3 |
| ... | ... |

In the example shown in Table 4 above, the time unit may be a symbol/slot/mini-slot or the like. The terminal is notified of the index along with the resource configuration information through the downlink control channel, or by way of semi-static through a high-level signaling configuration. After acquiring the information of the number of the reserved time units, the terminal performs rate adaptation on the transmitted information according to the information and transmits the information on the specified time-frequency resource.

Embodiment 3

In this embodiment, a communication method based on frame structure is introduced in combination with a specific system. In this embodiment, the location of an anchor subband may not be limited to the center of the entire band. In contrast, an anchor subband may be located near the control subband at the edge of the band.

One possible channel structure is as shown in FIG. 16. In this example, the control subband is still located at the edge of the band while the anchor subband is located near the control subband on one side, and the downlink anchor subband is ensured to be adjacent to the downlink control channel. At the same time, the uplink anchor subband is adjacent to the uplink control channel. The rest of the time-frequency resources are used to transmit a data transmission band. Wherein, the example shown in FIG. 16 is an extreme example.

In other possible configurations, the anchored band is not located in the middle of the band, as shown in FIG. 17.

For the channel structure shown in this embodiment, the communication flow between a terminal and a base station also needs to be adjusted correspondingly. Specifically, in the initial access process, the terminal accesses initially through a synchronization signal block in a downlink anchor subband, completes a downlink synchronization process, reads the system bandwidth information from the master information block in a broadcast channel in the corresponding synchronization signal block, and reads the location where the anchor subband is located in the system band from the master information block or the system information block indicated by the master information block.

One possible way is to transmit the offset of the anchor subband center relative to the center frequency in the master information block or the system information block indicated by the master information block, wherein the offset value can be characterized by the number of physical resource blocks. At the same time, the sign of the offset value (positive or negative) indicates the offset direction of the anchor subband relative to the center frequency. The notice can be performed by way of an index table.

Another possible way is to transmit the index of the first physical resource block of the anchor subband in the master information block or the system information block indicated by the master information block to indicate the location of the anchor subband in the entire system bandwidth.

The terminal acquires the frequency domain location of the anchor subband through downlink synchronization and reads the offset value of the anchor subband relative to the center frequency from the master information block or the system information block indicated by the master information block to determine the location of the entire system bandwidth. The structure of the entire system bandwidth is determined in combination with the master information block or the notice of the system bandwidth structure in the system information block.

In the solution provided in this embodiment, the remaining communication flows, including the random access process and the uplink/downlink data communication steps, may adopt the solutions provided in the foregoing Embodiment 1 and Embodiment 2, and thus are not specifically described herein.

Based on the communication method based on frame structure provided by the present disclosure, the present disclosure further provides a communication apparatus based on frame structure. As shown in FIG. 18, the apparatus comprises:

a downlink processing unit 1801 configured to detect a synchronization signal block, perform downlink synchronization processing with a base station according to the detected synchronization signal block, and determine time-frequency resources of an anchor subband;

an uplink processing unit 1802 configured to acquire random access configuration information according to the time-frequency resources of the anchor subband, perform a random access process according to the random access configuration information, and complete uplink synchronization; and a communication unit 1803 configured to acquire control information in a control channel band, and perform data communication with the base station in a data transmission band.

Preferably, the uplink processing unit 1802 is configured to detect a system information block on the anchor subband after a first preset time interval, and acquire the random access configuration information carried in the detected system information block. Or, The uplink processing unit 1802 is further configured to determine the location of the anchor subband according to the result of the downlink synchronous processing, acquire a master information block carried by a broadcast channel in the synchronization signal block; and acquire the random access configuration information carried in the master information block. Or, The uplink processing unit 1802 is further configured to determine the location of the anchor subband according to the result of the downlink synchronous processing, and acquire a master information block carried by a broadcast channel in the synchronization signal block; and determine a system information block according to the master information block, and acquire random access configuration information carried in the system information block.

Preferably, the uplink processing unit 1802 is specifically configured to acquire the time-domain index of the system information block indicated in the master information block, determine the location of the time-frequency resource of the system information block according to the time-domain index, and determine the system information block in the anchor subband according to the location of the time-frequency resource.

Wherein, the system information block is transmitted in the anchor subband or data transmission band.

Preferably, the uplink processing unit 1802 is configured to transmit a random access preamble sequence to a base station through an uplink anchor subband according to the random access configuration information, detect a random access response on a downlink anchor subband, transmit message 3 on the uplink anchor subband if detecting the random access response, and detect a contention resolution on a downlink anchor subband.

The uplink processing unit 1802 is configured to transmit a random access preamble sequence to a base station through an uplink anchor subband according to the random access configuration information; detect the control information of the uplink anchor subband used for transmitting the random access preamble sequence in a downlink control channel, and detect and decode random access response in a downlink data transmission band indicated by the control information; transmit message 3 in an uplink data transmission band if a random access response containing a preamble sequence identifier matching with the transmitted random access preamble sequence is detected; and detect a contention resolution on the downlink data transmission band.

Preferably, the communication unit 1803 is configured to detect in a downlink control channel, and receive downlink data in the corresponding downlink data transmission band according to the resource allocation indication carried in the downlink control information when detecting the downlink control information is transmitted to itself, and is also configured to transmit a scheduling request in an uplink control channel, detect in the downlink control channel after a second preset time interval, and allocate uplink data in the corresponding uplink data transmission band according to the uplink resource allocation indication carried in the downlink control information when detecting the downlink control information transmitted to itself.

A configuration unit 1804 is configured to acquire a configuration index of a guard band and/or guard time transmitted by the base station, and set according to the configuration index to provide protection when performing data communication with the base station.

The present disclosure further provides a communication apparatus based on the frame structure. As shown in FIG. 19, the apparatus comprises:

an uplink processing unit 1901 configured to perform a random access process with a terminal according to random access configuration information transmitted by the terminal through an anchor subband; and a communication unit 1902 configured to perform data communication with the terminal in a data transmission band.

Preferably, the uplink processing unit 1901 is configured to receive random access configuration information, carrying a random access preamble sequence, transmitted by the terminal through an uplink anchor subband; perform random access according to the random access preamble sequence, and transmit a random access response; detect message 3 on the uplink anchor subband; and transmit a contention resolution on a downlink anchor subband.

Or, the uplink processing unit 1901 is configured to receive random access configuration information, carrying a random access preamble sequence, transmitted by the terminal through an uplink anchor subband; perform random access according to the random access preamble sequence, transmit the control information of the uplink anchor subband used by the random access preamble sequence in a downlink control channel, and transmit a random access response in a downlink data transmission band; detect message 3 in an uplink data transmission band; and transmit a contention resolution on the downlink data transmission band.

Preferably, the communication unit 1902 is configured to transmit downlink control information in a downlink control channel, so that the terminal detects the downlink control information in the downlink control channel; and further configured to receive a scheduling request in an uplink control channel, and transmit the downlink control information in the downlink control channel, so that the terminal detects the downlink control information in the downlink control channel.

A transmitting unit 1903 is configured to transmit a configuration index of a guard band and guard time, so that the terminal provides protection according to the configuration index when performing data communication.

The present disclosure provides a frame structure based on new duplex mode. By adopting the frame structure based on new duplex mode provided by the present disclosure, the advantages of the traditional time division duplex and frequency division duplex can be obtained at the same time, and the scheduling flexibility is greatly increased. Specifically, since the control channel exists at any time, the HARQ process will be greatly simplified and the scheduling delay will be reduced. Moreover, since a paired spectrum is not needed, the method provided by the present disclosure improves utilization ratio of spectrum relative to frequency division duplex.

The solution provided by the present disclosure is also more suitable for the implementation of a large-scale MIMO system because downlink channel state information can be obtained by a time-divided data transmission band part in a time domain.

In conclusion, the scheme provided by the present disclosure provides more sufficient frequency spectrum utilization than the traditional frequency division duplex and time division duplex, and simultaneously combines the advantages of the two types of duplex modes.

Embodiments of the present disclosure are described in detail below, examples of which are illustrated in the accompanying drawings, in which the same or similar reference numbers denote the same or similar elements or elements having the same or similar functions throughout. The embodiments described below with reference to the drawings are exemplary for explaining the present disclosure only, and should not be construed as limiting the present disclosure.

It will be understood by the skilled in the art that singular forms "a", "an", "said" and "the" used herein may also include plural forms, unless specifically stated. It should be further understood that the word "comprising" used in the description of the present disclosure refers to presence of features, integers, steps, operations, elements, and/or components, but does not exclude presence or addition of one or more other features, Integers, steps, operations, elements, components, and/or combinations thereof. It should be understood that when an element is referred to as being "connected" or "coupled" to another element, it can be directly connected or coupled to the other element, or there may also be intermediate elements. In addition, "connected" or "coupled" as used herein may include wirelessly connected or wirelessly coupled. As used herein, the phrase "and/or" includes all or any of one or more of associated listed items, and all of combinations thereof.

It may be understood by the skilled in the art that, unless otherwise defined, all terms (including technical and scientific terms) used herein have the same meaning as commonly understood by the skilled in the art to which the present disclosure belongs. It should also be understood that the terms such as those defined in a general dictionary should be understood as having a meaning that is consistent with that in the context of the prior art, and will not be explained with an idealized or too formal meaning, unless specifically defined herein.

The skilled in the art may understand that the "terminal" and "terminal device" used herein include not only a wireless signal receiver device, which is a device only having a wireless signal receiver without a transmitting capability, but also a device with receiving and transmitting hardware, which is a device having receiving and transmitting hardware capable of performing a bidirectional communication over a bidirectional communication link. Such a device may include: a cellular or other communication device having a single line display or a multi-line display or a cellular or other communication device without a multi-line display; a Personal Communication Service (PCS), which may combine voice, data processing, fax and/or data communication capabilities; a Personal Digital Assistant (PDA), which may include a Radio Frequency (RF) receiver, a pager, Internet/Intranet access, a web browser, a notepad, a calendar, and/or a Global Positioning System (GPS) receiver; a conventional laptop and/or palmtop computer or other device, which may be a conventional laptop and/or palmtop computer or other device having and/or including an RF receiver. The "terminal", "terminal device" as used herein may be portable, transportable, installed in a vehicle (of aviation, maritime, and/or land), or may be adapted and/or configured to operate locally, and/or may operate in a distributed form on the earth and/or at any other locations in space. The "terminal" and "terminal device" used herein may also be a communication terminal, an Internet terminal, a music/video playing terminal, such as a PDA, a Mobile Internet Device (MID), and/or a mobile phone having a music/video playback function, or a smart TV, a set-top box and other devices. In addition, "terminal" and "terminal device" may also be replaced with "user" and "UE".

FIG. 20 shows an exemplary wireless communication system 2004 to which an exemplary embodiment of the present disclosure is applied. In FIG. 20, a UE detects indication information. The wireless communication system 2000 includes one or more fixed infrastructure base units, forming a network which is distributed over a geographic area. The base unit may also be referred to as an Access Point (AP), an Access Terminal (AT), a Base Station (BS), a Node-B, and an evolved NodeB (eNB), a next generation BS (gNB), or other terms used in the art. The access point in the embodiment of the present disclosure may be replaced with any of the above terms. As shown in FIG. 20, one or more base stations 2001 and 2002 provide services for several Mobile Stations (MSs) or UEs or terminal devices or terminals 2003 and 2004 in a service area. For example, the service area may be a cell or a cell section. In some systems, one or more BSs may be communicatively coupled to a controller forming an access network, and the controller may be communicatively coupled to one or more core networks. Examples in the present disclosure are not limited to any of particular wireless communication systems.

In a time and/or frequency domain, the base stations 2001 and 2002 transmit Downlink (DL) communication signals 2012 and 2013 to the UEs 2003 and 2004, respectively. The UEs 2003 and 2004 communicate with one or more base units 2001 and 2002 via Uplink (UL) communication signals 2011 and 2014, respectively. In one embodiment, the mobile communication system 2000 is an Orthogonal Frequency Division Multiplexing (OFDM)/Orthogonal Frequency Division Multiple Access (OFDMA) system including a plurality of base stations and a plurality of UEs. The plurality of base stations include the base station 2001 and the base station 2002, and the plurality of UEs include the UE 2003 and the UE 2004. The base station 2001 communicates with the UE 2003 through the UL communication signal 2011 and the DL communication signal 2012. When the base station has a DL packet to be transmitted to UEs, each UE may obtain a DL allocation (resource), such as a set of radio resources in a Physical Downlink Shared Channel (PDSCH) or a Narrowband Downlink Shared Channel (NPDSCH). When the terminal needs to transmit a packet to the base station in the UL, the UE obtains from the base station an authorization which allocates Physical Uplink Shared Channel (PUSCH) or Narrowband Uplink Shared Channel (NPUSCH) containing a set of UL radio resources. The UE obtains DL or UL scheduling information from a Physical Downlink Control Channel (PDCCH), or MPDCCH, or EPDCCH or NPDCCH dedicated to itself. The DL or UL scheduling information and other control information carried on the DL control channel are referred to as Downlink Control Information (DCI). FIG. 20 also shows different physical channels in DL 2012 and UL 2011. The DL 2012 includes a PDCCH or EPDCCH or NPDCCH or MPDCCH 2021, a PDSCH or NPDSCH 2022, a Physical Control Formation Indicator Channel (PCFICH) 2023, a Physical Multicast Channel (PMCH) 2024, a Physical Broadcast Channel (PBCH) or a Narrowband Physical Broadcast Channel (NPBCH) 2025, a Physical Hybrid Automatic Repeat Request Indicator Channel (PHICH) 2026, and a Primary Synchronization Signal (PSS), a Secondary Synchronization Signal (SSS), or a Narrowband Primary Synchronization Signal/Secondary Synchronization Signal (NPSS/NSSS) 12x. The DL control channel 2021 transmits a DL control signal to the terminal. The DCI 2020 is carried on the DL control channel 2021. The PDSCH 2022 transmits data information to the UE. The PCFICH 2023 transmits information for decoding PDCCH, e.g., dynamically indicating the number of symbols used by the PDCCH 2021. PMCH 2024 carries broadcast/multicast information. The PBCH or NPBCH 2025 carries a Master Information Block (MIB) for early UE discovery and cell-wide coverage. The PHICH carries Hybrid Automatic Repeat reQuest (HARD) information that indicates whether the base station has correctly received the UL transmission signal. The UL 2011 includes a Physical Uplink Control Channel (PUCCH) 2031, a PUSCH 2032, and a Physical Random Access Channel (PRACH) 2033 that carries random access information.

In one embodiment, the wireless communication network 2000 uses an OFDMA or multi-carrier architecture, including Adaptive Modulation and Coding (AMC) on DL and a next-generation single-carrier FDMA architecture or multi-carrier OFDMA architecture for UL transmission. The FDMA-based single-carrier architecture includes Discrete Fourier Transform-Spread Orthogonal Frequency Division Multiplexing (DFT-SOFDM) of Interleaved Frequency Division Multiple Access (IFDMA), Localized FDMA (LFDMA), IFDMA, or LFDMA, and also includes various enhanced Non-Orthogonal Multiple Access (NOMA) architectures of an OFDMA system, e.g., Pattern Division Multiple Access (PDMA), Sparse Code Multiple Access (SCMA), Multi-User Shared Access (MUSA), Low Code Rate Spreading Frequency Domain Spreading (LCRS FDS), Non-Orthogonal Coded Multiple Access (NCMA), Resource Spreading Multiple Access (RSMA), Interleave-Grid Multiple Access (IGMA), Low Density Spreading With Signature Vector Extension (LDS-SVE), Low code rate and Signature based Shared Access (LSSA), Non-Orthogonal Coded Access (NOCA), Interleave Division Multiple Access (IDMA), Repetition Division Multiple Access (RDMA), Group Orthogonal Coded Access (GOCA), Welch-bound equality based Spread MA (WSMA), etc.

In the OFDMA system, a remote unit is served by allocating DL or UL radio resources that typically include a set of subcarriers on one or more OFDM symbols. Exemplary OFDMA protocols include developed LTE and IEEE 802.16 standards of 3GPP UMTS standards. The architecture may also include the use of transmission technologies, such as Multi-Carrier CDMA (MC-CDMA), Multi-Carrier Direct Sequence CDMA (MC-DS-CDMA), and Orthogonal Frequency and Code Division Multiplexing (OFCDM) in one-dimensional or two-dimensional transmission, or may be based on a simpler time and/or frequency division multiplexing/multiple access technology, or a combination of these different technologies. In an alternative embodiment, the communication system may use other cellular communication system protocols, including but not limited to TDMA or direct sequence CDMA.

A random access preamble format in the future wireless communication systems can be represented as shown in Table 5 below. For the preamble formats with numbers A1, A2, A3, B1, B2, B3, B4, C0, C2, values of $\mu$, may be 0, 1, 2, 3, and $\kappa = T_s/(1/30720)$ is a ratio of an actual sampling interval to a reference sampling interval, where Ts is the actual sampling interval in ms.

TABLE 5

Random Access Preamble Format

| Format No. | Length (L) of Preamble | Subcarrier Spacing | Length of Preamble In Time Domain (Unit: Sampling Interval) | Cyclic Prefix Length |
|---|---|---|---|---|
| 0 | 839 | 1.25 kHz | 24576$\kappa$ | 3168$\kappa$ |
| 1 | 839 | 1.25 kHz | 2 · 24576$\kappa$ | 21024$\kappa$ |
| 2 | 839 | 1.25 kHz | 4 · 24576$\kappa$ | 4688$\kappa$ |
| 3 | 839 | 5 kHz | 4 · 6144$\kappa$ | 3168$\kappa$ |
| A1 | 139 | 15 · $2^\mu$ kHz | 2 · 2048$\kappa$ · $2^{-\mu}$ | 288$\kappa$ · $2^{-\mu}$ |
| A2 | 139 | 15 · $2^\mu$ kHz | 4 · 2048$\kappa$ · $2^{-\mu}$ | 576$\kappa$ · $2^{-\mu}$ |
| A3 | 139 | 15 · $2^\mu$ kHz | 6 · 2048$\kappa$ · $2^{-\mu}$ | 864$\kappa$ · $2^{-\mu}$ |
| B1 | 139 | 15 · $2^\mu$ kHz | 2 · 2048$\kappa$ · $2^{-\mu}$ | 216$\kappa$ · $2^{-\mu}$ |
| B2 | 139 | 15 · $2^\mu$ kHz | 4 · 2048$\kappa$ · $2^{-\mu}$ | 360$\kappa$ · $2^{-\mu}$ |
| B3 | 139 | 15 · $2^\mu$ kHz | 6 · 2048$\kappa$ · $2^{-\mu}$ | 504$\kappa$ · $2^{-\mu}$ |
| B4 | 139 | 15 · $2^\mu$ kHz | 12 · 2048$\kappa$ · $2^{-\mu}$ | 936$\kappa$ · $2^{-\mu}$ |
| C0 | 139 | 15 · $2^\mu$ kHz | 2048$\kappa$ · $2^{-\mu}$ | 1240$\kappa$ · $2^{-\mu}$ |
| C2 | 139 | 15 · $2^\mu$ kHz | 4 · 2048$\kappa$ · $2^{-\mu}$ | 2048$\kappa$ · $2^{-\mu}$ |

The random access preamble formats are predefined for the future wireless communication systems. In the above defined formats, the actually used random access preamble formats (or a combination thereof) include in total 14 formats: 0, 1, 2, 3, A1, A2, A3, B1, B4, A1/B1, A2/B2, A3/B3, C0 and C2. Among those formats, the format A1/B1 represents a combination of several A1s and several B1s in a certain order as a format for use, the format A2/B2 represents a combination of several A2s and several B2s in a certain order as a format for use, and the format A3/B3 represents a combination of several A3s and several B3s in a certain order as a format for use. It should be noted that the formats A1, A2, A3, B1, B4, A1/B1, A2/B2, A3/B3, C0, C2 respectively have sub-formats with different subcarrier spacing sizes. Specifically, when the values of $\mu$ are different ($\mu$=0, 1, 2, 3), A1, A2, A3, B1, B4, A1/B1, A2/B2, A3/B3, C0, and C2 further have 4 different sub-formats. In this case, there are 44 different random access preamble formats of 0, 1, 2, 3, A1 (15/30/60/120 kHz), A2 (15/30/60/120 kHz), A3 (15/30/60/120 kHz)), B1 (15/30/60/120 kHz), B4 (15/30/60/120 kHz), A1/B1 (15/30/60/120 kHz), A2/B2 (15/30/60/120 kHz, A3/B3 (15/30/60/120 kHz), C0 (15/30/60/120 kHz), and C2 (15/30/60/120 kHz) in total, in which 15/30/60/120 kHz represents a random access preamble subcarrier spacing with 15 kHz or 30 kHz or 60 kHz or 120 kHz, respectively.

Hereinafter, a flowchart of a method of determining a random access preamble transmit power performed at a base station according to an exemplary embodiment of the present disclosure will be described in detail with reference to FIG. 21.

FIG. 21 schematically shows a flowchart of a method 200 of determining a random access preamble transmit power performed at a base station according to an exemplary embodiment of the present disclosure. As shown in FIG. 21, the method 200 may include steps 2101 and 202.

In Step 2101, the base station may generate random access configuration information. The random access configuration information includes a random access configuration index and random access preamble subcarrier spacing indication information.

The length of the random access configuration information is 9 bits, among which 8 bits are prach-ConfigIndex numbered as 0-255, indicating most of the random access configuration information including the random access preamble format (It should be noted that the preamble format indicated by prach-ConfigIndex may include subcarrier spacing information of the preamble, or may not include subcarrier spacing information of the preamble. If the preamble format indicated by prach-ConfigIndex is A1, A2, A3, B1, B4, A1/B1, A2/B2, A3/B3, C0 or C2, the preamble format does not include subcarrier spacing information; and if the preamble format indicated by prach-ConfigIndex is 0, 1, 2 or 3, the preamble format includes subcarrier spacing information); and 1 bit is prach-Msg1 SubcarrierSpacing, indicating random access preamble subcarrier spacing information when the preamble format is A1, A2, A3, B1, B4, A1/B1, A2/B2, A3/B3, C0, or C2.

In Step 2102, the base station may transmit the random access configuration information to the UE.

In an exemplary embodiment, the random access configuration information is included in a broadcast message transmitted to the UE through a Physical Broadcast Channel (PBCH) or a New Radio-Physical Broadcast Channel (NR-PBCH). The broadcast message includes carrier range information of the system (above 6 GHz or below 6 GHz) and Remaining System Information (RMSI) indication information. Specifically, the random access configuration information is included in the RMSI indication information.

In an exemplary embodiment, the UE may detect the broadcast message, obtain the carrier range information and the RMSI indication information in the broadcast message, and determine whether the carrier range of the system is above 6 GHz or below 6 GHz. The UE may also read RMSI based on the obtained RMSI indication information, so as to obtain the random access configuration information therein.

The UE may obtain the random access preamble format based on the random access configuration index prach-ConfigIndex and the random access preamble subcarrier spacing indication information prach-Msg1SubcarrierSpacing in the obtained random access configuration information, so as to determine an random access preamble transmit power offset DELTA_PREAMBLE corresponding to the obtained random access preamble format, which will be described in detail later.

Hereinafter, a structure of a base station according to an exemplary embodiment of the present disclosure will be described with reference to FIG. 22. FIG. 22 schematically shows a structural block diagram of a base station 2200 according to an exemplary embodiment of the present disclosure. The base station 2200 may be used to perform the method 200 described with reference to FIG. 21. For the sake of brevity, only a schematic structure of the base station according to the exemplary embodiment of the present disclosure will be described herein, and the details which have been described in the method 200 with reference to FIG. 21 will thus be omitted.

As shown in FIG. 22, the base station 2200 includes a communication interface 2201 for external communication, a processing unit or a processor 2203, which may be a single unit or a combination of multiple units for performing different steps of the method; a memory 2205 storing computer-executable instructions, which when executed by the processor 2203, cause the processor 2203 to: generate random access configuration information, the random access configuration information including a random access configuration index and random access preamble subcarrier spacing indication information; and transmit the random access configuration information to the UE.

As described above, the random access configuration index and the random access preamble subcarrier spacing indication information may be used by the UE to obtain the random access preamble format.

Hereinafter, a flowchart of a method of determining a random access preamble sequence transmit power performed at a UE according to an exemplary embodiment of the present disclosure will be described in detail with reference to FIG. 23.

FIG. 23 schematically shows a flowchart of a method 2300 of determining a random access preamble transmit power performed at a UE according to an exemplary embodiment of the present disclosure. As shown in FIG. 23, the method 2300 may include steps 2301, 2302 and 2303.

In Step 2301, the UE may obtain random access configuration information from a base station. The random access configuration information includes a random access configuration index and random access preamble sequence subcarrier spacing indication information.

The length of the random access configuration information is 9 bits, among which 8 bits are prach-ConfigIndex numbered as 0-255, indicating most of the random access configuration information including the random access preamble format (It should be noted that the preamble format indicated by prach-ConfigIndex may include subcarrier spacing information of the preamble, or may not include subcarrier spacing information of the preamble. If the preamble format indicated by prach-ConfigIndex is A1, A2, A3, B1, B4, A1/B1, A2/B2, A3/B3, C0 or C2, the preamble format does not include subcarrier spacing information; and if the preamble format indicated by prach-ConfigIndex is 0, 1, 2 or 3, the preamble format includes subcarrier spacing information); and 1 bit is prach-Msg1 SubcarrierSpacing, indicating random access preamble subcarrier spacing information when the preamble format is A1, A2, A3, B1, B4, A1/B1, A2/B2, A3/B3, C0, or C2.

In an exemplary embodiment, the UE receives a broadcast message transmitted on a physical broadcast channel (PBCH or NR-PBCH) from the base station. The broadcast message includes carrier range information of the system (above 6 GHz or below 6 GHz) and RMSI indication information. Specifically, the random access configuration information is included in the RMSI indication information.

In an exemplary embodiment, the UE may detect the broadcast message, obtain the carrier range information and the RMSI indication information in the broadcast message, and determine whether the carrier range of the system is above 6 GHz or below 6 GHz. The UE may also read RMSI based on the obtained RMSI indication information, so as to obtain the random access configuration information therein.

In Step 2302, the UE may obtain a random access preamble format based on the random access configuration index and the random access preamble subcarrier spacing indication information.

As described previously, the random access preamble formats are predefined for the future wireless communication systems. In the above defined formats, the actually used random access preamble formats (or a combination thereof) include in total 14 formats: 0, 1, 2, 3, A1, A2, A3, B1, B4, A1/B1, A2/B2, A3/B3, C0 and C2. Among those formats, the format A1/B1 represents a combination of several A1 s and several B1s in a certain order as a format for use, the format A2/B2 represents a combination of several A2s and several B2s in a certain order as a format for use, and the format A3/B3 represents a combination of several A3s and several B3s in a certain order as a format for use. It should be noted that the formats A1, A2, A3, B1, B4, A1/B1, A2/B2, A3/B3, C0, C2 respectively have sub-formats with different subcarrier spacing sizes. Specifically, when the values of µ, are different (µ=0, 1, 2, 3), A1, A2, A3, B1, B4, A1/B1, A2/B2, A3/B3, C0, and C2 further have 4 different sub-formats. In this case, there are 44 different random access preamble formats of 0, 1, 2, 3, A1 (15/30/60/120 kHz), A2 (15/30/60/120 kHz), A3 (15/30/60/120 kHz)), B1 (15/30/60/120 kHz), B4 (15/30/60/120 kHz), A1/B1 (15/30/60/120 kHz), A2/B2 (15/30/60/120 kHz, A3/B3 (15/30/60/120 kHz), C0 (15/30/60/120 kHz), and C2 (15/30/60/120 kHz) in total, in which 15/30/60/120 kHz represents a random access preamble subcarrier spacing with 15 kHz or 30 kHz or 60 kHz or 120 kHz, respectively.

The UE may store a predefined correspondence between random access preamble formats and random access preamble transmit power offsets DELTA_PREAMBLE locally. Alternatively, the UE may store a predefined correspondence between random access preamble formats, random access preamble subcarrier spacing indication information, carrier ranges and random access preamble transmit power offsets DELTA_PREAMBLE.

In Step 2303, the UE may determine a random access preamble transmit power offset DELTA_PREAMBLE corresponding to the obtained random access preamble format.

In an exemplary embodiment, the UE may determine the random access preamble transmit power offset DELTA_PREAMBLE corresponding to the obtained random access preamble format by querying a correspondence table including at least random access preamble formats and random access preamble transmit power offsets DELTA_PREAMBLE.

In another exemplary embodiment, the correspondence table may further include at least one of the random access preamble subcarrier spacing indication information and the carrier range. In this case, the random access preamble transmit power offset corresponding to the obtained random access preamble format and at least one of the random access preamble subcarrier spacing indication information and the carrier range may be determined by querying the correspondence table.

It should be noted that the random access preamble format may refer to any of the formats which are independent of the random access preamble subcarrier spacing, such as 0, 1, 2, 3, A1, A2, A3, B1, B4, A1/B1, A2/B2, A3/B3, C0 and C2, or may refer to any of the formats which are dependent on the random access preamble subcarrier spacing, such as 0, 1, 2, 3, A1 (15/30/60/120 kHz), A2 (15/30/60/120 kHz), A3 (15/30)/60/120 kHz), B1 (15/30/60/120 kHz), B4 (15/30/60/120 kHz), A1/B1 (15/30/60/120 kHz), A2/B2 (15/30/60/120 kHz), A3/B3 (15/30/60/120 kHz), C0 (15/30/60/120 kHz) and C2 (15/30/60/120 kHz).

A possible correspondence between random access preamble formats and random access preamble transmit power offsets DELTA_PREAMBLE may be given in Table 6. As described above, in the following description, DELTA_PREAMBLE refers to a random access preamble transmit power offset, Msg1 SCS refers to random access preamble sequence subcarrier spacing indication information, 0, 1, 2, 3, A1, A2, A3, B1, B4, A1/B1, A2/B2, A3/B3, C0 and C2 refer to defined random access preamble formats, and 15 kHz, 30 kHz, 60 kHz, and 120 kHz are random access preamble subcarrier spacing.

TABLE 6

Correspondence Table of Random Access Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |
| A1 (15 kHz) | 8 dB |
| A2 (15 kHz) | 5 dB |
| A3 (15 kHz) | 3 dB |
| B1 (15 kHz) | 8 dB |
| B4 (15 kHz) | 0 dB |
| A1/B1 (15 kHz) | 8 dB |
| A2/B2 (15 kHz) | 5 dB |
| A3/B3 (15 kHz) | 3 dB |
| C0 (15 kHz) | 11 dB |
| C2 (15 kHz) | 5 dB |
| A1 (30 kHz) | 11 dB |
| A2 (30 kHz) | 8 dB |
| A3 (30 kHz) | 6 dB |
| B1 (30 kHz) | 11 dB |
| B4 (30 kHz) | 3 dB |
| A1/B1 (30 kHz) | 11 dB |
| A2/B2 (30 kHz) | 8 dB |
| A3/B3 (30 kHz) | 6 dB |
| C0 (30 kHz) | 14 dB |
| C2 (30 kHz) | 8 dB |
| A1 (60 kHz) | 14 dB |
| A2 (60 kHz) | 11 dB |
| A3 (60 kHz) | 9 dB |
| B1 (60 kHz) | 14 dB |
| B4 (60 kHz) | 6 dB |
| A1/B1 (60 kHz) | 14 dB |
| A2/B2 (60 kHz) | 11 dB |
| A3/B3 (60 kHz) | 9 dB |
| C0 (60 kHz) | 17 dB |
| C2 (60 kHz) | 11 dB |
| A1 (120 kHz) | 17 dB |
| A2 (120 kHz) | 14 dB |
| A3 (120 kHz) | 12 dB |
| B1 (120 kHz) | 17 dB |
| B4 (120 kHz) | 9 dB |
| A1/B1 (120 kHz) | 17 dB |
| A2/B2 (120 kHz) | 14 dB |
| A3/B3 (120 kHz) | 12 dB |
| C0 (120 kHz) | 20 dB |
| C2 (120 kHz) | 14 dB |

Another possible correspondence between random access preamble formats and random access preamble transmit power offsets DELTA_PREAMBLE may be given in Table 7.

TABLE 7

Correspondence Table of Random Access Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |
| A1 (15 kHz) | 7.8 dB |
| A2 (15 kHz) | 4.8 dB |
| A3 (15 kHz) | 3 dB |
| B1 (15 kHz) | 7.8 dB |
| B4 (15 kHz) | 0 dB |
| A1/B1 (15 kHz) | 7.8 dB |
| A2/B2 (15 kHz) | 4.8 dB |
| A3/B3 (15 kHz) | 3 dB |
| C0 (15 kHz) | 10.8 dB |
| C2 (15 kHz) | 4.8 dB |
| A1 (30 kHz) | 10.8 dB |
| A2 (30 kHz) | 7.8 dB |

TABLE 7-continued

Correspondence Table of Random Access
Preamble Format and DELTA_PREAMBLE

| Random Access Preamble Format | DELTA_PREAMBLE |
|---|---|
| A3 (30 kHz) | 6 dB |
| B1 (30 kHz) | 10.8 dB |
| B4 (30 kHz) | 3 dB |
| A1/B1 (30 kHz) | 10.8 dB |
| A2/B2 (30 kHz) | 7.8 dB |
| A3/B3 (30 kHz) | 6 dB |
| C0 (30 kHz) | 13.8 dB |
| C2 (30 kHz) | 7.8 dB |
| A1 (60 kHz) | 13.8 dB |
| A2 (60 kHz) | 10.8 dB |
| A3 (60 kHz) | 9 dB |
| B1 (60 kHz) | 13.8 dB |
| B4 (60 kHz) | 6 dB |
| A1/B1 (60 kHz) | 13.8 dB |
| A2/B2 (60 kHz) | 10.8 dB |
| A3/B3 (60 kHz) | 9 dB |
| C0 (60 kHz) | 16.8 dB |
| C2 (60 kHz) | 10.8 dB |
| A1 (120 kHz) | 16.8 dB |
| A2 (120 kHz) | 13.8 dB |
| A3 (120 kHz) | 12 dB |
| B1 (120 kHz) | 16.8 dB |
| B4 (120 kHz) | 9 dB |
| A1/B1 (120 kHz) | 16.8 dB |
| A2/B2 (120 kHz) | 13.8 dB |
| A3/B3 (120 kHz) | 12 dB |
| C0 (120 kHz) | 19.8 dB |
| C2 (120 kHz) | 13.8 dB |

Another possible correspondence between random access preamble formats and random access preamble transmit power offsets DELTA_PREAMBLE may be given in Table 8.

TABLE 8

Correspondence Table of Random Access
Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |
| A1 (15 kHz) | 0 dB |
| A2 (15 kHz) | −3 dB |
| A3 (15 kHz) | −5 dB |
| B1 (15 kHz) | 0 dB |
| B4 (15 kHz) | −8 dB |
| A1/B1 (15 kHz) | 0 dB |
| A2/B2 (15 kHz) | −3 dB |
| A3/B3 (15 kHz) | −5 dB |
| C0 (15 kHz) | 3 dB |
| C2 (15 kHz) | −3 dB |
| A1 (30 kHz) | 3 dB |
| A2 (30 kHz) | 0 dB |
| A3 (30 kHz) | −2 dB |
| B1 (30 kHz) | 3 dB |
| B4 (30 kHz) | −5 dB |
| A1/B1 (30 kHz) | 3 dB |
| A2/B2 (30 kHz) | 0 dB |
| A3/B3 (30 kHz) | −2 dB |
| C0 (30 kHz) | 6 dB |
| C2 (30 kHz) | 0 dB |
| A1 (60 kHz) | 6 dB |
| A2 (60 kHz) | 3 dB |
| A3 (60 kHz) | 1 dB |
| B1 (60 kHz) | 6 dB |
| B4 (60 kHz) | −2 dB |
| A1/B1 (60 kHz) | 6 dB |
| A2/B2 (60 kHz) | 3 dB |
| A3/B3 (60 kHz) | 1 dB |

TABLE 8-continued

Correspondence Table of Random Access
Preamble Format and DELTA_PREAMBLE

| Random Access Preamble Format | DELTA_PREAMBLE |
|---|---|
| C0 (60 kHz) | 9 dB |
| C2 (60 kHz) | 3 dB |
| A1 (120 kHz) | 9 dB |
| A2 (120 kHz) | 6 dB |
| A3 (120 kHz) | 4 dB |
| B1 (120 kHz) | 9 dB |
| B4 (120 kHz) | 1 dB |
| A1/B1 (120 kHz) | 9 dB |
| A2/B2 (120 kHz) | 6 dB |
| A3/B3 (120 kHz) | 4 dB |
| C0 (120 kHz) | 12 dB |
| C2 (120 kHz) | 6 dB |

Another possible correspondence between random access preamble formats and random access preamble transmit power offsets DELTA_PREAMBLE may be given in Table 9.

TABLE 9

Correspondence Table of Random Access
Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |
| A1 (15 kHz) | 0 dB |
| A2 (15 kHz) | −3 dB |
| A3 (15 kHz) | −4.8 dB |
| B1 (15 kHz) | 0 dB |
| B4 (15 kHz) | −7.8 dB |
| A1/B1 (15 kHz) | 0 dB |
| A2/B2 (15 kHz) | −3 dB |
| A3/B3 (15 kHz) | −4.8 dB |
| C0 (15 kHz) | 3 dB |
| C2 (15 kHz) | −3 dB |
| A1 (30 kHz) | 3 dB |
| A2 (30 kHz) | 0 dB |
| A3 (30 kHz) | −1.8 dB |
| B1 (30 kHz) | 3 dB |
| B4 (30 kHz) | −4.8 dB |
| A1/B1 (30 kHz) | 3 dB |
| A2/B2 (30 kHz) | 0 dB |
| A3/B3 (30 kHz) | −1.8 dB |
| C0 (30 kHz) | 6 dB |
| C2 (30 kHz) | 0 dB |
| A1 (60 kHz) | 6 dB |
| A2 (60 kHz) | 3 dB |
| A3 (60 kHz) | 1.2 dB |
| B1 (60 kHz) | 6 dB |
| B4 (60 kHz) | −1.8 dB |
| A1/B1 (60 kHz) | 6 dB |
| A2/B2 (60 kHz) | 3 dB |
| A3/B3 (60 kHz) | 1.2 dB |
| C0 (60 kHz) | 9 dB |
| C2 (60 kHz) | 3 dB |
| A1 (120 kHz) | 9 dB |
| A2 (120 kHz) | 6 dB |
| A3 (120 kHz) | 4.2 dB |
| B1 (120 kHz) | 9 dB |
| B4 (120 kHz) | 1.2 dB |
| A1/B1 (120 kHz) | 9 dB |
| A2/B2 (120 kHz) | 6 dB |
| A3/B3 (120 kHz) | 4.2 dB |
| C0 (120 kHz) | 12 dB |
| C2 (120 kHz) | 6 dB |

Another possible correspondence between random access preamble formats and random access preamble transmit power offsets DELTA_PREAMBLE may be given in Table 10.

TABLE 10

Correspondence Table of Random Access Preamble Format and DELTA_PREAMBLE

| Random Access Preamble Format | DELTA_PREAMBLE |
| --- | --- |
| 0 | 0 dB |
| 1 | −3 dB |
| 2 | −6 dB |
| 3 | 0 dB |
| A1 (15 kHz) | 11 dB |
| A2 (15 kHz) | 11 dB |
| A3 (15 kHz) | 11 dB |
| B1 (15 kHz) | 11 dB |
| B4 (15 kHz) | 11 dB |
| A1/B1 (15 kHz) | 11 dB |
| A2/B2 (15 kHz) | 11 dB |
| A3/B3 (15 kHz) | 11 dB |
| C0 (15 kHz) | 11 dB |
| C2 (15 kHz) | 11 dB |
| A1 (30 kHz) | 14 dB |
| A2 (30 kHz) | 14 dB |
| A3 (30 kHz) | 14 dB |
| B1 (30 kHz) | 14 dB |
| B4 (30 kHz) | 14 dB |
| A1/B1 (30 kHz) | 14 dB |
| A2/B2 (30 kHz) | 14 dB |
| A3/B3 (30 kHz) | 14 dB |
| C0 (30 kHz) | 14 dB |
| C2 (30 kHz) | 14 dB |
| A1 (60 kHz) | 17 dB |
| A2 (60 kHz) | 17 dB |
| A3 (60 kHz) | 17 dB |
| B1 (60 kHz) | 17 dB |
| B4 (60 kHz) | 17 dB |
| A1/B1 (60 kHz) | 17 dB |
| A2/B2 (60 kHz) | 17 dB |
| A3/B3 (60 kHz) | 17 dB |
| C0 (60 kHz) | 17 dB |
| C2 (60 kHz) | 17 dB |
| A1 (120 kHz) | 20 dB |
| A2 (120 kHz) | 20 dB |
| A3 (120 kHz) | 20 dB |
| B1 (120 kHz) | 20 dB |
| B4 (120 kHz) | 20 dB |
| A1/B1 (120 kHz) | 20 dB |
| A2/B2 (120 kHz) | 20 dB |
| A3/B3 (120 kHz) | 20 dB |
| C0 (120 kHz) | 20 dB |
| C2 (120 kHz) | 20 dB |

Another possible correspondence between random access preamble formats and random access preamble transmit power offsets DELTA_PREAMBLE may be given in Table 11.

TABLE 11

Correspondence Table of Random Access Preamble Format and DELTA_PREAMBLE

| Random Access Preamble Format | DELTA_PREAMBLE |
| --- | --- |
| 0 | 0 dB |
| 1 | −3 dB |
| 2 | −6 dB |
| 3 | 0 dB |
| A1 (15 kHz) | 10.8 dB |
| A2 (15 kHz) | 10.8 dB |
| A3 (15 kHz) | 10.8 dB |
| B1 (15 kHz) | 10.8 dB |
| B4 (15 kHz) | 10.8 dB |
| A1/B1 (15 kHz) | 10.8 dB |
| A2/B2 (15 kHz) | 10.8 dB |
| A3/B3 (15 kHz) | 10.8 dB |
| C0 (15 kHz) | 10.8 dB |
| C2 (15 kHz) | 10.8 dB |
| A1 (30 kHz) | 13.8 dB |
| A2 (30 kHz) | 13.8 dB |
| A3 (30 kHz) | 13.8 dB |
| B1 (30 kHz) | 13.8 dB |
| B4 (30 kHz) | 13.8 dB |
| A1/B1 (30 kHz) | 13.8 dB |
| A2/B2 (30 kHz) | 13.8 dB |
| A3/B3 (30 kHz) | 13.8 dB |
| C0 (30 kHz) | 13.8 dB |
| C2 (30 kHz) | 13.8 dB |
| A1 (60 kHz) | 16.8 dB |
| A2 (60 kHz) | 16.8 dB |
| A3 (60 kHz) | 16.8 dB |
| B1 (60 kHz) | 16.8 dB |
| B4 (60 kHz) | 16.8 dB |
| A1/B1 (60 kHz) | 16.8 dB |
| A2/B2 (60 kHz) | 16.8 dB |
| A3/B3 (60 kHz) | 16.8 dB |
| C0 (60 kHz) | 16.8 dB |
| C2 (60 kHz) | 16.8 dB |
| A1 (120 kHz) | 19.8 dB |
| A2 (120 kHz) | 19.8 dB |
| A3 (120 kHz) | 19.8 dB |
| B1 (120 kHz) | 19.8 dB |
| B4 (120 kHz) | 19.8 dB |
| A1/B1 (120 kHz) | 19.8 dB |
| A2/B2 (120 kHz) | 19.8 dB |
| A3/B3 (120 kHz) | 19.8 dB |
| C0 (120 kHz) | 19.8 dB |
| C2 (120 kHz) | 19.8 dB |

Another possible correspondence between random access preamble formats and random access preamble transmit power offsets DELTA_PREAMBLE may be given in Table 12.

TABLE 12

Correspondence Table of Random Access Preamble Format and DELTA_PREAMBLE

| Random Access Preamble Format | DELTA_PREAMBLE |
| --- | --- |
| 0 | 0 dB |
| 1 | −3 dB |
| 2 | −6 dB |
| 3 | 0 dB |
| A1 (15 kHz) | 0 dB |
| A2 (15 kHz) | 0 dB |
| A3 (15 kHz) | 0 dB |
| B1 (15 kHz) | 0 dB |
| B4 (15 kHz) | 0 dB |
| A1/B1 (15 kHz) | 0 dB |
| A2/B2 (15 kHz) | 0 dB |
| A3/B3 (15 kHz) | 0 dB |
| C0 (15 kHz) | 0 dB |
| C2 (15 kHz) | 0 dB |
| A1 (30 kHz) | 3 dB |
| A2 (30 kHz) | 3 dB |
| A3 (30 kHz) | 3 dB |
| B1 (30 kHz) | 3 dB |
| B4 (30 kHz) | 3 dB |
| A1/B1 (30 kHz) | 3 dB |
| A2/B2 (30 kHz) | 3 dB |
| A3/B3 (30 kHz) | 3 dB |
| C0 (30 kHz) | 3 dB |
| C2 (30 kHz) | 3 dB |
| A1 (60 kHz) | 6 dB |
| A2 (60 kHz) | 6 dB |

TABLE 12-continued

Correspondence Table of Random Access Preamble Format and DELTA_PREAMBLE

| Random Access Preamble Format | DELTA_PREAMBLE |
|---|---|
| A3 (60 kHz) | 6 dB |
| B1 (60 kHz) | 6 dB |
| B4 (60 kHz) | 6 dB |
| A1/B1 (60 kHz) | 6 dB |
| A2/B2 (60 kHz) | 6 dB |
| A3/B3 (60 kHz) | 6 dB |
| C0 (60 kHz) | 6 dB |
| C2 (60 kHz) | 6 dB |
| A1 (120 kHz) | 9 dB |
| A2 (120 kHz) | 9 dB |
| A3 (120 kHz) | 9 dB |
| B1 (120 kHz) | 9 dB |
| B4 (120 kHz) | 9 dB |
| A1/B1 (120 kHz) | 9 dB |
| A2/B2 (120 kHz) | 9 dB |
| A3/B3 (120 kHz) | 9 dB |
| C0 (120 kHz) | 9 dB |
| C2 (120 kHz) | 9 dB |

Another possible correspondence between random access preamble formats and random access preamble transmit power offsets DELTA_PREAMBLE may be given in Table 13.

TABLE 13

Correspondence Table of Random Access Preamble Format and DELTA_PREAMBLE

| Random Access Preamble Format | DELTA_PREAMBLE |
|---|---|
| 0 | 0 dB |
| 1 | -3 dB |
| 2 | -6 dB |
| 3 | 6 dB |
| A1 (15 kHz) | 11 dB |
| A2 (15 kHz) | 8 dB |
| A3 (15 kHz) | 6 dB |
| B1 (15 kHz) | 11 dB |
| B4 (15 kHz) | 3 dB |
| A1/B1 (15 kHz) | 11 dB |
| A2/B2 (15 kHz) | 8 dB |
| A3/B3 (15 kHz) | 6 dB |
| C0 (15 kHz) | 14 dB |
| C2 (15 kHz) | 8 dB |
| A1 (30 kHz) | 17 dB |
| A2 (30 kHz) | 14 dB |
| A3 (30 kHz) | 12 dB |
| B1 (30 kHz) | 17 dB |
| B4 (30 kHz) | 9 dB |
| A1/B1 (30 kHz) | 17 dB |
| A2/B2 (30 kHz) | 14 dB |
| A3/B3 (30 kHz) | 12 dB |
| C0 (30 kHz) | 20 dB |
| C2 (30 kHz) | 14 dB |
| A1 (60 kHz) | 23 dB |
| A2 (60 kHz) | 20 dB |
| A3 (60 kHz) | 18 dB |
| B1 (60 kHz) | 23 dB |
| B4 (60 kHz) | 15 dB |
| A1/B1 (60 kHz) | 23 dB |
| A2/B2 (60 kHz) | 20 dB |
| A3/B3 (60 kHz) | 18 dB |
| C0 (60 kHz) | 26 dB |
| C2 (60 kHz) | 20 dB |
| A1 (120 kHz) | 29 dB |
| A2 (120 kHz) | 26 dB |
| A3 (120 kHz) | 24 dB |
| B1 (120 kHz) | 29 dB |
| B4 (120 kHz) | 21 dB |
| A1/B1 (120 kHz) | 29 dB |
| A2/B2 (120 kHz) | 26 dB |
| A3/B3 (120 kHz) | 24 dB |
| C0 (120 kHz) | 29 dB |
| C2 (120 kHz) | 23 dB |

Another possible correspondence between random access preamble formats, random access preamble subcarrier spacing indication information and random access preamble transmit power offsets DELTA_PREAMBLE may be given in Table 14.

TABLE 14

Correspondence Table of Random Access Preamble Format, random access preamble subcarrier spacing indication information (prach-Msg1SubcarrierSpacing, Msg1SCS for short) and DELTA_PREAMBLE

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| 0 | 0 dB | | | |
| 1 | -3 dB | | | |
| 2 | -6 dB | | | |
| 3 | 0 dB | | | |
| A1 | 8 dB | 11 dB | 14 dB | 17 dB |
| A2 | 5 dB | 8 dB | 11 dB | 14 dB |
| A3 | 3 dB | 6 dB | 9 dB | 12 dB |
| B1 | 8 dB | 11 dB | 14 dB | 17 dB |
| B4 | 0 dB | 3 dB | 6 dB | 9 dB |
| A1/B1 | 8 dB | 11 dB | 14 dB | 17 dB |
| A2/B2 | 5 dB | 8 dB | 11 dB | 14 dB |
| A3/B3 | 3 dB | 6 dB | 9 dB | 12 dB |
| C0 | 11 dB | 14 dB | 17 dB | 20 dB |
| C2 | 5 dB | 8 dB | 11 dB | 14 dB |

It should be noted that a possible correspondence between random access preamble formats, random access preamble subcarrier spacing indication information, and preamble transmit power offsets DELTA_PREAMBLE may be given by swapping some of columns in Table 14, as shown in Table 15.

TABLE 15

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| 0 | 0 dB | | | |
| 1 | -3 dB | | | |
| 2 | -6 dB | | | |
| 3 | 0 dB | | | |
| A1 | 11 dB | 8 dB | 17 dB | 14 dB |
| A2 | 8 dB | 5 dB | 14 dB | 11 dB |
| A3 | 6 dB | 3 dB | 12 dB | 9 dB |
| B1 | 11 dB | 8 dB | 17 dB | 14 dB |
| B4 | 3 dB | 0 dB | 9 dB | 6 dB |
| A1/B1 | 11 dB | 8 dB | 17 dB | 14 dB |
| A2/B2 | 8 dB | 5 dB | 14 dB | 11 dB |
| A3/B3 | 6 dB | 3 dB | 12 dB | 9 dB |

TABLE 15-continued

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range ≤6 GHz | | Carrier Range >6 GHz | |
| | Msg1SCS = 0 | Msg1SCS = 1 | Msg1SCS = 0 | Msg1SCS = 1 |
| C0 | 14 dB | 11 dB | 20 dB | 17 dB |
| C2 | 8 dB | 5 dB | 14 dB | 11 dB |

It should be noted that possible correspondences between random access preamble formats, random access preamble subcarrier spacing indication information, and preamble transmit power offsets DELTA_PREAMBLE may be given by dividing each of Table 14 and Table 15 into two sub-tables based on the carrier ranges, as shown in Tables 16 and 17 (in which Table 16-1 and Table 16-2 are sub-tables of Table 16, and Table 17-1 and Table 17-2 are sub-tables of Table 17).

TABLE 16-1

Correspondence Table of Random Access Preamble Format, Msg1SCS and DELTA_PREAMBLE

| Random Access Preamble Format | DELTA_PREAMBLE (Carrier Range ≤6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 8 dB | 11 dB |
| A2 | 5 dB | 8 dB |
| A3 | 3 dB | 6 dB |
| B1 | 8 dB | 11 dB |
| B4 | 0 dB | 3 dB |
| A1/B1 | 8 dB | 11 dB |
| A2/B2 | 5 dB | 8 dB |
| A3/B3 | 3 dB | 6 dB |
| C0 | 11 dB | 14 dB |
| C2 | 5 dB | 8 dB |

TABLE 16-2

Correspondence Table of Random Access Preamble Format, Msg1SCS and DELTA_PREAMBLE

| Random Access Preamble Format | DELTA_PREAMBLE (Carrier Range >6 GHz) | |
|---|---|---|
| | Msg1SCS = 0 | Msg1SCS = 1 |
| A1 | 14 dB | 17 dB |
| A2 | 11 dB | 14 dB |
| A3 | 9 dB | 12 dB |
| B1 | 14 dB | 17 dB |
| B4 | 6 dB | 9 dB |
| A1/B1 | 14 dB | 17 dB |
| A2/B2 | 11 dB | 14 dB |
| A3/B3 | 9 dB | 12 dB |
| C0 | 17 dB | 20 dB |
| C2 | 11 dB | 14 dB |

TABLE 17-1

Correspondence Table of Random Access Preamble Format, Msg1SCS and DELTA_PREAMBLE

| Random Access Preamble Format | DELTA_PREAMBLE (Carrier Range ≤6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 11 dB | 8 dB |
| A2 | 8 dB | 5 dB |
| A3 | 6 dB | 3 dB |
| B1 | 11 dB | 8 dB |
| B4 | 3 dB | 0 dB |
| A1/B1 | 11 dB | 8 dB |
| A2/B2 | 8 dB | 5 dB |
| A3/B3 | 6 dB | 3 dB |
| C0 | 14 dB | 11 dB |
| C2 | 8 dB | 5 dB |

TABLE 17-2

Correspondence Table of Random Access Preamble Format, Msg1SCS and DELTA_PREAMBLE

| Random Access Preamble Format | DELTA_PREAMBLE (Carrier Range >6 GHz) | |
|---|---|---|
| | Msg1SCS = 0 | Msg1SCS = 1 |
| A1 | 17 dB | 14 dB |
| A2 | 14 dB | 11 dB |
| A3 | 12 dB | 9 dB |
| B1 | 17 dB | 14 dB |
| B4 | 9 dB | 6 dB |
| A1/B1 | 17 dB | 14 dB |
| A2/B2 | 14 dB | 11 dB |
| A3/B3 | 12 dB | 9 dB |
| C0 | 20 dB | 17 dB |
| C2 | 14 dB | 11 dB |

Another possible correspondence between random access preamble formats, random access preamble subcarrier spacing indication information, and random access preamble transmit power offsets DELTA_PREAMBLE may be given in Table 18.

TABLE 18

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range ≤6 GHz | | Carrier Range >6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 7.8 dB | 10.8 dB | 13.8 dB | 16.8 dB |
| A2 | 4.8 dB | 7.8 dB | 10.8 dB | 13.8 dB |
| A3 | 3 dB | 6 dB | 9 dB | 12 dB |
| B1 | 7.8 dB | 10.8 dB | 13.8 dB | 16.8 dB |
| B4 | 0 dB | 3 dB | 6 dB | 9 dB |
| A1/B1 | 7.8 dB | 10.8 dB | 13.8 dB | 16.8 dB |
| A2/B2 | 4.8 dB | 7.8 dB | 10.8 dB | 13.8 dB |

TABLE 18-continued

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| A3/B3 | 3 dB | 6 dB | 9 dB | 12 dB |
| C0 | 10.8 dB | 13.8 dB | 16.8 dB | 19.8 dB |
| C2 | 4.8 dB | 7.8 dB | 10.8 dB | 13.8 dB |

It should be noted that a possible correspondence between random access preamble formats, random access preamble subcarrier spacing indication information, and preamble transmit power offsets DELTA_PREAMBLE may be given by swapping some of columns in Table 18, as shown in Table 19.

TABLE 19

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range <6 GHz | | Carrier Range >6 GHz | |
| | Msg1SCS = 0 | Msg1SCS = 1 | Msg1SCS = 0 | Msg1SCS = 1 |
| 0 | | 0 dB | | |
| 1 | | -3 dB | | |
| 2 | | -6 dB | | |
| 3 | | 0 dB | | |
| A1 | 10.8 dB | 7.8 dB | 16.8 dB | 13.8 dB |
| A2 | 7.8 dB | 4.8 dB | 13.8 dB | 10.8 dB |
| A3 | 6 dB | 3 dB | 12 dB | 9 dB |
| B1 | 10.8 dB | 7.8 dB | 16.8 dB | 13.8 dB |
| B4 | 3 dB | 0 dB | 9 dB | 6 dB |
| A1/B1 | 10.8 dB | 7.8 dB | 16.8 dB | 13.8 dB |
| A2/B2 | 7.8 dB | 4.8 dB | 13.8 dB | 10.8 dB |
| A3/B3 | 6 dB | 3 dB | 12 dB | 9 dB |
| C0 | 13.8 dB | 10.8 dB | 19.8 dB | 16.8 dB |
| C2 | 7.8 dB | 4.8 dB | 13.8 dB | 10.8 dB |

It should be noted that possible correspondences between random access preamble formats, random access preamble subcarrier spacing indication information, and preamble transmit power offsets DELTA_PREAMBLE may be given by dividing each of Table 18 and Table 19 into two sub-tables based on the carrier ranges, as shown in Tables 17 and 18 (in which Table 20-1 and Table 20-2 are sub-tables of Table 20, and Table 21-1 and Table 21-2 are sub-tables of Table 21).

TABLE 20-1

Correspondence Table of Random Access Preamble Format, Msg1SCS and DELTA_PREAMBLE

| Random Access Preamble Format | DELTA_PREAMBLE (Carrier Range <6 GHz) | |
|---|---|---|
| | Msg1SCS = 0 | Msg1SCS = 1 |
| 0 | 0 dB | |
| 1 | -3 dB | |
| 2 | -6 dB | |
| 3 | 0 dB | |

TABLE 20-1-continued

Correspondence Table of Random Access Preamble Format, Msg1SCS and DELTA_PREAMBLE

| Random Access Preamble Format | DELTA_PREAMBLE (Carrier Range <6 GHz) | |
|---|---|---|
| | Msg1SCS = 0 | Msg1SCS = 1 |
| A1 | 7.8 dB | 10.8 dB |
| A2 | 4.8 dB | 7.8 dB |
| A3 | 3 dB | 6 dB |
| B1 | 7.8 dB | 10.8 dB |
| B4 | 0 dB | 3 dB |
| A1/B1 | 7.8 dB | 10.8 dB |
| A2/B2 | 4.8 dB | 7.8 dB |
| A3/B3 | 3 dB | 6 dB |
| C0 | 10.8 dB | 13.8 dB |
| C2 | 4.8 dB | 7.8 dB |

TABLE 20-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 13.8 dB | 16.8 dB |
| A2 | 10.8 dB | 13.8 dB |
| A3 | 9 dB | 12 dB |
| B1 | 13.8 dB | 16.8 dB |
| B4 | 6 dB | 9 dB |
| A1/B1 | 13.8 dB | 16.8 dB |
| A2/B2 | 10.8 dB | 13.8 dB |
| A3/B3 | 9 dB | 12 dB |
| C0 | 16.8 dB | 19.8 dB |
| C2 | 10.8 dB | 13.8 dB |

TABLE 21-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | -3 dB | |
| 2 | -6 dB | |
| 3 | 0 dB | |
| A1 | 10.8 dB | 7.8 dB |
| A2 | 7.8 dB | 4.8 dB |
| A3 | 6 dB | 3 dB |
| B1 | 10.8 dB | 7.8 dB |
| B4 | 3 dB | 0 dB |
| A1/B1 | 10.8 dB | 7.8 dB |
| A2/B2 | 7.8 dB | 4.8 dB |
| A3/B3 | 6 dB | 3 dB |
| C0 | 13.8 dB | 10.8 dB |
| C2 | 7.8 dB | 4.8 dB |

TABLE 21-2

Correspondence Table of Random Access Preamble
Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 16.8 dB | 13.8 dB |
| A2 | 13.8 dB | 10.8 dB |
| A3 | 12 dB | 9 dB |
| B1 | 16.8 dB | 13.8 dB |
| B4 | 9 dB | 6 dB |
| A1/B1 | 16.8 dB | 13.8 dB |
| A2/B2 | 13.8 dB | 10.8 dB |
| A3/B3 | 12 dB | 9 dB |
| C0 | 19.8 dB | 16.8 dB |
| C2 | 13.8 dB | 10.8 dB |

Another possible correspondence between random access preamble formats, random access preamble subcarrier spacing indication information and random access preamble transmit power offsets DELTA_PREAMBLE may be given in Table 22.

TABLE 22

Correspondence Table of Random Access Preamble
Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | | 0 dB | | |
| 1 | | −3 dB | | |
| 2 | | −6 dB | | |
| 3 | | 0 dB | | |
| A1 | 0 dB | 3 dB | 6 dB | 9 dB |
| A2 | −3 dB | 0 dB | 3 dB | 6 dB |
| A3 | −5 dB | −2 dB | 1 dB | 4 dB |
| B1 | 0 dB | 3 dB | 6 dB | 9 dB |
| B4 | −8 dB | −5 dB | −2 dB | 1 dB |
| A1/B1 | 0 dB | 3 dB | 6 dB | 9 dB |
| A2/B2 | −3 dB | 0 dB | 3 dB | 6 dB |
| A3/B3 | −5 dB | −2 dB | 1 dB | 4 dB |
| C0 | 3 dB | 6 dB | 9 dB | 12 dB |
| C2 | −3 dB | 0 dB | 3 dB | 6 dB |

It should be noted that a possible correspondence between random access preamble formats, random access preamble subcarrier spacing indication information, and preamble transmit power offsets DELTA_PREAMBLE may be given, by swapping some of columns in Table 22, as shown in Table 23.

TABLE 23

Correspondence Table of Random Access Preamble
Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | | 0 dB | | |
| 1 | | −3 dB | | |
| 2 | | −6 dB | | |
| 3 | | 0 dB | | |
| A1 | 3 dB | 0 dB | 9 dB | 6 dB |
| A2 | 0 dB | −3 dB | 6 dB | 3 dB |
| A3 | −2 dB | −5 dB | 4 dB | 1 dB |
| B1 | 3 dB | 0 dB | 9 dB | 6 dB |
| B4 | −5 dB | −8 dB | 1 dB | −2 dB |
| A1/B1 | 3 dB | 0 dB | 9 dB | 6 dB |
| A2/B2 | 0 dB | −3 dB | 6 dB | 3 dB |
| A3/B3 | −2 dB | −5 dB | 4 dB | 1 dB |
| C0 | 6 dB | 3 dB | 12 dB | 9 dB |
| C2 | 0 dB | −3 dB | 6 dB | 3 dB |

It should be noted that possible correspondences between random access preamble formats, random access preamble subcarrier spacing indication information, and preamble transmit power offsets DELTA_PREAMBLE may be given by dividing each of Table 22 and Table 23 into two sub-tables based on the carrier ranges, as shown in Tables 24 and 25 (in which Table 24-1 and Table 24-2 are sub-tables of Table 24, and Table 25-1 and Table 25-2 are sub-tables of Table 25).

TABLE 24-1

Correspondence Table of Random Access Preamble
Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 0 dB | 3 dB |
| A2 | −3 dB | 0 dB |
| A3 | −5 dB | −2 dB |
| B1 | 0 dB | 3 dB |
| B4 | −8 dB | −5 dB |
| A1/B1 | 0 dB | 3 dB |
| A2/B2 | −3 dB | 0 dB |
| A3/B3 | −5 dB | −2 dB |
| C0 | 3 dB | 6 dB |
| C2 | −3 dB | 0 dB |

TABLE 24-2

Correspondence Table of Random Access Preamble
Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 6 dB | 9 dB |
| A2 | 3 dB | 6 dB |
| A3 | 1 dB | 4 dB |
| B1 | 6 dB | 9 dB |
| B4 | −2 dB | 1 dB |

TABLE 24-2-continued

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1/B1 | 6 dB | 9 dB |
| A2/B2 | 3 dB | 6 dB |
| A3/B3 | 1 dB | 4 dB |
| C0 | 9 dB | 12 dB |
| C2 | 3 dB | 6 dB |

TABLE 25-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 3 dB | 0 dB |
| A2 | 0 dB | −3 dB |
| A3 | −2 dB | −5 dB |
| B1 | 3 dB | 0 dB |
| B4 | −5 dB | −8 dB |
| A1/B1 | 3 dB | 0 dB |
| A2/B2 | 0 dB | −3 dB |
| A3/B3 | −2 dB | −5 dB |
| C0 | 6 dB | 3 dB |
| C2 | 0 dB | −3 dB |

TABLE 25-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 9 dB | 6 dB |
| A2 | 6 dB | 3 dB |
| A3 | 4 dB | 1 dB |
| B1 | 9 dB | 6 dB |
| B4 | 1 dB | −2 dB |
| A1/B1 | 9 dB | 6 dB |
| A2/B2 | 6 dB | 3 dB |
| A3/B3 | 4 dB | 1 dB |
| C0 | 12 dB | 9 dB |
| C2 | 6 dB | 3 dB |

Another possible correspondence between random access preamble formats, random access preamble subcarrier spacing indication information, and random access preamble transmit power offsets DELTA_PREAMBLE may be given in Table 26.

TABLE 26

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 0 dB | 3 dB | 6 dB | 9 dB |
| A2 | −3 dB | 0 dB | 3 dB | 6 dB |
| A3 | −4.8 dB | −1.8 dB | 1.2 dB | 4.2 dB |
| B1 | 0 dB | 3 dB | 6 dB | 9 dB |
| B4 | −7.8 dB | −4.8 dB | −1.8 dB | 1.2 dB |
| A1/B1 | 0 dB | 3 dB | 6 dB | 9 dB |
| A2/B2 | −3 dB | 0 dB | 3 dB | 6 dB |
| A3/B3 | −4.8 dB | −1.8 dB | 1.2 dB | 4.2 dB |
| C0 | 3 dB | 6 dB | 9 dB | 12 dB |
| C2 | −3 dB | 0 dB | 3 dB | 6 dB |

It should be noted that a possible correspondence between random access preamble formats, random access preamble subcarrier spacing indication information, and preamble transmit power offsets DELTA_PREAMBLE may be given by swapping some of columns in Table 26, as shown in Table 27.

TABLE 27

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 3 dB | 0 dB | 9 dB | 6 dB |
| A2 | 0 dB | −3 dB | 6 dB | 3 dB |
| A3 | −1.8 dB | −4.8 dB | 4.2 dB | 1.2 dB |
| B1 | 3 dB | 0 dB | 9 dB | 6 dB |
| B4 | −4.8 dB | −7.8 dB | 1.2 dB | −1.8 dB |
| A1/B1 | 3 dB | 0 dB | 9 dB | 6 dB |
| A2/B2 | 0 dB | −3 dB | 6 dB | 3 dB |
| A3/B3 | −1.8 dB | −4.8 dB | 4.2 dB | 1.2 dB |
| C0 | 6 dB | 3 dB | 12 dB | 9 dB |
| C2 | 0 dB | −3 dB | 6 dB | 3 dB |

It should be noted that possible correspondences between random access preamble formats, random access preamble subcarrier spacing indication information, and preamble transmit power offsets DELTA_PREAMBLE may be given by dividing each of Table 26 and Table 27 into two sub-tables based on the carrier ranges, as shown in Tables 28 and 29 (in which Table 28-1 and Table 28-2 are sub-tables of Table 28, and Table 29-1 and Table 29-2 are sub-tables of Table 29).

TABLE 28-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 0 dB | 3 dB |
| A2 | −3 dB | 0 dB |
| A3 | −4.8 dB | −1.8 dB |
| B1 | 0 dB | 3 dB |
| B4 | −7.8 dB | −4.8 dB |
| A1/B1 | 0 dB | 3 dB |
| A2/B2 | −3 dB | 0 dB |
| A3/B3 | −4.8 dB | −1.8 dB |
| C0 | 3 dB | 6 dB |
| C2 | −3 dB | 0 dB |

TABLE 28-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 6 dB | 9 dB |
| A2 | 3 dB | 6 dB |
| A3 | 1.2 dB | 4.2 dB |
| B1 | 6 dB | 9 dB |
| B4 | −1.8 dB | 1.2 dB |
| A1/B1 | 6 dB | 9 dB |
| A2/B2 | 3 dB | 6 dB |
| A3/B3 | 1.2 dB | 4.2 dB |
| C0 | 9 dB | 12 dB |
| C2 | 3 dB | 6 dB |

TABLE 29-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 3 dB | 0 dB |
| A2 | 0 dB | −3 dB |
| A3 | −1.8 dB | −4.8 dB |
| B1 | 3 dB | 0 dB |
| B4 | −4.8 dB | −7.8 dB |
| A1/B1 | 3 dB | 0 dB |
| A2/B2 | 0 dB | −3 dB |
| A3/B3 | −1.8 dB | −4.8 dB |
| C0 | 6 dB | 3 dB |
| C2 | 0 dB | −3 dB |

TABLE 29-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 9 dB | 6 dB |
| A2 | 6 dB | 3 dB |
| A3 | 4.2 dB | 1.2 dB |
| B1 | 9 dB | 6 dB |
| B4 | 1.2 dB | −1.8 dB |
| A1/B1 | 9 dB | 6 dB |
| A2/B2 | 6 dB | 3 dB |
| A3/B3 | 4.2 dB | 1.2 dB |
| C0 | 12 dB | 9 dB |
| C2 | 6 dB | 3 dB |

Another possible correspondence between random access preamble formats, random access preamble subcarrier spacing indication information and random access preamble transmit power offsets DELTA_PREAMBLE may be given in Table 30.

TABLE 30

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 11 dB | 14 dB | 17 dB | 20 dB |
| A2 | | | | |
| A3 | | | | |
| B1 | | | | |
| B4 | | | | |
| A1/B1 | | | | |
| A2/B2 | | | | |
| A3/B3 | | | | |
| C0 | | | | |
| C2 | | | | |

It should be noted that a possible correspondence between random access preamble formats, random access preamble subcarrier spacing indication information, and preamble transmit power offsets DELTA_PREAMBLE may be given by swapping some of columns in Table 30, as shown in Table 31.

TABLE 31

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |

TABLE 31-continued

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 3 | 0 dB | | | |
| A1 | 14 dB | 11 dB | 20 dB | 17 dB |
| A2 | | | | |
| A3 | | | | |
| B1 | | | | |
| B4 | | | | |
| A1/B1 | | | | |
| A2/B2 | | | | |
| A3/B3 | | | | |
| C0 | | | | |
| C2 | | | | |

It should be noted that possible correspondences between random access preamble formats, random access preamble subcarrier spacing indication information, and preamble transmit power offsets DELTA_PREAMBLE may be given by dividing each of Table 30 and Table 31 into two sub-tables based on the carrier ranges, as shown in Tables 32 and 33 (in which Table 32-1 and Table 32-2 are sub-tables of Table 32, and Table 33-1 and Table 33-2 are sub-tables of Table 33).

TABLE 32-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 11 dB | 14 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 32-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 17 dB | 20 dB |
| A2 | | |
| A3 | | |
| B1 | | |
| B4 | | |

TABLE 32-2-continued

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1/B1 | | |
| A2/B2 | | |
| A3/B3 | | |
| C0 | | |
| C2 | | |

TABLE 33-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 14 dB | 11 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 33-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 20 dB | 17 dB |
| A2 | | |
| A3 | | |
| B1 | | |
| B4 | | |
| A1/B1 | | |
| A2/B2 | | |
| A3/B3 | | |
| C0 | | |
| C2 | | |

Another possible correspondence between random access preamble formats, random access preamble subcarrier spacing indication information and random access preamble transmit power offsets DELTA_PREAMBLE may be given in Table 34.

TABLE 34

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | | | | |
| A2 | | | | |
| A3 | 10.8 dB | 13.8 dB | 16.8 dB | 19.8 dB |
| B1 | | | | |
| B4 | | | | |
| A1/B1 | | | | |
| A2/B2 | | | | |
| A3/B3 | | | | |
| C0 | | | | |
| C2 | | | | |

It should be noted that a possible correspondence between random access preamble formats, random access preamble subcarrier spacing indication information, and preamble transmit power offsets DELTA_PREAMBLE may be given by swapping some of columns in Table 34, as shown in Table 35.

TABLE 35

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 0 dB | | | |
| A1 | 13.8 dB | 10.8 dB | 19.8 dB | 16.8 dB |
| A2 | | | | |
| A3 | | | | |
| B1 | | | | |
| B4 | | | | |
| A1/B1 | | | | |
| A2/B2 | | | | |
| A3/B3 | | | | |
| C0 | | | | |
| C2 | | | | |

It should be noted that possible correspondences between random access preamble formats, random access preamble subcarrier spacing indication information, and preamble transmit power offsets DELTA_PREAMBLE may be given by dividing each of Table 34 and Table 35 into two sub-tables based on the carrier ranges, as shown in Tables 36 and 37 (in which Table 36-1 and Table 36-2 are sub-tables of Table 36, and Table 37-1 and Table 37-2 are sub-tables of Table 37).

TABLE 36-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 10.8 dB | 13.8 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 36-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 16.8 dB | 19.8 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 37-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 13.8 dB | 10.8 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 37-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 19.8 dB | 16.8 dB |
| A2 | | |
| A3 | | |
| B1 | | |
| B4 | | |
| A1/B1 | | |
| A2/B2 | | |
| A3/B3 | | |
| C0 | | |
| C2 | | |

Another possible correspondence between random access preamble formats, random access preamble subcarrier spacing indication information, and random access preamble transmit power offsets DELTA_PREAMBLE may be given in Table 38.

TABLE 38

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | | 0 dB | | |
| 1 | | −3 dB | | |
| 2 | | −6 dB | | |
| 3 | | 0 dB | | |
| A1 | 0 dB | 3 dB | 6 dB | 9 dB |
| A2 | | | | |
| A3 | | | | |
| B1 | | | | |
| B4 | | | | |
| A1/B1 | | | | |
| A2/B2 | | | | |
| A3/B3 | | | | |
| C0 | | | | |
| C2 | | | | |

It should be noted that a possible correspondence between random access preamble formats, random access preamble subcarrier spacing indication information, and preamble transmit power offsets DELTA_PREAMBLE may be given by swapping some of columns in Table 38, as shown in Table 39.

TABLE 39

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | | 0 dB | | |
| 1 | | −3 dB | | |
| 2 | | −6 dB | | |
| 3 | | 0 dB | | |
| A1 | 3 dB | 0 dB | 9 dB | 6 dB |
| A2 | | | | |
| A3 | | | | |
| B1 | | | | |
| B4 | | | | |
| A1/B1 | | | | |
| A2/B2 | | | | |
| A3/B3 | | | | |
| C0 | | | | |
| C2 | | | | |

It should be noted that possible correspondences between random access preamble formats, random access preamble subcarrier spacing indication information, and preamble transmit power offsets DELTA_PREAMBLE may be given by dividing each of Table 38 and Table 39 into two sub-tables based on the carrier ranges as shown in Tables 40 and 41 (in which Table 40-1 and Table 40-2 are sub-tables of Table 40, and Table 41-1 and Table 41-2 are sub-tables of Table 41).

TABLE 40-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 0 dB | |
| A1 | 0 dB | 3 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 40-2

Correspondence Table of Random Access Preamble Format, Msg1SCS and DELTA PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 6 dB | 9 dB |
| A2 | | |
| A3 | | |
| B1 | | |
| B4 | | |
| A1/B1 | | |
| A2/B2 | | |
| A3/B3 | | |
| C0 | | |
| C2 | | |

TABLE 41-1

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | -3 dB | |
| 2 | -6 dB | |
| 3 | 0 dB | |
| A1 | 3 dB | 0 dB |
| A2 | | |
| A3 | | |
| B1 | | |
| B4 | | |
| A1/B1 | | |
| A2/B2 | | |
| A3/B3 | | |

TABLE 41-1-continued

Correspondence Table of Random Access Preamble Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| C0 | | |
| C2 | | |

TABLE 41-2

Correspondence Table of Random Access Preamble Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 9 dB | 6 dB |
| A2 | | |
| A3 | | |
| B1 | | |
| B4 | | |
| A1/B1 | | |
| A2/B2 | | |
| A3/B3 | | |
| C0 | | |
| C2 | | |

Another possible correspondence between random access preamble formats, random access preamble subcarrier spacing indication information and random access preamble transmit power offsets DELTA_PREAMBLE may be given in Table 42.

TABLE 42

Correspondence Table of Random Access Preamble Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | | | 0 dB | |
| 1 | | | -3 dB | |
| 2 | | | -6 dB | |
| 3 | | | 6 dB | |
| A1 | 11 dB | 17 dB | 23 dB | 29 dB |
| A2 | 8 dB | 14 dB | 20 dB | 26 dB |
| A3 | 6 dB | 12 dB | 18 dB | 24 dB |
| B1 | 11 dB | 17 dB | 23 dB | 29 dB |
| B4 | 3 dB | 9 dB | 15 dB | 21 dB |
| A1/B1 | 11 dB | 17 dB | 23 dB | 29 dB |
| A2/B2 | 8 dB | 14 dB | 20 dB | 26 dB |
| A3/B3 | 6 dB | 12 dB | 18 dB | 24 dB |

TABLE 42-continued

Correspondence Table of Random Access Preamble
Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| C0 | 14 dB | 20 dB | 26 dB | 29 dB |
| C2 | 8 dB | 14 dB | 20 dB | 23 dB |

It should be noted that a possible correspondence between random access preamble formats, random access preamble subcarrier spacing indication information, and preamble transmit power offsets DELTA_PREAMBLE may be given by swapping some of columns in Table 42, as shown in Table 43.

TABLE 43

Correspondence Table of Random Access Preamble
Format, Msg1SCS and DELTA_PREAMBLE

| Random Access Preamble Format | DELTA_PREAMBLE | | | |
|---|---|---|---|---|
| | Carrier Range < 6 GHz | | Carrier Range > 6 GHz | |
| | Msg1SCS = 0 | Msg1SCS = 1 | Msg1SCS = 0 | Msg1SCS = 1 |
| 0 | 0 dB | | | |
| 1 | −3 dB | | | |
| 2 | −6 dB | | | |
| 3 | 6 dB | | | |
| A1 | 17 dB | 11 dB | 29 dB | 23 dB |
| A2 | 14 dB | 8 dB | 26 dB | 20 dB |
| A3 | 12 dB | 6 dB | 24 dB | 18 dB |
| B1 | 17 dB | 11 dB | 29 dB | 23 dB |
| B4 | 9 dB | 3 dB | 21 dB | 15 dB |
| A1/B1 | 17 dB | 11 dB | 29 dB | 23 dB |
| A2/B2 | 14 dB | 8 dB | 26 dB | 20 dB |
| A3/B3 | 12 dB | 6 dB | 24 dB | 18 dB |
| C0 | 20 dB | 14 dB | 29 dB | 26 dB |
| C2 | 14 dB | 8 dB | 23 dB | 20 dB |

It should be noted that possible correspondences between random access preamble formats, random access preamble subcarrier spacing indication information, and preamble transmit power offsets DELTA_PREAMBLE may be given by dividing each of Table 42 and Table 43 into two sub-tables based on the carrier ranges, as shown in Tables 44 and 45 (in which Table 44-1 and Table 44-2 are sub-tables of Table 44, and Table 45-1 and Table 45-2 are sub-tables of Table 45).

TABLE 44-1

Correspondence Table of Random Access Preamble
Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 6 dB | |
| A1 | 11 dB | 17 dB |
| A2 | 8 dB | 14 dB |
| A3 | 6 dB | 12 dB |
| B1 | 11 dB | 17 dB |
| B4 | 3 dB | 9 dB |

TABLE 44-1-continued

Correspondence Table of Random Access Preamble
Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| A1/B1 | 11 dB | 17 dB |
| A2/B2 | 8 dB | 14 dB |
| A3/B3 | 6 dB | 12 dB |
| C0 | 14 dB | 20 dB |
| C2 | 8 dB | 14 dB |

TABLE 44-2

Correspondence Table of Random Access Preamble
Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 23 dB | 29 dB |
| A2 | 20 dB | 26 dB |

TABLE 44-2-continued

Correspondence Table of Random Access Preamble
Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A3 | 18 dB | 24 dB |
| B1 | 23 dB | 29 dB |
| B4 | 15 dB | 21 dB |
| A1/B1 | 23 dB | 29 dB |
| A2/B2 | 20 dB | 26 dB |
| A3/B3 | 18 dB | 24 dB |
| C0 | 26 dB | 29 dB |
| C2 | 20 dB | 23 dB |

TABLE 45-1

Correspondence Table of Random Access Preamble
Format, Msg1SCS and DELTA_PREAMBLE

| Random Access Preamble Format | DELTA_PREAMBLE (Carrier Range < 6 GHz) | |
|---|---|---|
| | Msg1SCS = 0 | Msg1SCS = 1 |
| 0 | 0 dB | |
| 1 | −3 dB | |
| 2 | −6 dB | |
| 3 | 6 dB | |
| A1 | 17 dB | 11 dB |
| A2 | 14 dB | 8 dB |
| A3 | 12 dB | 6 dB |
| B1 | 17 dB | 11 dB |
| B4 | 9 dB | 3 dB |
| A1/B1 | 17 dB | 11 dB |
| A2/B2 | 14 dB | 8 dB |
| A3/B3 | 12 dB | 6 dB |
| C0 | 20 dB | 14 dB |
| C2 | 14 dB | 8 dB |

TABLE 45-2

Correspondence Table of Random Access Preamble
Format, Msg1SCS and DELTA_PREAMBLE

| Random Access Preamble Format | DELTA_PREAMBLE (Carrier Range > 6 GHz) | |
|---|---|---|
| | Msg1SCS = 0 | Msg1SCS = 1 |
| A1 | 29 dB | 23 dB |
| A2 | 26 dB | 20 dB |
| A3 | 24 dB | 18 dB |
| B1 | 29 dB | 23 dB |
| B4 | 21 dB | 15 dB |
| A1/B1 | 29 dB | 23 dB |
| A2/B2 | 26 dB | 20 dB |
| A3/B3 | 24 dB | 18 dB |
| C0 | 29 dB | 26 dB |
| C2 | 23 dB | 20 dB |

Another possible correspondence between random access preamble formats random access preamble transmit power offsets DELTA_PREAMBLE may be given in Table 46.

TABLE 46

Correspondence Table of Random Access
Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |
| A1 | $8 + 3 \cdot \mu$ dB |
| A2 | $5 + 3 \cdot \mu$ dB |
| A3 | $3 + 3 \cdot \mu$ dB |
| B1 | $8 + 3 \cdot \mu$ dB |
| B4 | $3 \cdot \mu$ dB |
| A1/B1 | $8 + 3 \cdot \mu$ dB |
| A2/B2 | $5 + 3 \cdot \mu$ dB |
| A3/B3 | $3 + 3 \cdot \mu$ dB |
| C0 | $11 + 3 \cdot \mu$ dB |
| C2 | $5 + 3 \cdot \mu$ dB |

In Table 46, $\mu$ is a parameter indicating a random access preamble subcarrier spacing (an indication value being $15 \cdot 2^\mu$ kHz), and may be 0, 1, 2, 3. The random access preamble subcarrier spacing is 15 kHz when $\mu=0$; the random access preamble subcarrier spacing is 30 kHz when $\mu=1$; the random access preamble subcarrier spacing is 60 kHz when $\mu=2$; and the random access preamble subcarrier spacing is 120 kHz when $\mu=3$.

It should be noted that a possible correspondence between random access preamble formats and preamble transmit power offsets DELTA_PREAMBLE may be given by dividing Table 46 into two sub-tables based on the random access preambles as shown in Table 47 (in which Table 47-1 and Table 47-2 are sub-tables of Table 47).

TABLE 47-1

Correspondence Table of Random Access
Preamble Format and DELTA_PREAMBLE

| Random Access Preamble Format | DELTA_PREAMBLE |
|---|---|
| 0 | 0 dB |
| 1 | −3 dB |
| 2 | −6 dB |
| 3 | 0 dB |

TABLE 47-2

Correspondence Table of Random Access
Preamble Format and DELTA_PREAMBLE

| Random Access Preamble Format | DELTA_PREAMBLE |
|---|---|
| A1 | $8 + 3 \cdot \mu$ dB |
| A2 | $5 + 3 \cdot \mu$ dB |
| A3 | $3 + 3 \cdot \mu$ dB |
| B1 | $8 + 3 \cdot \mu$ dB |
| B4 | $3 \cdot \mu$ dB |
| A1/B1 | $8 + 3 \cdot \mu$ dB |
| A2/B2 | $5 + 3 \cdot \mu$ dB |
| A3/B3 | $3 + 3 \cdot \mu$ dB |
| C0 | $11 + 3 \cdot \mu$ dB |
| C2 | $5 + 3 \cdot \mu$ dB |

In Table 47, $\mu$ is a parameter indicating a random access preamble subcarrier spacing (an indication value being $15 \cdot 2^\mu$ kHz), and may be 0, 1, 2, 3. The random access preamble subcarrier spacing is 15 kHz when $\mu=0$; the random access preamble subcarrier spacing is 30 kHz when $\mu=1$; the random access preamble subcarrier spacing is 60 kHz when $\mu=2$; and the random access preamble subcarrier spacing is 120 kHz when $\mu=3$.

Another possible correspondence between random access preamble formats and random access preamble transmit power offsets DELTA_PREAMBLE may be given in Table 48.

TABLE 48

Correspondence Table of Random Access
Preamble Format and DELTA_PREAMBLE

| Random Access Preamble Format | DELTA_PREAMBLE |
| --- | --- |
| 0 | 0 dB |
| 1 | −3 dB |
| 2 | −6 dB |
| 3 | 0 dB |
| A1, B1, A1/B1 | 8 + 3 · μ dB |
| A2, A2/B2 | 5 + 3 · μ dB |
| A3, A3/B3 | 3 + 3 · μ dB |
| B4 | 3 · μ dB |
| C0 | 11 + 3 · μ dB |
| C2 | 5 + 3 · μ dB |

In Table 48, μ is a parameter indicating a random access preamble subcarrier spacing (an indication value being $15 \cdot 2^\mu$ kHz), and may be 0, 1, 2, 3. The random access preamble subcarrier spacing is 15 kHz when μ=0; the random access preamble subcarrier spacing is 30 kHz when μ=1; the random access preamble subcarrier spacing is 60 kHz when μ=2; and the random access preamble subcarrier spacing is 120 kHz when μ=3.

It should be noted that a possible correspondence between random access preamble formats and preamble transmit power offsets DELTA_PREAMBLE may be given by dividing Table 48 into two sub-tables based on the random access preambles, as shown in Table 49 (in which Table 49-1 and Table 49-2 are sub-tables of Table 49).

TABLE 49-1

Correspondence Table of Random Access
Preamble Format and DELTA_PREAMBLE

| Random Access Preamble Format | DELTA_PREAMBLE |
| --- | --- |
| 0 | 0 dB |
| 1 | −3 dB |
| 2 | −6 dB |
| 3 | 0 dB |

TABLE 49-2

Correspondence Table of Random Access
Preamble Format and DELTA_PREAMBLE

| Random Access Preamble Format | DELTA_PREAMBLE |
| --- | --- |
| A1, B1, A1/B1 | 8 + 3 · μ dB |
| A2, A2/B2 | 5 + 3 · μ dB |
| A3, A3/B3 | 3 + 3 · μ dB |
| B4 | 3 · μ dB |
| C0 | 11 + 3 · μ dB |
| C2 | 5 + 3 · μ dB |

In Table 49, μ is a parameter indicating a random access preamble subcarrier spacing (an indication value being $15 \cdot 2^\mu$ kHz), and may be 0, 1, 2, 3. The random access preamble subcarrier spacing is 15 kHz when μ=0; the random access preamble subcarrier spacing is 30 kHz when μ=1; the random access preamble subcarrier spacing is 60 kHz when μ=2; and the random access preamble subcarrier spacing is 120 kHz when μ=3.

After the UE determines the random access preamble transmit power offset DELTA_PREAMBLE as described above, the random access preamble transmit power PREAMBLE_RECEIVED_TARGET_POWER expected to be received by the base station may be set as:

PREAMBLE_RECEIVED_TARGET_POWER=ra-PreambleInitialReceivedTargetPower DELTA_PREAMBLE (PREAMBLE_POWER_RAMPING_COUNTER−1)*powerRampingStep, where ra-PreambleInitialReceivedTargetPower is an initial transmit power configured by the high layer, DELTA_PREAMBLE is a random access preamble transmit power offset, PREMBLE_POWER_RAMPING_COUNTER is a power ramping count, and powerRampingStep is a power ramping step configured by the high layer.

Then, the UE may determine that a final random access preamble transmit power is min{$P_{CMAXc}(i)$, PREAMBLE_RECEIVED_TARGET_POWER+$PL_c$}, where $P_{CMAXc}(i)$ is a maximum transmit power of the UE, and $PL_c$ is a path loss value.

Hereinafter, a structure of a UE according to an exemplary embodiment of the present disclosure will be described with reference to FIG. 24. FIG. 24 schematically shows a structural block diagram of a UE 2400 according to an exemplary embodiment of the present disclosure. The UE 2400 may be used to perform the method 400 described with reference to FIG. 23. For the sake of brevity, only a schematic structure of the UE according to the exemplary embodiment of the present disclosure will be described herein, and the details which have been described in the method 2300 with reference to FIG. 23 will thus be omitted.

As shown in FIG. 24, the UE 2400 includes a communication interface 2401 for external communication, a processing unit or a processor 2403, which may be a single unit or a combination of multiple units for performing different steps of the method; a memory 2405 storing computer-executable instructions, which when executed by the processor 2403, cause the processor 2403 to: obtain random access configuration information from a base station, the random access configuration information including a random access configuration index and random access preamble subcarrier spacing indication information; obtain a random access preamble format based on the random access configuration index and the random access preamble subcarrier spacing indication information; and determine a random access preamble transmit power offset corresponding to the obtained random access preamble format.

In an exemplary embodiment, the UE 2400 may determine the random access preamble transmit power offset DELTA_PREAMBLE corresponding to the obtained random access preamble format by querying a correspondence table including at least random access preamble formats and random access preamble transmit power offsets DELTA_PREAMBLE.

In another exemplary embodiment, the correspondence table may further include at least one of the random access preamble subcarrier spacing indication information and the carrier range. In this case, the random access preamble transmit power offset DELTA_PREAMBLE corresponding to the obtained random access preamble format and at least one of the random access preamble subcarrier spacing indication information and the carrier range may be determined by querying the correspondence table.

As described above, the correspondence table is predefined, and may be stored in UE 2400 locally.

The novel method of determining a random access preamble transmit power proposed in the embodiments of the present disclosure is applicable to all of preamble formats in the future wireless communication systems, and may efficiently adjust the preamble transmit power in the random access process, and improve the success probability of the terminal's random access in a case of controlling interference, significantly improve the performance of the future wireless communication systems, and provide the terminal with a lower access delay and a better access experience.

Computer-executable instructions or programs for implementing the functions of various embodiments of the present disclosure may be recorded on a computer-readable storage medium. Corresponding functions can be realized by having a computer system read programs recorded on the recording medium and execute these programs. The so-called "computer system" herein may be a computer system embedded in the device, and may include an operating system or hardware (such as a peripheral device). The "computer-readable storage medium" may be a semiconductor recording medium, an optical recording medium, a magnetic recording medium, a short-time dynamic storage program recording medium, or any other recording media readable by a computer.

Various features or functional modules of the devices used in the above embodiments may be implemented or performed by circuitry (e.g., a single-chip or multi-chip integrated circuit). Circuits designed to perform the functions described in the present specification may include general purpose processors, digital signal processors (DSPs), application specific integrated circuits (ASICs), field programmable gate arrays (FPGAs), or other programmable logic devices, discrete Gate or transistor logic, discrete hardware components, or any combination of the above. A general-purpose processor may be a microprocessor or any existing processor, controller, microcontroller, or state machine. The above circuit may be a digital circuit or an analog circuit. In a case of new integrated circuit technology that replaces existing integrated circuits due to advances in semiconductor technology, one or more embodiments of the present disclosure may also be implemented using these new integrated circuit technologies.

The skilled in the art will understand that the present disclosure includes devices that are involved in performing one or more of the operations described in the present disclosure. These devices may be specially designed and manufactured for the required purposes, or may also include known devices in general purpose computers. These devices have computer programs stored thereon that are selectively activated or reconfigured. Such computer programs may be stored in a device (e.g., a computer) readable medium or in any type of medium suitable for storing electronic instructions and coupled to a bus, including but not limited to any types of disks, including a floppy disk, a hard disk, an optical disk, a CD-ROM, and a magneto-optical disk, a ROM (Read-Only Memory), a RAM (Random Access Memory), an EPROM (Erasable Programmable Read-Only Memory), an EEPROM (Electrically Erasable Programmable Read-Only Memory), a flash memory, a magnetic card, or a light card. That is, a readable medium includes any medium that stores or transmits information in a readable form by a device (e.g., a computer).

The skilled in the art can understand that each block of these structural diagrams and/or block diagrams and/or flowcharts, and combinations of blocks in these structural diagrams and/or block diagrams and/or flowcharts may be implemented by computer program instructions. The skilled in the art can understand that these computer program instructions can be provided to a processor of a general-purpose computer, a professional computer, or a processor for other programmable data processing method, so that the schemes specified in one or more blocks of the structural diagrams and/or block diagrams and/or flowcharts may be executed by the processor of the computer or the computer for other programmable data processing method.

The skilled in the art can understand that various operations, methods, steps, measures, and schemes that have been discussed in the present disclosure can be alternated, changed, combined, or deleted. Further, various operations, methods that have been discussed in the present disclosure, and other steps, measures, and schemes in the process can also be alternated, changed, rearranged, decomposed, combined, or deleted. Further, various operations, methods, steps, measures, and schemes in the prior art and those disclosed in the present disclosure may also be alternated, changed, rearranged, decomposed, combined, or deleted.

The foregoing descriptions are merely some of the embodiments of the present disclosure. It should be noted that for the skilled in the art, a number of improvements and modifications may be made without departing from the principle of the present disclosure. These improvements and modifications should also fall within the protection scope of the present disclosure.

It can be understood for those skilled in the art that each block of the structure charts and/or block diagrams and/or flowchart illustrations, and combinations of blocks in the structure charts and/or block diagrams and/or flowchart illustrations, can be implemented by computer program instructions. It can be understood for those skilled in the art that the computer program instructions may also be provided to a general purpose computer, a special purpose computer or other processor capable of programming data processing method for implementation, such that schemes specified in one or more blocks of the structure charts and/or block diagrams and/or flowchart illustrations are implemented by a computer or other processor capable of programming data processing method.

Wherein, each module of the device of the present disclosure may be integrated into one body or separately. The above modules can be combined into one module, and can be further split into multiple sub-modules.

Those skilled in the art may understand that the accompanying drawings are merely schematic diagrams of a preferred embodiment, and the modules or processes in the accompanying drawings are not necessarily required to implement the present disclosure.

A person skilled in the art may understand that the modules in the apparatuses in the embodiments may be distributed in the apparatuses in the embodiments as described in the embodiments, and corresponding changes may be performed in one or more apparatuses different from the present embodiment. The modules in the foregoing embodiments may be combined into one module, or further divided into multiple sub-modules.

The above serial numbers of the present disclosure are merely for the purpose of description and do not represent the advantages and disadvantages of the embodiments.

The above disclosures are only specific embodiments of the present disclosure, but the present disclosure is not limited thereto, and any changes that those skilled in the art can think of should fall in the protection scope of the present disclosure.

Methods according to embodiments stated in claims and/or specifications of the present disclosure may be implemented in hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the present disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of the may form a memory in which the program is stored. Further, a plurality of such memories may be included in the electronic device.

In addition, the programs may be stored in an attachable storage device which is accessible through communication networks such as the Internet, Intranet, local area network (LAN), wide area network (WAN), and storage area network (SAN), or a combination thereof. Such a storage device may access the electronic device via an external port. Further, a separate storage device on the communication network may access a portable electronic device.

In the above-described detailed embodiments of the present disclosure, a component included in the present disclosure is expressed in the singular or the plural according to a presented detailed embodiment. However, the singular form or plural form is selected for convenience of description suitable for the presented situation, and various embodiments of the present disclosure are not limited to a single element or multiple elements thereof. Further, either multiple elements expressed in the description may be configured into a single element or a single element in the description may be configured into multiple elements.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments, but should be defined by the appended claims and equivalents thereof.

Although the present disclosure has been described with an exemplary embodiment, various changes and modifications may be suggested to one skilled in the art. It is intended that the present disclosure encompass such changes and modifications as fall within the scope of the appended claims.

The invention claimed is:

1. A method performed by a user equipment (UE) in a wireless communication system, the method comprising:
receiving, from a base station, random access configuration information including information of random access configuration index indicating a preamble format among a plurality of formats;
identifying a delta-preamble value based on the preamble format and a subcarrier spacing;
determining transmission power for physical random access channel (PRACH) based on the identified delta-preamble value; and
transmitting, to the base station, a random access preamble based on the transmission power for PRACH.

2. A method performed by a base station (BS) in a wireless communication system, the method comprising:
transmitting, to a user equipment (UE) random access configuration information including information of random access configuration index indicating a preamble format among a plurality of formats; and
receiving, from the UE, random access preamble based on a transmission power for physical random access channel (PRACH),
wherein the transmission power for PRACH is associated with a delta-preamble value, and
wherein the delta-preamble value is associated with the preamble format and a subcarrier spacing.

3. An apparatus of a user equipment (UE) in a wireless communication system, the apparatus comprising:
a transceiver; and
at least one processor operatively coupled with the transceiver, and configured to:
transmit, to a UE, including information of random access configuration index indicating a preamble format among a plurality of formats, and
receive, from the UE, a random access preamble based on a transmission power for physical random access channel (PRACH),
wherein the transmission power for PRACH is associated with a delta-preamble value, and
wherein the delta-preamble value is associated with the preamble format and a subcarrier spacing.

4. An apparatus of a user equipment (UE) in a wireless communication system, the apparatus comprising:
a transceiver; and
at least one processor operably coupled with the transceiver, and configured to:
receive, from a base station, random access configuration information including information of random access configuration index indicating a preamble format among a plurality of formats,
identify a delta-preamble value based on the preamble format and a subcarrier spacing,
determine transmission power for physical random access channel (PRACH) based on the identified delta-preamble value, and
transmit, to the base station, random access preamble based on the transmission power for PRACH.

5. The apparatus of claim 4, wherein the delta-preamble value is identified as one of 0, 3, 5, 8, 11 decibel (dB), if the subcarrier spacing is 15 kilohertz (kHz).

6. The apparatus of claim 4, wherein the delta-preamble value is identified as one of 3, 6, 8, 11, 14 dB, if the subcarrier spacing is 30 kHz.

7. The apparatus of claim 4, wherein the delta-preamble value is identified as one of 6, 9, 11, 14, 17 dB, if the subcarrier spacing is 60 kHz.

8. The apparatus of claim 4, wherein the delta-preamble value is identified as one of 9, 12, 14, 17, 20 dB, if the subcarrier spacing is 120 kHz.

9. The method of claim 1, wherein the delta-preamble value is identified as one of 0, 3, 5, 8, 11 decibel (dB), if the subcarrier spacing is 15 kilohertz (kHz).

10. The method of claim 1, wherein the delta-preamble value is identified as one of 3, 6, 8, 11, 14 dB, if the subcarrier spacing is 30 kHz.

11. The method of claim 1, wherein the delta-preamble value is identified as one of 6, 9, 11, 14, 17 dB, if the subcarrier spacing is 60 kHz.

12. The method of claim 1, wherein the delta-preamble value is identified as one of 9, 12, 14, 17, 20 dB, if the subcarrier spacing is 120 kHz.

13. The method of claim 2, wherein the delta-preamble value is identified as one of 0, 3, 5, 8, 11 decibel (dB), if the subcarrier spacing is 15 kilohertz (kHz).

14. The method of claim 2, wherein the delta-preamble value is identified as one of 3, 6, 8, 11, 14 dB, if the subcarrier spacing is 30 kHz.

15. The method of claim 2, wherein the delta-preamble value is identified as one of 6, 9, 11, 14, 17 dB, if the subcarrier spacing is 60 kHz.

16. The method of claim 2, wherein the delta-preamble value is identified as one of 9, 12, 14, 17, 20 dB, if the subcarrier spacing is 120 kHz.

17. The apparatus of claim 3, wherein the delta-preamble value is identified as one of 0, 3, 5, 8, 11 decibel (dB), if the subcarrier spacing is 15 kilohertz (kHz).

18. The apparatus of claim 3, wherein the delta-preamble value is identified as one of 3, 6, 8, 11, 14 dB, if the subcarrier spacing is 30 kHz.

19. The apparatus of claim 3, wherein the delta-preamble value is identified as one of 6, 9, 11, 14, 17 dB, if the subcarrier spacing is 60 kHz.

20. The apparatus of claim 3, wherein the delta-preamble value is identified as one of 9, 12, 14, 17, 20 dB, if the subcarrier spacing is 120 kHz.

* * * * *